US012485008B2

(12) United States Patent
Kiely et al.

(10) Patent No.: US 12,485,008 B2
(45) Date of Patent: Dec. 2, 2025

(54) ROTATIONAL ALIGNMENT OF MEDICAL IMPLANT

(71) Applicant: BOSTON SCIENTIFIC SCIMED, INC., Maple Grove, MN (US)

(72) Inventors: Richard Kiely, Galway (IE); David Bishop, Carrickfergus (GB)

(73) Assignee: Boston Scientific Scimed, Inc., Maple Grove, MN (US)

( * ) Notice: Subject to any disclaimer, the term of this patent is extended or adjusted under 35 U.S.C. 154(b) by 907 days.

(21) Appl. No.: 17/716,291

(22) Filed: Apr. 8, 2022

(65) Prior Publication Data
US 2022/0323217 A1 Oct. 13, 2022

Related U.S. Application Data

(60) Provisional application No. 63/173,097, filed on Apr. 9, 2021.

(51) Int. Cl.
*A61F 2/24* (2006.01)
*A61B 17/00* (2006.01)
(Continued)

(52) U.S. Cl.
CPC .......... *A61F 2/2436* (2013.01); *A61F 2/2418* (2013.01); *A61F 2/9517* (2020.05); *A61M 25/09* (2013.01)

(58) Field of Classification Search
None
See application file for complete search history.

(56) References Cited

U.S. PATENT DOCUMENTS 1,519,200 A 12/1924 Griffith
2,682,057 A 6/1954 Lord
(Continued)

FOREIGN PATENT DOCUMENTS

AU 2002329324 B2 7/2007
CN 1338951 A 3/2002
(Continued)

OTHER PUBLICATIONS

US 8,062,356 B2, 11/2011, Salahieh et al. (withdrawn)
(Continued)

*Primary Examiner* — Ann Hu
(74) *Attorney, Agent, or Firm* — Seager, Tufte & Wickhem LLP

(57) ABSTRACT

A system for delivering a replacement heart valve implant may include the implant including an expandable framework and leaflets coupled to the framework, and a delivery device including a handle and an elongate catheter extending from the handle. The catheter includes an outer sheath and an inner shaft movably disposed within the outer sheath. The implant is releasably coupled to the inner shaft. The inner shaft includes an orientation lumen extending longitudinally within the inner shaft, the orientation lumen being offset from a central guidewire lumen of the inner shaft. The delivery device includes an orientation mandrel disposed within the orientation lumen, the orientation mandrel extending distally from the handle to a distal end proximate a closed distal end of the orientation lumen. The orientation mandrel is operably coupled to an orientation mechanism of the handle configured to apply compressive force or tensile force to the orientation mandrel.

7 Claims, 21 Drawing Sheets

(51) Int. Cl.
*A61F 2/95* (2013.01)
*A61F 9/00* (2006.01)
*A61M 25/09* (2006.01)

(56) References Cited

U.S. PATENT DOCUMENTS

| | | | |
|---|---|---|---|
| 2,701,559 A | 2/1955 | Cooper | |
| 2,832,078 A | 4/1958 | Williams | |
| 3,029,819 A | 4/1962 | Starks | |
| 3,099,016 A | 7/1963 | Lowell | |
| 3,113,586 A | 12/1963 | Edmark | |
| 3,130,418 A | 4/1964 | Head et al. | |
| 3,143,742 A | 8/1964 | Cromie | |
| 3,221,006 A | 11/1965 | Moore et al. | |
| 3,334,629 A | 8/1967 | Cohn | |
| 3,365,728 A | 1/1968 | Edwards et al. | |
| 3,367,364 A | 2/1968 | Cruz et al. | |
| 3,409,013 A | 11/1968 | Henry | |
| 3,445,916 A | 5/1969 | Schulte | |
| 3,540,431 A | 11/1970 | Mobin-Uddin | |
| 3,548,417 A | 12/1970 | Kischer et al. | |
| 3,570,014 A | 3/1971 | Hancock | |
| 3,587,115 A | 6/1971 | Shiley | |
| 3,592,184 A | 7/1971 | Watkins et al. | |
| 3,628,535 A | 12/1971 | Ostrowsky et al. | |
| 3,642,004 A | 2/1972 | Osthagen et al. | |
| 3,657,744 A | 4/1972 | Ersek | |
| 3,671,979 A | 6/1972 | Moulopoulos | |
| 3,714,671 A | 2/1973 | Goodenough et al. | |
| 3,725,961 A | 4/1973 | Magovern et al. | |
| 3,755,823 A | 9/1973 | Hancock | |
| 3,795,246 A | 3/1974 | Sturgeon | |
| 3,839,741 A | 10/1974 | Haller | |
| 3,868,956 A | 3/1975 | Alfidi et al. | |
| 3,874,388 A | 4/1975 | King et al. | |
| 3,983,581 A | 10/1976 | Angell et al. | |
| 3,997,923 A | 12/1976 | Possis | |
| 4,035,849 A | 7/1977 | Angell et al. | |
| 4,056,854 A | 11/1977 | Boretos et al. | |
| 4,084,268 A | 4/1978 | Ionescu et al. | |
| 4,106,129 A | 8/1978 | Carpentier et al. | |
| 4,222,126 A | 9/1980 | Boretos et al. | |
| 4,233,690 A | 11/1980 | Akins | |
| 4,265,694 A | 5/1981 | Boretos et al. | |
| 4,291,420 A | 9/1981 | Reul | |
| 4,297,749 A | 11/1981 | Davis et al. | |
| 4,323,358 A | 4/1982 | Lentz et al. | |
| 4,326,306 A | 4/1982 | Poler | |
| 4,339,831 A | 7/1982 | Johnson | |
| 4,343,048 A | 8/1982 | Ross et al. | |
| 4,345,340 A | 8/1982 | Rosen | |
| 4,373,216 A | 2/1983 | Klawitter | |
| 4,406,022 A | 9/1983 | Roy | |
| 4,423,809 A | 1/1984 | Mazzocco | |
| 4,425,908 A | 1/1984 | Simon | |
| 4,470,157 A | 9/1984 | Love | |
| 4,484,579 A * | 11/1984 | Meno | A61B 17/320725 600/562 |
| 4,501,030 A | 2/1985 | Lane | |
| 4,531,943 A | 7/1985 | Tassel et al. | |
| 4,535,483 A | 8/1985 | Klawitter et al. | |
| 4,574,803 A | 3/1986 | Storz | |
| 4,580,568 A | 4/1986 | Gianturco | |
| 4,592,340 A | 6/1986 | Boyles | |
| 4,602,911 A | 7/1986 | Ahmadi et al. | |
| 4,605,407 A | 8/1986 | Black et al. | |
| 4,610,688 A | 9/1986 | Silvestrini et al. | |
| 4,612,011 A | 9/1986 | Kautzky | |
| 4,617,932 A | 10/1986 | Kornberg | |
| 4,643,732 A | 2/1987 | Pietsch et al. | |
| 4,647,283 A | 3/1987 | Carpentier et al. | |
| 4,648,881 A | 3/1987 | Carpentier et al. | |
| 4,655,218 A | 4/1987 | Kulik et al. | |
| 4,655,771 A | 4/1987 | Wallsten et al. | |
| 4,662,885 A | 5/1987 | DiPisa | |
| 4,665,906 A | 5/1987 | Jervis | |
| 4,680,031 A | 7/1987 | Alonso | |
| 4,692,164 A | 9/1987 | Dzemeshkevich et al. | |
| 4,705,516 A | 11/1987 | Barone et al. | |
| 4,710,192 A | 12/1987 | Liotta et al. | |
| 4,733,665 A | 3/1988 | Palmaz et al. | |
| 4,755,181 A | 7/1988 | Igoe | |
| 4,759,758 A | 7/1988 | Gabbay | |
| 4,777,951 A | 10/1988 | Cribier et al. | |
| 4,787,899 A | 11/1988 | Lazarus | |
| 4,787,901 A | 11/1988 | Baykut | |
| 4,796,629 A | 1/1989 | Grayzel | |
| 4,819,751 A | 4/1989 | Shimada et al. | |
| 4,829,990 A | 5/1989 | Thuroff et al. | |
| 4,834,755 A | 5/1989 | Silvestrini et al. | |
| 4,851,001 A | 7/1989 | Taheri | |
| 4,856,516 A | 8/1989 | Hillstead | |
| 4,865,600 A | 9/1989 | Carpentier et al. | |
| 4,872,874 A | 10/1989 | Taheri | |
| 4,873,978 A | 10/1989 | Ginsburg | |
| 4,878,495 A | 11/1989 | Grayzel | |
| 4,878,906 A | 11/1989 | Lindemann et al. | |
| 4,883,458 A | 11/1989 | Shiber | |
| 4,885,005 A | 12/1989 | Nashef et al. | |
| 4,909,252 A | 3/1990 | Goldberger | |
| 4,917,102 A | 4/1990 | Miller et al. | |
| 4,922,905 A | 5/1990 | Strecker | |
| 4,927,426 A | 5/1990 | Dretler | |
| 4,954,126 A | 9/1990 | Wallsten | |
| 4,966,604 A | 10/1990 | Reiss | |
| 4,969,890 A | 11/1990 | Sugita et al. | |
| 4,979,939 A | 12/1990 | Shiber | |
| 4,986,830 A | 1/1991 | Owens et al. | |
| 4,994,077 A | 2/1991 | Dobben | |
| 5,002,556 A | 3/1991 | Ishida et al. | |
| 5,002,559 A | 3/1991 | Tower | |
| 5,007,896 A | 4/1991 | Shiber | |
| 5,026,366 A | 6/1991 | Leckrone | |
| 5,032,128 A | 7/1991 | Alonso | |
| 5,037,434 A | 8/1991 | Lane | |
| 5,047,041 A | 9/1991 | Samuels | |
| 5,064,435 A | 11/1991 | Porter | |
| 5,080,668 A | 1/1992 | Bolz et al. | |
| 5,085,635 A | 2/1992 | Cragg | |
| 5,089,015 A | 2/1992 | Ross | |
| 5,122,154 A | 6/1992 | Rhodes | |
| 5,132,473 A | 7/1992 | Furutaka et al. | |
| 5,141,494 A | 8/1992 | Danforth et al. | |
| 5,152,771 A | 10/1992 | Sabbaghian et al. | |
| 5,159,937 A | 11/1992 | Tremulis | |
| 5,161,547 A | 11/1992 | Tower | |
| 5,163,953 A | 11/1992 | Vince | |
| 5,167,628 A | 12/1992 | Boyles | |
| 5,209,741 A | 5/1993 | Spaeth | |
| 5,215,541 A | 6/1993 | Nashef et al. | |
| 5,217,481 A | 6/1993 | Barbara | |
| 5,217,483 A | 6/1993 | Tower | |
| 5,238,004 A | 8/1993 | Sahatjian et al. | |
| 5,258,023 A | 11/1993 | Reger | |
| 5,258,042 A | 11/1993 | Mehta | |
| 5,282,847 A | 2/1994 | Trescony et al. | |
| 5,295,958 A | 3/1994 | Shturman | |
| 5,332,402 A | 7/1994 | Teitelbaum | |
| 5,336,258 A | 8/1994 | Quintero et al. | |
| 5,350,398 A | 9/1994 | Pavcnik et al. | |
| 5,360,444 A | 11/1994 | Kusuhara | |
| 5,370,685 A | 12/1994 | Stevens | |
| 5,377,682 A | 1/1995 | Ueno et al. | |
| 5,389,106 A | 2/1995 | Tower | |
| 5,397,351 A | 3/1995 | Pavcnik et al. | |
| 5,409,019 A | 4/1995 | Wilk | |
| 5,411,552 A | 5/1995 | Andersen et al. | |
| 5,425,739 A | 6/1995 | Jessen | |
| 5,425,762 A | 6/1995 | Muller | |
| 5,431,676 A | 7/1995 | Dubrul et al. | |
| 5,443,446 A | 8/1995 | Shturman | |
| 5,443,449 A | 8/1995 | Buelna | |
| 5,443,477 A | 8/1995 | Marin et al. | |
| 5,443,495 A | 8/1995 | Buscemi et al. | |

(56) References Cited

U.S. PATENT DOCUMENTS

| | | |
|---|---|---|
| 5,443,499 A | 8/1995 | Schmitt |
| 5,469,868 A | 11/1995 | Reger |
| 5,476,506 A | 12/1995 | Lunn |
| 5,476,510 A | 12/1995 | Eberhardt et al. |
| 5,480,423 A | 1/1996 | Ravenscroft et al. |
| 5,480,424 A | 1/1996 | Cox |
| 5,489,297 A | 2/1996 | Duran |
| 5,500,014 A | 3/1996 | Quijano et al. |
| 5,507,767 A | 4/1996 | Maeda et al. |
| 5,522,881 A | 6/1996 | Lentz |
| 5,534,007 A | 7/1996 | Germain et al. |
| 5,545,133 A | 8/1996 | Burns et al. |
| 5,545,209 A | 8/1996 | Roberts et al. |
| 5,545,211 A | 8/1996 | An et al. |
| 5,545,214 A | 8/1996 | Stevens |
| 5,549,665 A | 8/1996 | Vesely et al. |
| 5,554,185 A | 9/1996 | Block et al. |
| 5,571,175 A | 11/1996 | Vanney et al. |
| 5,571,215 A | 11/1996 | Sterman et al. |
| 5,573,520 A | 11/1996 | Schwartz et al. |
| 5,575,818 A | 11/1996 | Pinchuk |
| 5,591,185 A | 1/1997 | Kilmer et al. |
| 5,591,195 A | 1/1997 | Taheri et al. |
| 5,607,464 A | 3/1997 | Trescony et al. |
| 5,609,626 A | 3/1997 | Quijano et al. |
| 5,628,784 A | 5/1997 | Strecker |
| 5,645,559 A | 7/1997 | Hachtman et al. |
| 5,653,745 A | 8/1997 | Trescony et al. |
| 5,662,671 A | 9/1997 | Barbut et al. |
| 5,667,523 A | 9/1997 | Bynon et al. |
| 5,674,277 A | 10/1997 | Freitag |
| 5,681,345 A | 10/1997 | Euteneuer |
| 5,693,083 A | 12/1997 | Baker et al. |
| 5,693,088 A | 12/1997 | Lazarus |
| 5,693,310 A | 12/1997 | Gries et al. |
| 5,695,498 A | 12/1997 | Tower |
| 5,709,713 A | 1/1998 | Evans et al. |
| 5,713,951 A | 2/1998 | Garrison et al. |
| 5,713,953 A | 2/1998 | Vallana et al. |
| 5,716,370 A | 2/1998 | Williamson et al. |
| 5,716,417 A | 2/1998 | Girard et al. |
| 5,720,391 A | 2/1998 | Dohm et al. |
| 5,725,549 A | 3/1998 | Lam |
| 5,728,068 A | 3/1998 | Leone et al. |
| 5,733,325 A | 3/1998 | Robinson et al. |
| 5,735,842 A | 4/1998 | Krueger et al. |
| 5,749,890 A | 5/1998 | Shaknovich |
| 5,755,783 A | 5/1998 | Stobie et al. |
| 5,756,476 A | 5/1998 | Epstein et al. |
| 5,769,812 A * | 6/1998 | Stevens ............. A61M 25/0662 604/509 |
| 5,769,882 A | 6/1998 | Fogarty et al. |
| 5,772,609 A | 6/1998 | Nguyen et al. |
| 5,776,188 A | 7/1998 | Shepherd et al. |
| 5,782,904 A | 7/1998 | White et al. |
| 5,800,456 A | 9/1998 | Maeda et al. |
| 5,800,531 A | 9/1998 | Cosgrove et al. |
| 5,807,405 A | 9/1998 | Vanney et al. |
| 5,817,126 A | 10/1998 | Imran |
| 5,824,037 A | 10/1998 | Fogarty et al. |
| 5,824,041 A | 10/1998 | Lenker et al. |
| 5,824,043 A | 10/1998 | Cottone |
| 5,824,053 A | 10/1998 | Khosravi et al. |
| 5,824,055 A | 10/1998 | Spiridigliozzi et al. |
| 5,824,056 A | 10/1998 | Rosenberg |
| 5,824,064 A | 10/1998 | Taheri |
| 5,827,237 A * | 10/1998 | Macoviak .......... A61M 25/0075 604/249 |
| 5,840,081 A | 11/1998 | Andersen et al. |
| 5,843,158 A | 12/1998 | Lenker et al. |
| 5,843,161 A | 12/1998 | Solovay |
| 5,855,597 A | 1/1999 | Jayaraman |
| 5,855,601 A | 1/1999 | Bessler et al. |
| 5,855,602 A | 1/1999 | Angell |
| 5,860,966 A | 1/1999 | Tower |
| 5,860,996 A | 1/1999 | Urban et al. |
| 5,861,024 A | 1/1999 | Rashidi |
| 5,861,028 A | 1/1999 | Angell |
| 5,868,783 A | 2/1999 | Tower |
| 5,876,419 A | 3/1999 | Carpenter et al. |
| 5,876,448 A | 3/1999 | Thompson et al. |
| 5,885,228 A | 3/1999 | Rosenman et al. |
| 5,888,201 A | 3/1999 | Stinson et al. |
| 5,891,191 A | 4/1999 | Stinson |
| 5,895,399 A | 4/1999 | Barbut et al. |
| 5,906,590 A | 5/1999 | Hunjan et al. |
| 5,906,619 A | 5/1999 | Olson et al. |
| 5,907,893 A | 6/1999 | Zadno-Azizi et al. |
| 5,910,154 A | 6/1999 | Tsugita et al. |
| 5,911,734 A | 6/1999 | Tsugita et al. |
| 5,916,193 A * | 6/1999 | Stevens ............... A61M 1/3653 604/509 |
| 5,925,063 A | 7/1999 | Khosravi |
| 5,944,738 A | 8/1999 | Amplatz et al. |
| 5,954,766 A | 9/1999 | Zadno-Azizi et al. |
| 5,957,949 A | 9/1999 | Leonhardt et al. |
| 5,968,070 A | 10/1999 | Bley et al. |
| 5,984,957 A | 11/1999 | Laptewicz et al. |
| 5,984,959 A | 11/1999 | Robertson et al. |
| 5,993,469 A | 11/1999 | McKenzie et al. |
| 5,997,557 A | 12/1999 | Barbut et al. |
| 6,010,522 A | 1/2000 | Barbut et al. |
| 6,015,431 A | 1/2000 | Thornton et al. |
| 6,022,370 A | 2/2000 | Tower |
| 6,027,520 A | 2/2000 | Tsugita et al. |
| 6,027,525 A | 2/2000 | Suh et al. |
| 6,042,598 A | 3/2000 | Tsugita et al. |
| 6,042,607 A | 3/2000 | Williamson et al. |
| 6,051,014 A | 4/2000 | Jang |
| 6,059,757 A * | 5/2000 | Macoviak ......... A61M 25/0075 604/247 |
| 6,059,827 A | 5/2000 | Fenton |
| 6,074,418 A | 6/2000 | Buchanan et al. |
| 6,093,203 A | 7/2000 | Uflacker |
| 6,096,074 A | 8/2000 | Pedros |
| 6,110,198 A | 8/2000 | Fogarty et al. |
| 6,123,723 A | 9/2000 | Konya et al. |
| 6,132,473 A | 10/2000 | Williams et al. |
| 6,139,510 A | 10/2000 | Palermo |
| 6,142,987 A | 11/2000 | Tsugita |
| 6,146,366 A | 11/2000 | Schachar |
| 6,162,245 A | 12/2000 | Jayaraman |
| 6,165,200 A | 12/2000 | Tsugita et al. |
| 6,165,209 A | 12/2000 | Patterson et al. |
| 6,168,579 B1 | 1/2001 | Tsugita |
| 6,168,614 B1 | 1/2001 | Andersen et al. |
| 6,171,327 B1 | 1/2001 | Daniel et al. |
| 6,171,335 B1 | 1/2001 | Wheatley et al. |
| 6,179,859 B1 | 1/2001 | Bates et al. |
| 6,187,016 B1 | 2/2001 | Hedges et al. |
| 6,197,053 B1 | 3/2001 | Cosgrove et al. |
| 6,200,336 B1 | 3/2001 | Pavcnik et al. |
| 6,206,911 B1 | 3/2001 | Milo |
| 6,214,036 B1 | 4/2001 | Letendre et al. |
| 6,221,006 B1 | 4/2001 | Dubrul et al. |
| 6,221,091 B1 | 4/2001 | Khosravi |
| 6,221,096 B1 | 4/2001 | Aiba et al. |
| 6,221,100 B1 | 4/2001 | Strecker |
| 6,231,544 B1 | 5/2001 | Tsugita et al. |
| 6,231,551 B1 | 5/2001 | Barbut |
| 6,241,757 B1 | 6/2001 | An et al. |
| 6,245,102 B1 | 6/2001 | Jayaraman |
| 6,251,135 B1 | 6/2001 | Stinson et al. |
| 6,258,114 B1 | 7/2001 | Konya et al. |
| 6,258,115 B1 | 7/2001 | Dubrul |
| 6,258,120 B1 | 7/2001 | McKenzie et al. |
| 6,258,129 B1 | 7/2001 | Dybdal et al. |
| 6,267,783 B1 | 7/2001 | Letendre et al. |
| 6,270,513 B1 | 8/2001 | Tsugita et al. |
| 6,277,555 B1 | 8/2001 | Duran et al. |
| 6,299,637 B1 | 10/2001 | Shaolian et al. |
| 6,302,906 B1 | 10/2001 | Goicoechea et al. |
| 6,306,164 B1 | 10/2001 | Kujawski |
| 6,309,417 B1 | 10/2001 | Spence et al. |

(56) References Cited

U.S. PATENT DOCUMENTS

| | | |
|---|---|---|
| 6,312,465 B1 | 11/2001 | Griffin et al. |
| 6,319,281 B1 | 11/2001 | Patel |
| 6,327,772 B1 | 12/2001 | Zadno-Azizi et al. |
| 6,336,934 B1 | 1/2002 | Gilson et al. |
| 6,336,937 B1 | 1/2002 | Vonesh et al. |
| 6,338,735 B1 | 1/2002 | Stevens |
| 6,346,116 B1 | 2/2002 | Brooks et al. |
| 6,348,063 B1 | 2/2002 | Yassour et al. |
| 6,352,554 B2 | 3/2002 | Paulis |
| 6,352,708 B1 | 3/2002 | Duran et al. |
| 6,361,545 B1 | 3/2002 | Macoviak et al. |
| 6,363,938 B2 | 4/2002 | Saadat et al. |
| 6,364,895 B1 | 4/2002 | Greenhalgh |
| 6,371,970 B1 | 4/2002 | Khosravi et al. |
| 6,371,983 B1 | 4/2002 | Lane |
| 6,379,383 B1 | 4/2002 | Palmaz et al. |
| 6,387,122 B1 | 5/2002 | Cragg |
| 6,398,807 B1 | 6/2002 | Chouinard et al. |
| 6,402,736 B1 | 6/2002 | Brown et al. |
| 6,409,750 B1 | 6/2002 | Hyodoh et al. |
| 6,416,510 B1 | 7/2002 | Altman et al. |
| 6,425,916 B1 | 7/2002 | Garrison et al. |
| 6,440,164 B1 | 8/2002 | DiMatteo et al. |
| 6,454,799 B1 | 9/2002 | Schreck |
| 6,458,153 B1 | 10/2002 | Bailey et al. |
| 6,461,382 B1 | 10/2002 | Cao |
| 6,468,303 B1 | 10/2002 | Amplatz et al. |
| 6,468,660 B2 | 10/2002 | Ogle et al. |
| 6,475,239 B1 | 11/2002 | Campbell et al. |
| 6,482,228 B1 | 11/2002 | Norred |
| 6,485,501 B1 | 11/2002 | Green |
| 6,485,502 B2 | 11/2002 | Michael et al. |
| 6,488,704 B1 | 12/2002 | Connelly et al. |
| 6,494,909 B2 | 12/2002 | Greenhalgh |
| 6,503,272 B2 | 1/2003 | Duerig et al. |
| 6,506,145 B1 | 1/2003 | Bradshaw et al. |
| 6,508,803 B1 | 1/2003 | Horikawa et al. |
| 6,508,833 B2 | 1/2003 | Pavcnik et al. |
| 6,527,800 B1 | 3/2003 | McGuckin et al. |
| 6,530,949 B2 | 3/2003 | Konya et al. |
| 6,530,952 B2 | 3/2003 | Vesely |
| 6,537,297 B2 | 3/2003 | Tsugita et al. |
| 6,540,768 B1 | 4/2003 | Diaz et al. |
| 6,540,782 B1 | 4/2003 | Snyders |
| 6,562,058 B2 | 5/2003 | Seguin et al. |
| 6,569,196 B1 | 5/2003 | Vesely |
| 6,572,643 B1 | 6/2003 | Gharibadeh |
| 6,585,766 B1 | 7/2003 | Huynh et al. |
| 6,592,546 B1 | 7/2003 | Barbut et al. |
| 6,592,567 B1 | 7/2003 | Levin et al. |
| 6,592,614 B2 | 7/2003 | Lenker et al. |
| 6,605,112 B1 | 8/2003 | Moll et al. |
| 6,610,077 B1 | 8/2003 | Hancock et al. |
| 6,616,682 B2 | 9/2003 | Joergensen et al. |
| 6,622,604 B1 | 9/2003 | Chouinard et al. |
| 6,623,518 B2 | 9/2003 | Thompson et al. |
| 6,623,521 B2 | 9/2003 | Steinke et al. |
| 6,626,938 B1 | 9/2003 | Butaric et al. |
| 6,632,243 B1 | 10/2003 | Zadno-Azizi et al. |
| 6,635,068 B1 | 10/2003 | Dubrul et al. |
| 6,635,079 B2 | 10/2003 | Unsworth et al. |
| 6,635,080 B1 | 10/2003 | Lauterjung et al. |
| 6,652,571 B1 | 11/2003 | White et al. |
| 6,652,578 B2 | 11/2003 | Bailey et al. |
| 6,663,588 B2 | 12/2003 | DuBois et al. |
| 6,663,663 B2 | 12/2003 | Kim et al. |
| 6,663,667 B2 | 12/2003 | Dehdashtian et al. |
| 6,669,724 B2 | 12/2003 | Park et al. |
| 6,673,089 B1 | 1/2004 | Yassour et al. |
| 6,673,109 B2 | 1/2004 | Cox |
| 6,676,668 B2 | 1/2004 | Mercereau et al. |
| 6,676,692 B2 | 1/2004 | Rabkin et al. |
| 6,676,698 B2 | 1/2004 | McGuckin et al. |
| 6,682,543 B2 | 1/2004 | Barbut et al. |
| 6,682,558 B2 | 1/2004 | Tu et al. |
| 6,682,559 B2 | 1/2004 | Myers et al. |
| 6,685,739 B2 | 2/2004 | DiMatteo et al. |
| 6,689,144 B2 | 2/2004 | Gerberding |
| 6,689,164 B1 | 2/2004 | Seguin |
| 6,692,512 B2 | 2/2004 | Jang |
| 6,695,864 B2 | 2/2004 | Macoviak et al. |
| 6,695,865 B2 | 2/2004 | Boyle et al. |
| 6,702,851 B1 | 3/2004 | Chinn et al. |
| 6,712,842 B1 | 3/2004 | Gifford et al. |
| 6,712,843 B2 | 3/2004 | Elliott |
| 6,714,842 B1 | 3/2004 | Ito |
| 6,719,789 B2 | 4/2004 | Cox |
| 6,723,116 B2 | 4/2004 | Taheri |
| 6,729,356 B1 | 5/2004 | Baker et al. |
| 6,730,118 B2 | 5/2004 | Spenser et al. |
| 6,730,377 B2 | 5/2004 | Wang |
| 6,733,525 B2 | 5/2004 | Yang et al. |
| 6,736,846 B2 | 5/2004 | Cox |
| 6,752,828 B2 | 6/2004 | Thornton |
| 6,755,854 B2 | 6/2004 | Gillick et al. |
| 6,758,855 B2 | 7/2004 | Fulton et al. |
| 6,764,503 B1 | 7/2004 | Ishimaru |
| 6,764,509 B2 | 7/2004 | Chinn et al. |
| 6,767,345 B2 | 7/2004 | Germain et al. |
| 6,769,434 B2 | 8/2004 | Liddicoat et al. |
| 6,773,454 B2 | 8/2004 | Wholey et al. |
| 6,773,456 B1 | 8/2004 | Gordon et al. |
| 6,776,791 B1 | 8/2004 | Stallings et al. |
| 6,786,925 B1 | 9/2004 | Schoon et al. |
| 6,790,229 B1 | 9/2004 | Berreklouw |
| 6,790,230 B2 | 9/2004 | Beyersdorf et al. |
| 6,790,237 B2 | 9/2004 | Stinson |
| 6,792,979 B2 | 9/2004 | Konya et al. |
| 6,797,002 B2 | 9/2004 | Spence et al. |
| 6,814,746 B2 | 11/2004 | Thompson et al. |
| 6,814,754 B2 | 11/2004 | Greenhalgh |
| 6,821,297 B2 | 11/2004 | Snyders |
| 6,824,041 B2 | 11/2004 | Grieder et al. |
| 6,830,585 B1 | 12/2004 | Artof et al. |
| 6,837,901 B2 | 1/2005 | Rabkin et al. |
| 6,840,957 B2 | 1/2005 | DiMatteo et al. |
| 6,843,802 B1 | 1/2005 | Villalobos et al. |
| 6,849,085 B2 | 2/2005 | Marton |
| 6,855,137 B2 | 2/2005 | Bon |
| 6,863,668 B2 | 3/2005 | Gillespie et al. |
| 6,863,688 B2 | 3/2005 | Ralph et al. |
| 6,866,650 B2 * | 3/2005 | Stevens ............... A61M 1/3623 604/102.01 |
| 6,866,669 B2 | 3/2005 | Buzzard et al. |
| 6,872,223 B2 | 3/2005 | Roberts et al. |
| 6,872,226 B2 | 3/2005 | Cali et al. |
| 6,875,231 B2 | 4/2005 | Anduiza et al. |
| 6,881,220 B2 | 4/2005 | Edwin et al. |
| 6,887,266 B2 | 5/2005 | Williams et al. |
| 6,890,340 B2 | 5/2005 | Duane |
| 6,893,459 B1 | 5/2005 | Macoviak |
| 6,893,460 B2 | 5/2005 | Spenser et al. |
| 6,896,690 B1 | 5/2005 | Lambrecht et al. |
| 6,905,743 B1 | 6/2005 | Chen et al. |
| 6,908,481 B2 | 6/2005 | Cribier |
| 6,911,036 B2 | 6/2005 | Douk et al. |
| 6,911,040 B2 | 6/2005 | Johnson et al. |
| 6,911,043 B2 | 6/2005 | Myers et al. |
| 6,936,058 B2 | 8/2005 | Forde et al. |
| 6,936,067 B2 | 8/2005 | Buchanan |
| 6,939,352 B2 | 9/2005 | Buzzard et al. |
| 6,951,571 B1 | 10/2005 | Srivastava |
| 6,953,332 B1 | 10/2005 | Kurk et al. |
| 6,964,673 B2 | 11/2005 | Tsugita et al. |
| 6,969,395 B2 | 11/2005 | Eskuri |
| 6,972,025 B2 | 12/2005 | WasDyke |
| 6,974,464 B2 | 12/2005 | Quijano et al. |
| 6,974,474 B2 | 12/2005 | Pavcnik et al. |
| 6,974,476 B2 | 12/2005 | McGuckin et al. |
| 6,979,350 B2 | 12/2005 | Moll et al. |
| 6,984,242 B2 | 1/2006 | Campbell et al. |
| 6,989,027 B2 | 1/2006 | Allen et al. |
| 7,004,176 B2 | 2/2006 | Lau |
| 7,011,681 B2 | 3/2006 | Vesely |

(56) References Cited

U.S. PATENT DOCUMENTS

| | | | |
|---|---|---|---|
| 7,018,406 B2 | 3/2006 | Seguin et al. |
| 7,025,791 B2 | 4/2006 | Levine et al. |
| 7,037,331 B2 | 5/2006 | Mitelberg et al. |
| 7,041,132 B2 | 5/2006 | Quijano et al. |
| 7,044,966 B2 | 5/2006 | Svanidze et al. |
| 7,097,658 B2 | 8/2006 | Oktay |
| 7,108,715 B2 | 9/2006 | Lawrence-Brown et al. |
| 7,122,020 B2 | 10/2006 | Mogul |
| 7,125,418 B2 | 10/2006 | Duran et al. |
| 7,141,063 B2 | 11/2006 | White et al. |
| 7,147,663 B1 | 12/2006 | Berg et al. |
| 7,166,097 B2 | 1/2007 | Barbut |
| 7,175,652 B2 | 2/2007 | Cook et al. |
| 7,175,653 B2 | 2/2007 | Gaber |
| 7,175,654 B2 | 2/2007 | Bonsignore et al. |
| 7,175,656 B2 | 2/2007 | Khairkhahan |
| 7,189,258 B2 | 3/2007 | Johnson et al. |
| 7,191,018 B2 | 3/2007 | Gielen et al. |
| 7,201,772 B2 | 4/2007 | Schwammenthal et al. |
| 7,235,093 B2 | 6/2007 | Gregorich |
| 7,252,682 B2 | 8/2007 | Seguin |
| 7,258,696 B2 | 8/2007 | Rabkin et al. |
| 7,261,732 B2 | 8/2007 | Justino |
| 7,264,632 B2 | 9/2007 | Wright et al. |
| 7,267,686 B2 | 9/2007 | DiMatteo et al. |
| 7,276,078 B2 | 10/2007 | Spenser et al. |
| 7,322,932 B2 | 1/2008 | Xie et al. |
| 7,326,236 B2 | 2/2008 | Andreas et al. |
| 7,329,279 B2 | 2/2008 | Haug et al. |
| 7,331,993 B2 | 2/2008 | White |
| 7,374,560 B2 | 5/2008 | Ressemann et al. |
| 7,381,219 B2 | 6/2008 | Salahieh et al. |
| 7,381,220 B2 | 6/2008 | Macoviak et al. |
| 7,399,315 B2 | 7/2008 | Iobbi |
| 7,445,631 B2 | 11/2008 | Salahieh et al. |
| 7,470,285 B2 | 12/2008 | Nugent et al. |
| 7,491,232 B2 | 2/2009 | Bolduc et al. |
| 7,510,574 B2 | 3/2009 | Lê et al. |
| 7,524,330 B2 | 4/2009 | Berreklouw |
| 7,530,995 B2 | 5/2009 | Quijano et al. |
| 7,544,206 B2 | 6/2009 | Cohn |
| 7,622,276 B2 | 11/2009 | Cunanan et al. |
| 7,628,803 B2 | 12/2009 | Pavcnik et al. |
| 7,632,298 B2 | 12/2009 | Hijlkema et al. |
| 7,641,687 B2 | 1/2010 | Chinn et al. |
| 7,674,282 B2 | 3/2010 | Wu et al. |
| 7,712,606 B2 | 5/2010 | Salahieh et al. |
| 7,722,638 B2 | 5/2010 | Deyette et al. |
| 7,722,662 B2 | 5/2010 | Steinke et al. |
| 7,722,666 B2 | 5/2010 | Lafontaine |
| 7,731,742 B2 | 6/2010 | Schlick et al. |
| 7,736,388 B2 | 6/2010 | Goldfarb et al. |
| 7,748,389 B2 | 7/2010 | Salahieh et al. |
| 7,758,625 B2 | 7/2010 | Wu et al. |
| 7,780,725 B2 | 8/2010 | Haug et al. |
| 7,799,065 B2 | 9/2010 | Pappas |
| 7,803,185 B2 | 9/2010 | Gabbay |
| 7,824,442 B2 | 11/2010 | Salahieh et al. |
| 7,824,443 B2 | 11/2010 | Salahieh et al. |
| 7,833,262 B2 | 11/2010 | McGuckin et al. |
| 7,846,204 B2 | 12/2010 | Letac et al. |
| 7,857,845 B2 | 12/2010 | Stacchino et al. |
| 7,892,292 B2 | 2/2011 | Stack et al. |
| 7,918,880 B2 | 4/2011 | Austin |
| 7,938,851 B2 | 5/2011 | Olson et al. |
| 7,959,666 B2 | 6/2011 | Salahieh et al. |
| 7,959,672 B2 | 6/2011 | Salahieh et al. |
| 7,988,724 B2 | 8/2011 | Salahieh et al. |
| 8,048,153 B2 | 11/2011 | Salahieh et al. |
| 8,052,749 B2 | 11/2011 | Salahieh et al. |
| 8,133,221 B2 | 3/2012 | Malecki et al. |
| 8,136,659 B2 | 3/2012 | Salahieh et al. |
| 8,157,853 B2 | 4/2012 | Laske et al. |
| 8,172,896 B2 | 5/2012 | McNamara et al. |
| 8,182,528 B2 | 5/2012 | Salahieh et al. |
| 8,192,351 B2 | 6/2012 | Fishler et al. |
| 8,226,710 B2 | 7/2012 | Nguyen et al. |
| 8,231,670 B2 | 7/2012 | Salahieh et al. |
| 8,236,049 B2 | 8/2012 | Rowe et al. |
| 8,246,678 B2 | 8/2012 | Salahieh et al. |
| 8,252,051 B2 | 8/2012 | Chau et al. |
| 8,252,052 B2 | 8/2012 | Salahieh et al. |
| 8,287,584 B2 | 10/2012 | Salahieh et al. |
| 8,308,798 B2 | 11/2012 | Pintor et al. |
| 8,317,858 B2 | 11/2012 | Straubinger et al. |
| 8,323,335 B2 | 12/2012 | Rowe et al. |
| 8,328,868 B2 | 12/2012 | Paul et al. |
| 8,343,213 B2 | 1/2013 | Salahieh et al. |
| 8,376,865 B2 | 2/2013 | Forster et al. |
| 8,377,117 B2 | 2/2013 | Keidar et al. |
| 8,398,708 B2 | 3/2013 | Meiri et al. |
| 8,403,983 B2 | 3/2013 | Quadri et al. |
| 8,414,644 B2 | 4/2013 | Quadri et al. |
| 8,579,962 B2 | 11/2013 | Salahieh et al. |
| 8,603,160 B2 | 12/2013 | Salahieh et al. |
| 8,617,236 B2 | 12/2013 | Paul et al. |
| 8,623,074 B2 | 1/2014 | Ryan |
| 8,623,076 B2 | 1/2014 | Salahieh et al. |
| 8,623,078 B2 | 1/2014 | Salahieh et al. |
| 8,668,733 B2 | 3/2014 | Haug et al. |
| 8,696,743 B2 | 4/2014 | Holecek et al. |
| 8,828,078 B2 | 9/2014 | Salahieh et al. |
| 8,840,662 B2 | 9/2014 | Salahieh et al. |
| 8,840,663 B2 | 9/2014 | Salahieh et al. |
| 8,858,620 B2 | 10/2014 | Salahieh et al. |
| 8,894,703 B2 | 11/2014 | Salahieh et al. |
| 8,951,299 B2 | 2/2015 | Paul et al. |
| 8,992,608 B2 | 3/2015 | Haug et al. |
| 9,005,273 B2 | 4/2015 | Salahieh et al. |
| 9,011,521 B2 | 4/2015 | Haug et al. |
| 9,168,131 B2 | 10/2015 | Yohanan et al. |
| 9,326,855 B2 * | 5/2016 | Wang ................ A61F 2/2427 |
| 9,883,886 B2 | 2/2018 | Shturman |
| 10,238,492 B2 * | 3/2019 | Drasler ................ A61F 2/246 |
| 10,258,468 B2 * | 4/2019 | Deem .................. A61F 2/243 |
| 10,292,818 B2 * | 5/2019 | Astarci ............ A61B 17/3205 |
| 10,405,867 B2 | 9/2019 | Johnson |
| 10,405,880 B2 | 9/2019 | Schneider et al. |
| 10,537,306 B2 * | 1/2020 | Schaer ................ A61B 1/0008 |
| 10,743,906 B2 | 8/2020 | Schneider |
| 10,758,347 B2 * | 9/2020 | Kheradvar ............ A61F 2/243 |
| 10,945,838 B2 * | 3/2021 | Matheny .............. A61F 2/2409 |
| 11,690,708 B2 * | 7/2023 | Patel .................. A61F 2/2409 |
| | | | 623/2.11 |
| 2001/0002445 A1 | 5/2001 | Vesely |
| 2001/0007956 A1 | 7/2001 | Letac et al. |
| 2001/0010017 A1 | 7/2001 | Letac et al. |
| 2001/0021872 A1 | 9/2001 | Bailey et al. |
| 2001/0025196 A1 | 9/2001 | Chinn et al. |
| 2001/0027338 A1 | 10/2001 | Greenberg |
| 2001/0032013 A1 | 10/2001 | Marton |
| 2001/0039450 A1 | 11/2001 | Pavcnik et al. |
| 2001/0041928 A1 | 11/2001 | Pavcnik et al. |
| 2001/0041930 A1 | 11/2001 | Globerman et al. |
| 2001/0044634 A1 | 11/2001 | Michael et al. |
| 2001/0044652 A1 | 11/2001 | Moore |
| 2001/0044656 A1 | 11/2001 | Williamson et al. |
| 2002/0002396 A1 | 1/2002 | Fulkerson |
| 2002/0010489 A1 | 1/2002 | Grayzel et al. |
| 2002/0026233 A1 | 2/2002 | Shaknovich |
| 2002/0029014 A1 | 3/2002 | Jayaraman |
| 2002/0029981 A1 | 3/2002 | Nigam |
| 2002/0032480 A1 | 3/2002 | Spence et al. |
| 2002/0032481 A1 | 3/2002 | Gabbay |
| 2002/0042651 A1 | 4/2002 | Liddicoat et al. |
| 2002/0052651 A1 | 5/2002 | Myers et al. |
| 2002/0055767 A1 | 5/2002 | Forde et al. |
| 2002/0055769 A1 | 5/2002 | Wang |
| 2002/0055774 A1 | 5/2002 | Liddicoat |
| 2002/0058987 A1 | 5/2002 | Butaric et al. |
| 2002/0058995 A1 | 5/2002 | Stevens |
| 2002/0077696 A1 | 6/2002 | Zadno-Azizi et al. |
| 2002/0082609 A1 | 6/2002 | Green |
| 2002/0095173 A1 | 7/2002 | Mazzocchi et al. |

(56) References Cited

U.S. PATENT DOCUMENTS

| | | |
|---|---|---|
| 2002/0095209 A1 | 7/2002 | Zadno-Azizi et al. |
| 2002/0111674 A1 | 8/2002 | Chouinard et al. |
| 2002/0120328 A1 | 8/2002 | Pathak et al. |
| 2002/0123802 A1 | 9/2002 | Snyders |
| 2002/0138138 A1 | 9/2002 | Yang |
| 2002/0151970 A1 | 10/2002 | Garrison et al. |
| 2002/0156522 A1 | 10/2002 | Ivancev et al. |
| 2002/0161390 A1 | 10/2002 | Mouw |
| 2002/0161392 A1 | 10/2002 | Dubrul |
| 2002/0161394 A1 | 10/2002 | Macoviak et al. |
| 2002/0165576 A1 | 11/2002 | Boyle et al. |
| 2002/0177766 A1 | 11/2002 | Mogul |
| 2002/0183781 A1 | 12/2002 | Casey et al. |
| 2002/0188341 A1 | 12/2002 | Elliott |
| 2002/0188344 A1 | 12/2002 | Bolea et al. |
| 2002/0193871 A1 | 12/2002 | Beyersdorf et al. |
| 2003/0014104 A1 | 1/2003 | Cribier |
| 2003/0023303 A1 | 1/2003 | Palmaz et al. |
| 2003/0028247 A1 | 2/2003 | Cali |
| 2003/0036791 A1 | 2/2003 | Philipp et al. |
| 2003/0040736 A1 | 2/2003 | Stevens et al. |
| 2003/0040771 A1 | 2/2003 | Hyodoh et al. |
| 2003/0040772 A1 | 2/2003 | Hyodoh et al. |
| 2003/0040791 A1 | 2/2003 | Oktay |
| 2003/0040792 A1 | 2/2003 | Gabbay |
| 2003/0050694 A1 | 3/2003 | Yang et al. |
| 2003/0055495 A1 | 3/2003 | Pease et al. |
| 2003/0057156 A1 | 3/2003 | Peterson et al. |
| 2003/0060844 A1 | 3/2003 | Borillo et al. |
| 2003/0069492 A1 | 4/2003 | Abrams et al. |
| 2003/0069646 A1 | 4/2003 | Stinson |
| 2003/0070944 A1 | 4/2003 | Nigam |
| 2003/0074058 A1 | 4/2003 | Sherry |
| 2003/0093145 A1 | 5/2003 | Lawrence-Brown et al. |
| 2003/0100918 A1 | 5/2003 | Duane |
| 2003/0100919 A1 | 5/2003 | Hopkins et al. |
| 2003/0109924 A1 | 6/2003 | Cribier |
| 2003/0109930 A1 | 6/2003 | Bluni et al. |
| 2003/0114912 A1 | 6/2003 | Sequin et al. |
| 2003/0114913 A1 | 6/2003 | Spenser et al. |
| 2003/0125795 A1 | 7/2003 | Pavcnik et al. |
| 2003/0130729 A1 | 7/2003 | Paniagua et al. |
| 2003/0135257 A1 | 7/2003 | Taheri |
| 2003/0144732 A1 | 7/2003 | Cosgrove et al. |
| 2003/0149475 A1 | 8/2003 | Hyodoh et al. |
| 2003/0149476 A1 | 8/2003 | Damm et al. |
| 2003/0149478 A1 | 8/2003 | Figulla et al. |
| 2003/0153974 A1 | 8/2003 | Spenser et al. |
| 2003/0165352 A1 | 9/2003 | Ibrahim et al. |
| 2003/0171803 A1 | 9/2003 | Shimon |
| 2003/0176884 A1 | 9/2003 | Berrada et al. |
| 2003/0181850 A1 | 9/2003 | Diamond et al. |
| 2003/0187495 A1 | 10/2003 | Cully et al. |
| 2003/0191516 A1 | 10/2003 | Weldon et al. |
| 2003/0195609 A1 | 10/2003 | Berenstein et al. |
| 2003/0199759 A1 | 10/2003 | Richard |
| 2003/0199913 A1 | 10/2003 | Dubrul et al. |
| 2003/0199971 A1 | 10/2003 | Tower et al. |
| 2003/0199972 A1 | 10/2003 | Zadno-Azizi et al. |
| 2003/0204249 A1 | 10/2003 | Letort |
| 2003/0208224 A1 | 11/2003 | Broome |
| 2003/0212429 A1 | 11/2003 | Keegan et al. |
| 2003/0212452 A1 | 11/2003 | Zadno-Azizi et al. |
| 2003/0212454 A1 | 11/2003 | Scott et al. |
| 2003/0216774 A1 | 11/2003 | Larson |
| 2003/0225445 A1 | 12/2003 | Derus et al. |
| 2003/0229390 A1 | 12/2003 | Ashton et al. |
| 2003/0233117 A1 | 12/2003 | Adams et al. |
| 2003/0236567 A1 | 12/2003 | Elliot |
| 2004/0019374 A1 | 1/2004 | Hojeibane et al. |
| 2004/0033364 A1 | 2/2004 | Spiridigliozzi et al. |
| 2004/0034411 A1 | 2/2004 | Quijano et al. |
| 2004/0039436 A1 | 2/2004 | Spenser et al. |
| 2004/0049224 A1 | 3/2004 | Buehlmann et al. |
| 2004/0049226 A1 | 3/2004 | Keegan et al. |
| 2004/0049262 A1 | 3/2004 | Obermiller et al. |
| 2004/0049266 A1 | 3/2004 | Anduiza et al. |
| 2004/0059409 A1 | 3/2004 | Stenzel |
| 2004/0073198 A1 | 4/2004 | Gilson et al. |
| 2004/0082904 A1 | 4/2004 | Houde et al. |
| 2004/0082967 A1 | 4/2004 | Broome et al. |
| 2004/0082989 A1 | 4/2004 | Cook et al. |
| 2004/0087982 A1 | 5/2004 | Eskuri |
| 2004/0088045 A1 | 5/2004 | Cox |
| 2004/0093016 A1 | 5/2004 | Root et al. |
| 2004/0093060 A1 | 5/2004 | Seguin et al. |
| 2004/0097788 A1 | 5/2004 | Mourlas et al. |
| 2004/0098022 A1 | 5/2004 | Barone |
| 2004/0098098 A1 | 5/2004 | McGuckin et al. |
| 2004/0098099 A1 | 5/2004 | McCullagh et al. |
| 2004/0098112 A1 | 5/2004 | DiMatteo et al. |
| 2004/0107004 A1 | 6/2004 | Levine et al. |
| 2004/0111096 A1 | 6/2004 | Tu et al. |
| 2004/0116951 A1 | 6/2004 | Rosengart |
| 2004/0116999 A1 | 6/2004 | Ledergerber |
| 2004/0117004 A1 | 6/2004 | Osborne et al. |
| 2004/0117009 A1 | 6/2004 | Cali et al. |
| 2004/0122468 A1 | 6/2004 | Yodfat et al. |
| 2004/0122516 A1 | 6/2004 | Fogarty et al. |
| 2004/0127936 A1 | 7/2004 | Salahieh et al. |
| 2004/0127979 A1 | 7/2004 | Wilson et al. |
| 2004/0133274 A1 | 7/2004 | Webler et al. |
| 2004/0138694 A1 | 7/2004 | Tran et al. |
| 2004/0138742 A1 | 7/2004 | Myers et al. |
| 2004/0138743 A1 | 7/2004 | Myers et al. |
| 2004/0148018 A1 | 7/2004 | Carpentier et al. |
| 2004/0148021 A1 | 7/2004 | Cartledge et al. |
| 2004/0153094 A1 | 8/2004 | Dunfee et al. |
| 2004/0158277 A1 | 8/2004 | Lowe et al. |
| 2004/0167565 A1 | 8/2004 | Beulke et al. |
| 2004/0167620 A1 | 8/2004 | Ortiz et al. |
| 2004/0181140 A1 | 9/2004 | Falwell et al. |
| 2004/0186558 A1 | 9/2004 | Pavcnik et al. |
| 2004/0186563 A1 | 9/2004 | Lobbi |
| 2004/0193261 A1 | 9/2004 | Berreklouw |
| 2004/0197695 A1 | 10/2004 | Aono |
| 2004/0199245 A1 | 10/2004 | Lauterjung |
| 2004/0204755 A1 | 10/2004 | Robin |
| 2004/0210304 A1 | 10/2004 | Seguin et al. |
| 2004/0210306 A1 | 10/2004 | Quijano et al. |
| 2004/0210307 A1 | 10/2004 | Khairkhahan |
| 2004/0215331 A1 | 10/2004 | Chew et al. |
| 2004/0215333 A1 | 10/2004 | Duran et al. |
| 2004/0215339 A1 | 10/2004 | Drasler et al. |
| 2004/0220655 A1 | 11/2004 | Swanson et al. |
| 2004/0225321 A1 | 11/2004 | Krolik et al. |
| 2004/0225353 A1 | 11/2004 | McGuckin et al. |
| 2004/0225354 A1 | 11/2004 | Allen et al. |
| 2004/0225355 A1 | 11/2004 | Stevens |
| 2004/0243221 A1 | 12/2004 | Fawzi et al. |
| 2004/0254636 A1 | 12/2004 | Flagle et al. |
| 2004/0260390 A1 | 12/2004 | Sarac et al. |
| 2005/0010287 A1 | 1/2005 | Macoviak et al. |
| 2005/0021136 A1 | 1/2005 | Xie et al. |
| 2005/0033398 A1 | 2/2005 | Seguin |
| 2005/0033402 A1 | 2/2005 | Cully et al. |
| 2005/0043711 A1 | 2/2005 | Corcoran et al. |
| 2005/0043757 A1 | 2/2005 | Arad et al. |
| 2005/0043790 A1 | 2/2005 | Seguin |
| 2005/0049692 A1 | 3/2005 | Numamoto et al. |
| 2005/0049696 A1 | 3/2005 | Siess et al. |
| 2005/0055088 A1 | 3/2005 | Liddicoat et al. |
| 2005/0060016 A1 | 3/2005 | Wu et al. |
| 2005/0060029 A1 | 3/2005 | Le et al. |
| 2005/0065594 A1 | 3/2005 | DiMatteo et al. |
| 2005/0075584 A1 | 4/2005 | Cali |
| 2005/0075662 A1 | 4/2005 | Pedersen et al. |
| 2005/0075712 A1 | 4/2005 | Biancucci et al. |
| 2005/0075717 A1 | 4/2005 | Nguyen et al. |
| 2005/0075719 A1 | 4/2005 | Bergheim |
| 2005/0075724 A1 | 4/2005 | Svanidze et al. |
| 2005/0075730 A1 | 4/2005 | Myers et al. |
| 2005/0075731 A1 | 4/2005 | Artof et al. |
| 2005/0085841 A1 | 4/2005 | Eversull et al. |

(56) References Cited

U.S. PATENT DOCUMENTS

| | | |
|---|---|---|
| 2005/0085842 A1 | 4/2005 | Eversull et al. |
| 2005/0085843 A1 | 4/2005 | Opolski et al. |
| 2005/0085890 A1 | 4/2005 | Rasmussen et al. |
| 2005/0090846 A1 | 4/2005 | Pedersen et al. |
| 2005/0090890 A1 | 4/2005 | Wu et al. |
| 2005/0096692 A1 | 5/2005 | Linder et al. |
| 2005/0096734 A1 | 5/2005 | Majercak et al. |
| 2005/0096735 A1 | 5/2005 | Hojeibane et al. |
| 2005/0096736 A1 | 5/2005 | Osse et al. |
| 2005/0096738 A1 | 5/2005 | Cali et al. |
| 2005/0100580 A1 | 5/2005 | Osborne et al. |
| 2005/0107822 A1 | 5/2005 | WasDyke |
| 2005/0113910 A1 | 5/2005 | Paniagua et al. |
| 2005/0131438 A1 | 6/2005 | Cohn |
| 2005/0137683 A1 | 6/2005 | Hezi-Yamit et al. |
| 2005/0137686 A1 | 6/2005 | Salahieh et al. |
| 2005/0137687 A1 | 6/2005 | Salahieh et al. |
| 2005/0137688 A1 | 6/2005 | Salahieh et al. |
| 2005/0137689 A1 | 6/2005 | Salahieh et al. |
| 2005/0137690 A1 | 6/2005 | Salahieh et al. |
| 2005/0137691 A1 | 6/2005 | Salahieh et al. |
| 2005/0137692 A1 | 6/2005 | Haug et al. |
| 2005/0137693 A1 | 6/2005 | Haug et al. |
| 2005/0137694 A1 | 6/2005 | Haug et al. |
| 2005/0137695 A1 | 6/2005 | Salahieh et al. |
| 2005/0137696 A1 | 6/2005 | Salahieh et al. |
| 2005/0137697 A1 | 6/2005 | Salahieh et al. |
| 2005/0137698 A1 | 6/2005 | Salahieh et al. |
| 2005/0137699 A1 | 6/2005 | Salahieh et al. |
| 2005/0137701 A1 | 6/2005 | Salahieh et al. |
| 2005/0137702 A1 | 6/2005 | Haug et al. |
| 2005/0138689 A1 | 6/2005 | Aukerman |
| 2005/0143807 A1 | 6/2005 | Pavcnik et al. |
| 2005/0143809 A1 | 6/2005 | Salahieh et al. |
| 2005/0149159 A1 | 7/2005 | Andreas et al. |
| 2005/0165352 A1 | 7/2005 | Henry et al. |
| 2005/0165477 A1 | 7/2005 | Anduiza et al. |
| 2005/0165479 A1 | 7/2005 | Drews et al. |
| 2005/0182486 A1 | 8/2005 | Gabbay |
| 2005/0197694 A1 | 9/2005 | Pai et al. |
| 2005/0197695 A1 | 9/2005 | Stacchino et al. |
| 2005/0203549 A1 | 9/2005 | Realyvasquez |
| 2005/0203614 A1 | 9/2005 | Forster et al. |
| 2005/0203615 A1 | 9/2005 | Forster et al. |
| 2005/0203616 A1 | 9/2005 | Cribier |
| 2005/0203617 A1 | 9/2005 | Forster et al. |
| 2005/0203618 A1 | 9/2005 | Sharkawy et al. |
| 2005/0203818 A9 | 9/2005 | Rotman et al. |
| 2005/0209580 A1 | 9/2005 | Freyman |
| 2005/0228472 A1 | 10/2005 | Case et al. |
| 2005/0228495 A1 | 10/2005 | Macoviak |
| 2005/0234546 A1 | 10/2005 | Nugent et al. |
| 2005/0240200 A1 | 10/2005 | Bergheim |
| 2005/0240262 A1 | 10/2005 | White |
| 2005/0251250 A1 | 11/2005 | Verhoeven et al. |
| 2005/0251251 A1 | 11/2005 | Cribier |
| 2005/0261759 A1 | 11/2005 | Lambrecht et al. |
| 2005/0267560 A1 | 12/2005 | Bates |
| 2005/0273006 A1* | 12/2005 | Stewart .............. A61B 18/1492 600/433 |
| 2005/0283231 A1 | 12/2005 | Haug et al. |
| 2005/0283962 A1 | 12/2005 | Boudjemline |
| 2006/0004439 A1 | 1/2006 | Spenser et al. |
| 2006/0004442 A1 | 1/2006 | Spenser et al. |
| 2006/0015168 A1 | 1/2006 | Gunderson |
| 2006/0025857 A1 | 2/2006 | Bergheim et al. |
| 2006/0058872 A1 | 3/2006 | Salahieh et al. |
| 2006/0106298 A1* | 5/2006 | Ahmed .............. A61B 18/1492 606/41 |
| 2006/0149360 A1 | 7/2006 | Schwammenthal et al. |
| 2006/0155312 A1 | 7/2006 | Levine et al. |
| 2006/0161249 A1 | 7/2006 | Realyvasquez et al. |
| 2006/0173524 A1 | 8/2006 | Salahieh et al. |
| 2006/0195183 A1 | 8/2006 | Navia et al. |
| 2006/0253191 A1 | 11/2006 | Salahieh et al. |
| 2006/0259134 A1 | 11/2006 | Schwammenthal et al. |
| 2006/0271166 A1 | 11/2006 | Thill et al. |
| 2006/0287668 A1 | 12/2006 | Fawzi et al. |
| 2006/0287717 A1 | 12/2006 | Rowe et al. |
| 2007/0010876 A1 | 1/2007 | Salahieh et al. |
| 2007/0010877 A1 | 1/2007 | Salahieh et al. |
| 2007/0016286 A1 | 1/2007 | Herrmann et al. |
| 2007/0055340 A1 | 3/2007 | Pryor |
| 2007/0061008 A1 | 3/2007 | Salahieh et al. |
| 2007/0106247 A1* | 5/2007 | Burnett .............. A61M 1/32 604/113 |
| 2007/0112355 A1 | 5/2007 | Salahieh et al. |
| 2007/0118214 A1 | 5/2007 | Salahieh et al. |
| 2007/0142907 A1* | 6/2007 | Moaddeb .............. A61F 2/2469 623/2.37 |
| 2007/0162107 A1 | 7/2007 | Haug et al. |
| 2007/0173918 A1 | 7/2007 | Dreher et al. |
| 2007/0203503 A1 | 8/2007 | Salahieh et al. |
| 2007/0244552 A1 | 10/2007 | Salahieh et al. |
| 2007/0288089 A1 | 12/2007 | Gurskis et al. |
| 2008/0009940 A1 | 1/2008 | Cribier |
| 2008/0033541 A1 | 2/2008 | Gelbart et al. |
| 2008/0071363 A1 | 3/2008 | Tuval et al. |
| 2008/0082165 A1 | 4/2008 | Wilson et al. |
| 2008/0125859 A1 | 5/2008 | Salahieh et al. |
| 2008/0188928 A1 | 8/2008 | Salahieh et al. |
| 2008/0208328 A1 | 8/2008 | Antocci et al. |
| 2008/0208332 A1 | 8/2008 | Lamphere et al. |
| 2008/0221391 A1* | 9/2008 | Weitzner .............. A61B 1/00147 604/524 |
| 2008/0221672 A1 | 9/2008 | Lamphere et al. |
| 2008/0234814 A1 | 9/2008 | Salahieh et al. |
| 2008/0255661 A1 | 10/2008 | Straubinger et al. |
| 2008/0269878 A1 | 10/2008 | Iobbi |
| 2008/0288054 A1 | 11/2008 | Pulnev et al. |
| 2009/0005863 A1 | 1/2009 | Goetz et al. |
| 2009/0030512 A1 | 1/2009 | Thielen et al. |
| 2009/0054969 A1 | 2/2009 | Salahieh et al. |
| 2009/0076598 A1 | 3/2009 | Salahieh et al. |
| 2009/0093877 A1 | 4/2009 | Keidar et al. |
| 2009/0171456 A1 | 7/2009 | Kveen et al. |
| 2009/0204198 A1 | 8/2009 | Jensen et al. |
| 2009/0216312 A1 | 8/2009 | Straubinger et al. |
| 2009/0222076 A1 | 9/2009 | Figulla et al. |
| 2009/0264759 A1 | 10/2009 | Byrd |
| 2009/0264997 A1 | 10/2009 | Salahieh et al. |
| 2009/0299462 A1 | 12/2009 | Fawzi et al. |
| 2010/0036479 A1 | 2/2010 | Hill et al. |
| 2010/0049313 A1 | 2/2010 | Alon et al. |
| 2010/0082089 A1 | 4/2010 | Quadri et al. |
| 2010/0094399 A1 | 4/2010 | Dorn et al. |
| 2010/0121434 A1 | 5/2010 | Paul et al. |
| 2010/0161045 A1 | 6/2010 | Righini |
| 2010/0185275 A1 | 7/2010 | Richter et al. |
| 2010/0191320 A1 | 7/2010 | Straubinger et al. |
| 2010/0191326 A1 | 7/2010 | Alkhatib |
| 2010/0219092 A1 | 9/2010 | Salahieh et al. |
| 2010/0249908 A1 | 9/2010 | Chau et al. |
| 2010/0280495 A1 | 11/2010 | Paul et al. |
| 2010/0298931 A1 | 11/2010 | Quadri et al. |
| 2011/0257735 A1 | 10/2011 | Salahieh et al. |
| 2011/0264196 A1 | 10/2011 | Savage et al. |
| 2011/0276129 A1 | 11/2011 | Salahieh et al. |
| 2011/0288634 A1 | 11/2011 | Tuval et al. |
| 2011/0295363 A1 | 12/2011 | Girard et al. |
| 2012/0016469 A1 | 1/2012 | Salahieh et al. |
| 2012/0016471 A1 | 1/2012 | Salahieh et al. |
| 2012/0022629 A1* | 1/2012 | Perera .............. C08L 63/00 623/1.11 |
| 2012/0022642 A1 | 1/2012 | Haug et al. |
| 2012/0029627 A1 | 2/2012 | Salahieh et al. |
| 2012/0041549 A1 | 2/2012 | Salahieh et al. |
| 2012/0041550 A1 | 2/2012 | Salahieh et al. |
| 2012/0046740 A1 | 2/2012 | Paul et al. |
| 2012/0053683 A1 | 3/2012 | Salahieh et al. |
| 2012/0089224 A1 | 4/2012 | Haug et al. |
| 2012/0132547 A1 | 5/2012 | Salahieh et al. |
| 2012/0179244 A1 | 7/2012 | Schankereli et al. |
| 2012/0197379 A1 | 8/2012 | Laske et al. |

(56) References Cited

U.S. PATENT DOCUMENTS

| | | |
|---|---|---|
| 2012/0303113 A1 | 11/2012 | Benichou et al. |
| 2012/0303116 A1 | 11/2012 | Gorman et al. |
| 2012/0330409 A1 | 12/2012 | Haug et al. |
| 2013/0013057 A1 | 1/2013 | Salahieh et al. |
| 2013/0018457 A1 | 1/2013 | Gregg et al. |
| 2013/0030520 A1 | 1/2013 | Lee et al. |
| 2013/0079867 A1 | 3/2013 | Hoffman et al. |
| 2013/0079869 A1 | 3/2013 | Straubinger et al. |
| 2013/0096664 A1 | 4/2013 | Goetz et al. |
| 2013/0123796 A1 | 5/2013 | Sutton et al. |
| 2013/0138207 A1 | 5/2013 | Quadri et al. |
| 2013/0158656 A1 | 6/2013 | Sutton et al. |
| 2013/0184813 A1 | 7/2013 | Quadri et al. |
| 2013/0190865 A1 | 7/2013 | Anderson |
| 2013/0304199 A1 | 11/2013 | Sutton et al. |
| 2014/0018911 A1 | 1/2014 | Zhou et al. |
| 2014/0094904 A1 | 4/2014 | Salahieh et al. |
| 2014/0114405 A1 | 4/2014 | Paul et al. |
| 2014/0114406 A1 | 4/2014 | Salahieh et al. |
| 2014/0121766 A1 | 5/2014 | Salahieh et al. |
| 2014/0135912 A1 | 5/2014 | Salahieh et al. |
| 2014/0236287 A1* | 8/2014 | Clague ................ A61F 2/2418 623/2.11 |
| 2014/0243967 A1 | 8/2014 | Salahieh et al. |
| 2015/0012085 A1 | 1/2015 | Salahieh et al. |
| 2015/0073540 A1 | 3/2015 | Salahieh et al. |
| 2015/0073541 A1 | 3/2015 | Salahieh et al. |
| 2015/0127094 A1 | 5/2015 | Salahieh et al. |
| 2016/0045307 A1 | 2/2016 | Yohanan et al. |
| 2016/0199184 A1 | 7/2016 | Ma et al. |
| 2017/0157363 A1* | 6/2017 | Barrish ............ A61M 25/0136 |
| 2018/0014840 A1 | 1/2018 | Panian |
| 2018/0049873 A1 | 2/2018 | Manash et al. |
| 2018/0071098 A1* | 3/2018 | Alon ................... A61F 2/2433 |
| 2019/0247050 A1 | 8/2019 | Goldsmith |
| 2024/0245511 A1* | 7/2024 | Becerra ................ A61F 2/2412 |

FOREIGN PATENT DOCUMENTS

| | | |
|---|---|---|
| DE | 19532846 A1 | 3/1997 |
| DE | 19546692 A1 | 6/1997 |
| DE | 19857887 A1 | 7/2000 |
| DE | 19907646 A1 | 8/2000 |
| DE | 10049812 A1 | 4/2002 |
| DE | 10049813 C1 | 4/2002 |
| DE | 10049814 A1 | 4/2002 |
| DE | 10049815 A1 | 4/2002 |
| EP | 0260711 A2 * | 3/1988 ........ A61M 25/0041 |
| EP | 0103546 B1 | 5/1988 |
| EP | 0144167 B1 | 11/1989 |
| EP | 579523 A1 | 1/1994 |
| EP | 0409929 B1 | 4/1997 |
| EP | 0850607 A1 | 7/1998 |
| EP | 0597967 B1 | 12/1999 |
| EP | 1000590 A1 | 5/2000 |
| EP | 1057459 A1 | 12/2000 |
| EP | 1057460 A1 | 12/2000 |
| EP | 1078610 A2 | 2/2001 |
| EP | 1088529 A2 | 4/2001 |
| EP | 0937439 B1 | 9/2003 |
| EP | 1340473 A2 | 9/2003 |
| EP | 1356793 A3 | 3/2004 |
| EP | 1042045 B1 | 5/2004 |
| EP | 0819013 B1 | 6/2004 |
| EP | 1430853 A2 | 6/2004 |
| EP | 1435879 A1 | 7/2004 |
| EP | 1439800 A2 | 7/2004 |
| EP | 1469797 A1 | 10/2004 |
| EP | 1472996 A1 | 11/2004 |
| EP | 1229864 B1 | 4/2005 |
| EP | 1059894 B1 | 7/2005 |
| EP | 1551274 A2 | 7/2005 |
| EP | 1551336 A1 | 7/2005 |
| EP | 1562515 A1 | 8/2005 |
| EP | 1570809 A1 | 9/2005 |
| EP | 1576937 A2 | 9/2005 |
| EP | 1582178 A2 | 10/2005 |
| EP | 1582179 A2 | 10/2005 |
| EP | 1589902 A1 | 11/2005 |
| EP | 1600121 A1 | 11/2005 |
| EP | 1156757 B1 | 12/2005 |
| EP | 1616531 A2 | 1/2006 |
| EP | 1690515 A1 | 8/2006 |
| EP | 1605871 B1 | 7/2008 |
| EP | 2047824 B2 | 5/2012 |
| EP | 2749254 B1 | 6/2015 |
| EP | 2926766 A1 | 10/2015 |
| FR | 2788217 A1 | 7/2000 |
| GB | 2056023 A | 3/1981 |
| GB | 2398245 A | 8/2004 |
| JP | H10510178 A * | 10/1998 |
| SU | 1271508 A1 | 11/1986 |
| SU | 1371700 A1 | 2/1988 |
| WO | 9117720 A1 | 11/1991 |
| WO | WO-9217118 A1 * | 10/1992 ..... A61B 17/320725 |
| WO | 9301768 A1 | 2/1993 |
| WO | 9315693 A1 | 8/1993 |
| WO | 9504556 A2 | 2/1995 |
| WO | 9529640 A1 | 11/1995 |
| WO | 9614032 A1 | 5/1996 |
| WO | 9624306 A1 | 8/1996 |
| WO | 9640012 A1 | 12/1996 |
| WO | 9748350 A1 | 12/1997 |
| WO | WO-9748436 A2 * | 12/1997 ........ A61M 25/0075 |
| WO | 9829057 A1 | 7/1998 |
| WO | 9836790 A1 | 8/1998 |
| WO | 9850103 A1 | 11/1998 |
| WO | 9855047 A1 | 12/1998 |
| WO | 9857599 A2 | 12/1998 |
| WO | 9933414 A1 | 7/1999 |
| WO | 9940964 A1 | 8/1999 |
| WO | 9944542 A2 | 9/1999 |
| WO | 9947075 A1 | 9/1999 |
| WO | 9951165 A1 | 10/1999 |
| WO | 0009059 A2 | 2/2000 |
| WO | 0041652 A1 | 7/2000 |
| WO | 0044308 A2 | 8/2000 |
| WO | 0044311 A2 | 8/2000 |
| WO | 0044313 A1 | 8/2000 |
| WO | 0045874 A1 | 8/2000 |
| WO | 0047139 A1 | 8/2000 |
| WO | 0049970 A1 | 8/2000 |
| WO | 0067661 A2 | 11/2000 |
| WO | 0105331 A1 | 1/2001 |
| WO | 0106959 A1 | 2/2001 |
| WO | 0108596 A1 | 2/2001 |
| WO | 0110320 A1 | 2/2001 |
| WO | 0110343 A1 | 2/2001 |
| WO | 0135870 A1 | 5/2001 |
| WO | 0149213 A2 | 7/2001 |
| WO | 0154625 A1 | 8/2001 |
| WO | 0162189 A1 | 8/2001 |
| WO | 0164137 A1 | 9/2001 |
| WO | 0176510 A2 | 10/2001 |
| WO | 0197715 A1 | 12/2001 |
| WO | 0236048 A1 | 5/2002 |
| WO | 0241789 A2 | 5/2002 |
| WO | 0243620 A1 | 6/2002 |
| WO | 0247575 A2 | 6/2002 |
| WO | 02056955 A1 | 7/2002 |
| WO | 02069842 A1 | 9/2002 |
| WO | 02100297 A2 | 12/2002 |
| WO | 03003943 A2 | 1/2003 |
| WO | 03003949 A2 | 1/2003 |
| WO | 03007222 A1 | 1/2003 |
| WO | 03011195 A2 | 2/2003 |
| WO | 03015851 A1 | 2/2003 |
| WO | 03028592 A1 | 4/2003 |
| WO | 03030776 A2 | 4/2003 |
| WO | 03032869 A1 | 4/2003 |
| WO | 03037222 A2 | 5/2003 |
| WO | 03037227 A2 | 5/2003 |
| WO | 03047468 A1 | 6/2003 |

(56) References Cited

FOREIGN PATENT DOCUMENTS

| | | | |
|---|---|---|---|
| WO | 03047648 A2 | 6/2003 | |
| WO | 03088873 A1 | 10/2003 | |
| WO | 03094793 A1 | 11/2003 | |
| WO | 03094797 A1 | 11/2003 | |
| WO | 03096932 A1 | 11/2003 | |
| WO | 2004006803 A1 | 1/2004 | |
| WO | 2004014256 A1 | 1/2004 | |
| WO | 2004006804 A1 | 2/2004 | |
| WO | 2004019817 A1 | 3/2004 | |
| WO | 2004021922 A2 | 3/2004 | |
| WO | 2004023980 A2 | 3/2004 | |
| WO | 2004019811 A9 | 4/2004 | |
| WO | 2004026117 A2 | 4/2004 | |
| WO | 2004041126 A1 | 5/2004 | |
| WO | 2004043293 A2 | 5/2004 | |
| WO | 2004047681 A1 | 6/2004 | |
| WO | 2004058106 A2 | 8/2004 | |
| WO | 2004066876 A1 | 8/2004 | |
| WO | 2004082536 A1 | 9/2004 | |
| WO | 2004089250 A1 | 10/2004 | |
| WO | 2004089253 A1 | 10/2004 | |
| WO | 2004093728 A2 | 11/2004 | |
| WO | 2004105651 A1 | 12/2004 | |
| WO | 2005002466 A2 | 1/2005 | |
| WO | 2005004753 A1 | 1/2005 | |
| WO | 2005009285 A2 | 2/2005 | |
| WO | 2005011534 A1 | 2/2005 | |
| WO | 2005011535 A2 | 2/2005 | |
| WO | 2005023155 A1 | 3/2005 | |
| WO | 2005027790 A1 | 3/2005 | |
| WO | 2005046528 A1 | 5/2005 | |
| WO | 2005046529 A1 | 5/2005 | |
| WO | 2005048883 A1 | 6/2005 | |
| WO | 2005065585 A1 | 7/2005 | |
| WO | 2005084595 A1 | 9/2005 | |
| WO | 2005087140 A1 | 9/2005 | |
| WO | 2005096993 A1 | 10/2005 | |
| WO | 2006005015 A2 | 1/2006 | |
| WO | 2006009690 A1 | 1/2006 | |
| WO | 2006027499 A2 | 3/2006 | |
| WO | 2005062980 A3 | 5/2006 | |
| WO | 2006093795 A1 | 9/2006 | |
| WO | 2006138391 A2 | 12/2006 | |
| WO | WO-2006138728 A2 * | 12/2006 | ........... A61B 5/6853 |
| WO | 2007009117 A1 | 1/2007 | |
| WO | 2007033093 A2 | 3/2007 | |
| WO | 2007035471 A2 | 3/2007 | |
| WO | 2005102015 A3 | 4/2007 | |
| WO | 2007044285 A2 | 4/2007 | |
| WO | 2007058847 A1 | 5/2007 | |
| WO | 2007092354 A2 | 8/2007 | |
| WO | 2007097983 A2 | 8/2007 | |
| WO | 2007053243 A2 | 9/2007 | |
| WO | 2008028569 A1 | 3/2008 | |
| WO | 2008035337 A2 | 3/2008 | |
| WO | 2008112399 A1 | 9/2008 | |
| WO | 2009137359 A1 | 11/2009 | |
| WO | 2010042950 A2 | 4/2010 | |
| WO | 2010098857 A1 | 9/2010 | |
| WO | 2012116368 A2 | 8/2012 | |
| WO | 2012162228 A1 | 11/2012 | |
| WO | 2013009975 A1 | 1/2013 | |
| WO | 2013028387 A2 | 2/2013 | |
| WO | 2013074671 A1 | 5/2013 | |
| WO | 2013096545 A1 | 6/2013 | |
| WO | 2016090025 A1 | 6/2016 | |
| WO | 2016126511 A2 | 8/2016 | |
| WO | WO-2019232488 A1 * | 12/2019 | ........ A61M 25/1011 |

OTHER PUBLICATIONS

US 8,062,357 B2, 11/2011, Salahieh et al. (withdrawn)
US 8,075,614 B2, 12/2011, Salahieh et al. (withdrawn)
US 8,133,271 B2, 03/2012, Salahieh et al. (withdrawn)
US 8,211,170 B2, 07/2012, Paul et al. (withdrawn)
Knudsen et al., "Catheter-implanted prosthetic heart valves." Int'l J. of Art. Organs, 16(5): 253-262, May 1993.
Kort et al., "Minimally Invasive Aortic Valve Replacement: Echocardiographic and Clinical Results." Am. Heart J., 142(3): 476-481, Sep. 2001.
Lawrence et al., "Percutaneous Endovascular Graft: Experimental Evaluation," Radiology, 163(2): 357-60 (May 1987).
Levi et al., "Future of Interventional Cardiology in Pediactrics." Current Opinion in Cardiol., 18:79-90 (2003).
Levy, "*Mycobacterium chelonei* Infection of Porcine Heart Valves." The New England Journal of Medicine, Washington DC, 297(12), Sep. 22, 1977.
Love et al., The Autogenous Tissue Heart Valve: Current Status. Journal of Cardiac Surgery, 6(4): 499-507, Mar. 1991.
Lutter et al., "Percutaneous Aortic Valve Replacement: An Experimental Study. I. Studies on Implantation." J. of Thoracic and Cardio. Surg., 123(4): 768-776, Apr. 2002.
Magovern et al., "Twenty-five-Year Review of the Magovern-Cromie Sutureless Aortic Valve." Ann. Thorac. Surg., 48: S33-4 (1989).
Maraj et al., Evaluation of Hemolysis in Patients with Prosthetic Heart Valves, Clin. Cardiol. 21, 387-392 (1998).
Mckay et al., "The Mansfield Scientific Aortic Valvuloplasty Registry: Overview of Acute Hemodynamic Results and Procedural Complications." J. Am. Coll. Cardiol. 17(2): 485-91 (Feb. 1991).
Mirich et al., "Percutaneously Placed Endovascular Grafts for Aortic Aneurysms: Feasibility Study." Radiology, 170: 1033-1037 (1989).
Moazami et al., "Transluminal Aortic Valve Placement: A Feasibility Study With a Newly Designed Collapsiable Aortic Valve," ASAIO J. vol. 42:5, pp. M383-M385 (Sep./Oct. 1996).
Moulopoulos et al., "Catheter-Mounted Aortic Valves." Annals of Thoracic Surg., 11(5): 423-430, May 1971.
Paniagua et al., "Heart Watch." Texas Heart Institute. Edition: 8 pages, Spring, 2004.
Paniagua et al., "Percutaneous Heart Valve in the Chronic in Vitro Testing Model." Circulation, 106: e51-e52, Sep. 17, 2002.
Parodi et al., "Transfemoral Intraluminal Graft Implantation for Abdominal Aortic Aneurysms." Ann. Vasc. Surg., 5(6):491-9 (1991).
Pavcnik et al., "Percutaneous Bioprosthetic Venous Valve: A Long-term Study in Sheep." J. of Vascular Surg., 35(3): 598-603, Mar. 2002.
Pavcnik et al., "Development and Initial Experimental Evaluation of a Prosthetic Aortic Valve for Transcatheter Placement." Radiology 183:151-54 (1992).
Pavcnik, et al., "Aortic and venous valve for percutaneous insertion," Min. Invas. Ther. & Allied Technol. 9(3/4) 287-292 (2000).
Phillips et al., "A Temporary Catheter-Tip Aortic Valve: Hemodynamic Effects on Experimental Acute Aortic Insufficiency." Annals of Thoracic Surg., 21(2): 134-136, Feb. 1976.
Printz, et al., "Let the Blood Circulate." Sulzer Tech. Rev. Apr. 1999.
U.S. Appl. No. 60/553,945 to White.
Raillat et al., "Treatment of Iliac Artery Stenosis with the Wallstent Endoprosthesis." AJR 154(3):613-6 (Mar. 1990).
Remadi et al., "Preliminary results of 130 aortic valve replacements with a new mechanical bileaflet prosthesis: the Edwards MIRA valve" Interactive Cardiovasc. and Thorac. Surg. 2, 80-83 (2003).
Rosch et al., "Gianturco-Rosch Expandable Z-Stents in the Treatment of Superior Vena Cava Syndrome." Cardiovasc. Intervent. Radiol. 15: 319-327 (1992).
Schurink et al,. "Stent Attachment Site-related Endoleakage after Stent Graft Treatment: An in vitro study of the effects of graft size, stent type, and atherosclerotic wall changes." J. Vasc. Surg., 30(4):658-67 (Oct. 1999).
Seminars in Interventional Cardiology, ed. P.W. Surruys, vol. 5 (2000).
Sochman et al., "Percutaneous Transcatheter Aortic Disc Valve Prosthesis Implantation: A Feasibility Study." Cardiovasc. Intervent. Radiol., 23: 384-388, Sep. 2000.
Southern Lights Biomaterials Homepage, http://www.slv.co.nz/, Jan. 7, 2011.

(56) References Cited

OTHER PUBLICATIONS

Stanley et al., "Evaluation of Patient Selection Guidelines for Endoluminal AAA Repair With the Zenith Stent Graft: The Australasian Experience." J. Endovasc. Ther. 8:457-464 (2001).
Thompson et al., "Endoluminal stent grafting of the thoracic aorta: Initial experience with the Gore Excluder," Journal of Vascular Surgery, 1163-70 (Jun. 2002).
Steinhoff et al., "Tissue Engineering of Pulmonary Heart Valves on Allogenic Acellular Matrix Conduits." Circulation, 102 [suppl. III]: III-50-111-55 (2000).
Stuart, "In Heart Valves, a Brave, New Non-Surgical World." Start-Up. Feb. 9-17, 2004.
Supplemental Search Report from EP Patent Office, EP Application No. 04815634.3, Aug. 19, 2011.
Supplemental Search Report from EP Patent Office, EP Application No. 05758878.2, Oct. 24, 2011.
Topol, Textbook of Interventional Cardiology, 2d Ed., Chapter 75: Percutaneous Expandable Prosthetic Valves (1994).
Stassano, "Mid-term Results of the Valve on Valve Technique for Bioprosthetic failure." European journal of Ccardiothoracic Surgery:vol. 18, 453-457, Oct. 2000.
Topol, "Percutaneous Expandable Prosthetic Valves." Textbook of Interventional Cardiology, W.B. Saunders Company, 2: 1268-1276, 1994.
Vahanian et al., "Percutaneous Approaches to Valvular Disease." Circulation, 109: 1572-1579, Apr. 6, 2004.
Van Herwerden et al., "Percutaneous Valve Implantation: Back to the Future?" Euro. Heart J., 23(18): 1415-1416, Sep. 2002.
VentureBeatProfiles, Claudio Argento, Jan. 7, 2010, http://venturebeatprofiles.com/person/profile/claudio-argento.
Vossoughi et al., Stent Graft Update (2000)—Kononov, Volodos, and Parodi and Palmaz Stents; Hemobahn Stent Graft.
White et al., "Endoleak as a Complication of Endoluminal Grafting of Abdominal Aortic Aneurysms: Classification, Incidence, Diagnosis, and Management." J. Endovac. Surg., 4:152-168 (1997).
Yoshioka et al., "Self-Expanding Endovascular Graft: An Experimental Study in Dogs." AJR 151: 673-76 (Oct. 1988).
USPTO Case IPR2017-01293, U.S. Pat. No. 8,992,608 B, Oct. 13, 2017.
Zhou et al., "Self-expandable Valved Stent of Large Size: Off-Bypass Implantation in Pulmonary Position." Eur. J. Cardiothorac, 24: 212-216, Aug. 2003.
Gore Excluder Instructions for Use (2002).
USPTO Case IPR2016-___,U.S. Pat. No. 8,992,608 "Petition for Interpartes Review of U.S. Pat. No. 8,992,608" Oct. 12, 2016.
USPTO Case IPR 2017-0006, U.S. Pat. No. 8,992,608 B2, "Final Written Decision" Mar. 23, 2018.
Fluency Vascular Stent Graft Instructions for Use (2003).
International Search Report and Written Opinion dated Jul. 6, 2022 for International Application No. PCT/US2022/023991.
Cribier et al., "Percutaneous Transluminal Valvuloplasty of Acquired Aortic Stenosis in Elderly Patients: An Alternative to Valve Replacement?" The Lancet, 63-7 (Jan. 11, 1986).
Supplemental Search Report from EP Patent Office, EP Application No. 04813777.2, Aug. 19, 2011.
Laborde et al., "Percutaneous Implantation of the Corevalve Aortic Valve Prosthesis for Patients Presenting High Risk for Surgical Valve Replacement." EuroIntervention: 472-474, Feb. 2006.
"A Matter of Size." Triennial Review of the National Nanotechnology Initiative, The National Academies Press, Washington DC, v-13, http://www.nap.edu/catalog/11752/a-matter-of-size-triennial-review-of-the-national-nanotechnology, 2006.
"Heart Valve Materials-Bovine (cow)." Equine & Porcine Pericardium, Maverick Biosciences Pty. Lt, http://maverickbio.com/biological-medical-device-materials.php?htm. 2009.
"Pericardial Heart Valves." Edwards Lifesciences, Cardiovascular Surgery FAQ, http://www.edwards.com/products/cardiovascularsurgeryfaq.htm, Nov. 14, 2010.

Allen et al., "What are the characteristics of the ideal endovascular graft for abdominal aortic aneurysm exclusion?" J. Endovasc. Surg., 4(2):195-202 (May 1997).
Andersen et al. "Transluminal catheter implantation of a new expandable artificial cardiac valve (the stent—valve) in the aorta and the beating heart of closed chest pigs (Abstract)." Eur. Heart J., 11 (Suppl.): 224a (1990).
Andersen et al., "Transluminal implantation of artificial heart valves. Description of a new expandable aortic valve and initial results with implantation by catheter technique in closed chest pigs." Euro. Heart J., 13:704-708, May 1992.
Atwood et al., "Insertion of Heart Valves by Catheterization." Project Supervised by Prof. S. Muftu of Northeastern University 2001-2002: 36-40, May 30, 2002.
Atwood et al., "Insertion of Heart Valves by Catheterization." The Capstone Design Course Report. MIME 1501-1502. Technical Design Report. Northeastern University, pp. 1-93, Nov. 5, 2007.
Bailey, "Percutaneous Expandable Prosthetic Valves, Textbook of Interventional Cardiology." vol. 2, 2d ed. Eric J. Topol, W.B. Saunders Co. (1994).
Blum et al., "Endoluminal Stent—Grafts for Intrarenal Abdominal Aortic Aneurysms." New Engl. J. Med., 336:13-20 (1997).
Bodnar et al., "Replacement Cardiac Valves R Chapter 13: Extinct Cardiac Valve Prostheses." Pergamon Publishing Corporation. New York, 307-322, 1991.
Bonhoeffer et al., "Percutaneous Insertion of the Pulmonary Valve." J. Am. Coll. Cardiol., 39:1664-9 (2002).
Bonhoeffer et al., "Transcatheter Implantation of a Bovine Valve in Pulmonary Position: A Lamb Study." Circulation, 102: 813-16 (2000).
Bonhoeffer, et al., "Percutaneous replacement of pulmonary valve in a right ventricle to pulmonary-artery prosthetic conduit with valve dysfunction." The Lancet, vol. 356, 1403-05 (Oct. 21, 2000).
Boudjemline et al., "Percutaneous Implantation of a Biological Valve in the Aorta to Treat Aortic Valve Insufficiency—A Sheep Study." Med Sci. Monit., vol. 8, No. 4: BR113-116, Apr. 12, 2002.
Boudjemline et al., "Percutaneous Implantation of a Valve in the Descending Aorta in Lambs." Euro. Heart J., 23: 1045-1049, Jul. 2002.
Boudjemline et al., "Percutaneous Pulmonary Valve Replacement in a Large Right Ventricular Outflow Tract: An Experimental Study." Journal of the American College of Cardiology, vol. 43(6): 1082-1087, Mar. 17, 2004.
Boudjemline et al., "Percutaneous Valve Insertion: A New Approach?" J. of Thoracic and Cardio. Surg, 125(3): 741-743, Mar. 2003.
Boudjemline et al., "Steps Toward Percutaneous Aortic Valve Replacement." Circulation, 105: 775-778, Feb. 12, 2002.
Couper, "Surgical Aspects of Prosthetic Valve Selection," Overview of Cardiac Surgery for the Cardiologist, Springer-Verlag New York, Inc., 131-145 (1994).
Cribier et al., "Early Experience with Percutaneous Transcatheter Implantation of Heart Valve Prosthesis for the Treatment of End-Stage Inoperable Patients with Calcific Aortic Stenosis." J. of Am. Coll. of Cardio, 43(4): 698-703, Feb. 18, 2004.
Cribier et al., "Percutaneous Transcatheter Implantation of an Aortic Valve Prosthesis for Calcific Aortic Stenosis: First Human Case." Percutaneous Valve Technologies, Inc., 16 pages, Apr. 16, 2002.
Cribier et al., "Percutaneous Transcatheter Implementation of an Aortic Valve Prosthesis for Calcific Aortic Stenosis: First Human Case Description." Circulation, 106: 3006-3008, Dec. 10, 2002.
Cribier et al., "Trans-Cathether Implantation of Balloon-Expandable Prosthetic Heart Valves: Early Results in an Animal Model." Circulation [suppl. II] 104(17) II-552 (Oct. 23, 2001).
Cunanan et al., "Tissue Characterization and Calcification Potential of Commercial Bioprosthetic Heart Valves." Ann. Thorac. Surg., S417-421, May 15, 2001.
Cunliffe et al., "Glutaraldehyde Inactivation of Exotic Animal Viruses in Swine Heart Tissue." Applied and Environmental Microbiology, Greenport, New York, 37(5): 1044-1046, May 1979.
Dake et al., "Transluminal Placement of Endovascular Stent-Grafts for the Treatment of Descending Thoracic Aortic Aneurysms." New Engl. J. of Med., 331(26): 1729-34 (1994).

(56) References Cited

OTHER PUBLICATIONS

Dalby et al., "Non-Surgical Aortic Valve Replacement" Br. J. Cardiol., 10:450-2 (2003).

Dhasmana, et al., "Factors Associated With Periprosthetic Leakage Following Primary Mitral Valve Replacement: With Special Consideration of Suture Technique." Annals of Thorac. Surg. 35(2), 170-8 (Feb. 1983).

Diethrich, AAA Stent Grafts: Current Developments, J. Invasive Cardiol. 13(5) (2001).

Dolmatch et al., Stent Grafts: Current Clinical Practice (2000)—EVT Endograft and Talent Endoprosthesis.

Dotter, "Transluminally-Placed Coilspring Endarterial Tube Grafts," Investigative Radiology, pp. 329-332 (1969).

Emery et al., "Replacement of the Aortic Valve in Patients Under 50 Years of Age: Long-Term Follow-Up of the St. Jude Medical Prosthesis." Ann. Thorac. Surg., 75:1815-9 (2003).

EP Search Report for EP Application No. 06824992.9, mailed Aug. 10, 2011.

Examiner's First Report on AU Patent Application No. 2011202667, issued on May 17, 2012.

Ferrari et al., "Percutaneous Transvascular Aortic Valve Replacement with Self-Expanding Stent-Valve Device." Poster from the presentation given at SMIT 2000, 12th International Conference. Sep. 5, 2000.

Greenberg, "Abdominal Aortic Endografting: Fixation and Sealing." J. Am. Coll. Surg. 194:1:S79-S87 (2002).

Grossi, "Impact of Minimally Invasive Valvular Heart Surgery: A Case-Control Study." Ann. Thorac. Surg., 71:807-10 (2001).

Helmus, "Mechanical and Bioprosthetic Heart Valves in Biomaterials for Artificial Organs." Woodhead Publishing Limited: 114-162, 2011.

Hijazi, "Transcatheter Valve Replacement: A New Era of Percutaneous Cardiac Intervention Begins." J. of Am. College of Cardio., 43(6): 1088-1089, Mar. 17, 2004.

Hourihan et al., "Transcatheter Umbrella Closure of Valvular and Paravalvular Leaks." JACC, Boston, Massachusetts, 20(6): 1371-1377, Nov. 15, 1992.

Huber et al., "Do Valved Stents Compromise Coronary Flow?" European Journal of Cardio-thoracic Surgery, vol. 25: 754-759, Jan. 23, 2004.

Ing, "Stents: What's Available to the Pediatric Interventional Cardiologist?" Catheterization and Cardiovascular Interventions 57:274-386 (2002).

Ionescu, et al., "Prevalence and Clinical Significance of Incidental Paraprosthetic Valvar Regurgitation: A prospective study using transesophageal echocardiography." Heart, 89:1316-21 (2003).

Kaiser, et al., "Surgery for Left Ventricle Outflow Obstruction: Aortic Valve Replacement and Myomectomy," Overview of Cardiac Surgery for the Cardiologist. Springer-Verlag New York, Inc., 40-45 (1994).

Kato et al., "Traumatic Thoracic Aortic Aneurysm: Treatment with Endovascular Stent-Grafts." Radiol., 205: 657-662 (1997).

Khonsari et al., "Cardiac Surgery: Safeguards and Pitfalls in Operative Technique." 3d ed., 45-74 (2003).

Carpentier-Edwards Perimount Bioprosthesis (2003).

International Search Report and Written Opinion dated Oct. 22, 2018 for International Application No. PCT/US2018/044318.

\* cited by examiner

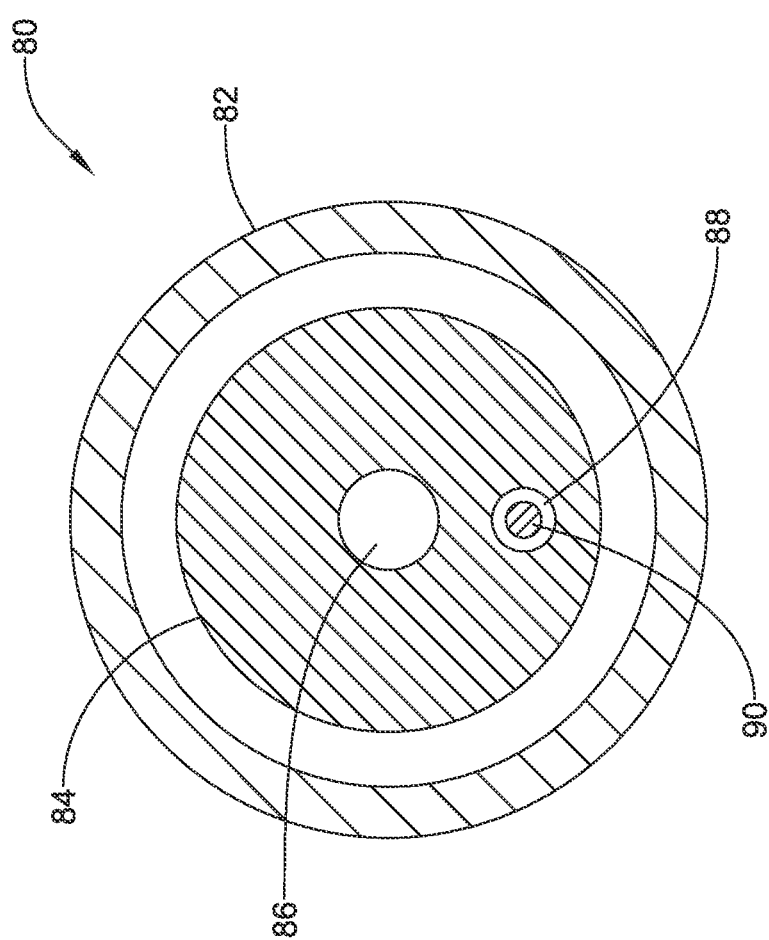

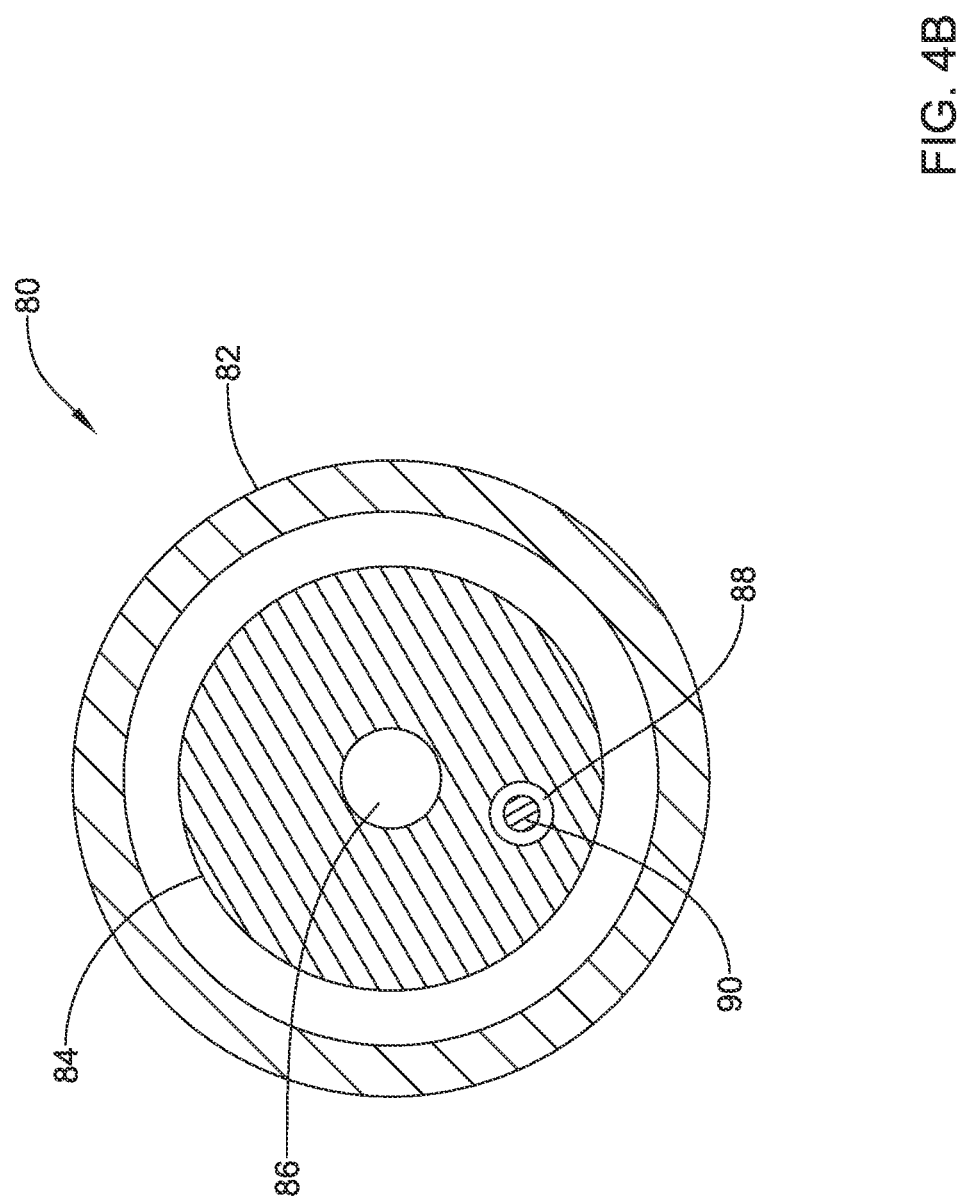

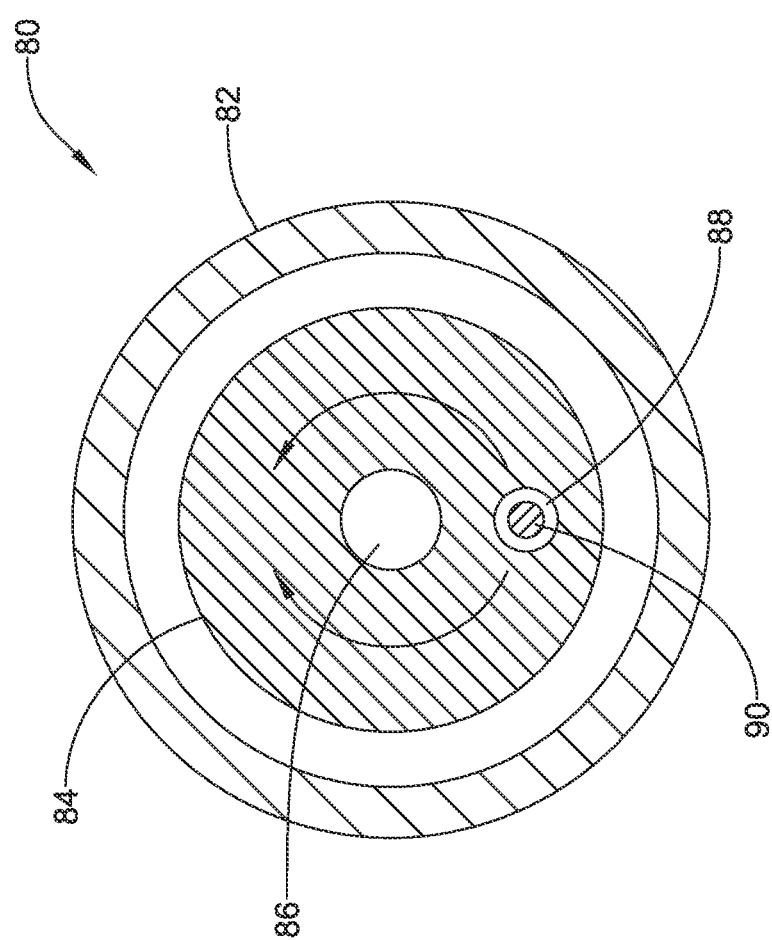

ROTATIONAL ALIGNMENT OF MEDICAL IMPLANT

CROSS-REFERENCE TO RELATED APPLICATIONS

This application claims the benefit of priority of U.S. Provisional Application No. 63/173,097 filed Apr. 9, 2021, the entire disclosure of which is hereby incorporated by reference.

TECHNICAL FIELD

The present disclosure pertains to medical devices, and methods for manufacturing and/or using medical devices. More particularly, the present disclosure pertains to a system for delivering a medical implant.

BACKGROUND

A wide variety of intracorporeal medical devices have been developed for medical use, for example, intravascular use. Some of these devices include guidewires, catheters, medical device delivery systems (e.g., for stents, grafts, replacement valves, etc.), and the like. These devices are manufactured by any one of a variety of different manufacturing methods and may be used according to any one of a variety of methods. Of the known medical devices and methods, each has certain advantages and disadvantages. There is an ongoing need to provide alternative medical devices as well as alternative methods for manufacturing and using medical devices.

SUMMARY

In a first example, a system for delivering a replacement heart valve implant to a native heart valve of a patient may comprise a replacement heart valve implant including an expandable framework and a plurality of leaflets coupled to the expandable framework at commissural posts of the expandable framework; and a delivery device including a proximal handle and an elongate catheter extending distally from the proximal handle, wherein the elongate catheter includes an outer sheath and an inner shaft movably disposed within a lumen of the outer sheath. The replacement heart valve implant may be releasably coupled to a distal portion of the inner shaft in a delivery configuration. The inner shaft may include a central guidewire lumen extending longitudinally therethrough. The inner shaft may include an orientation lumen extending longitudinally within the inner shaft, the orientation lumen being laterally offset from the central guidewire lumen and having a closed distal end. The delivery device may include an orientation mandrel slidably disposed within the orientation lumen, the orientation mandrel extending distally from the proximal handle within the orientation lumen to a distal end proximate the closed distal end of the orientation lumen. The orientation mandrel may be operably coupled to an orientation mechanism of the proximal handle, the orientation mechanism being configured to move the orientation mandrel axially relative to the inner shaft.

In addition or alternatively to any example disclosed herein, a distal portion of the elongate catheter includes a pre-formed curve configured to conform to an aortic arch of the patient, the pre-formed curve defining an arch of the elongate catheter having an inside bend and an outside bend disposed opposite the inside bend relative to the central guidewire lumen.

In addition or alternatively to any example disclosed herein, the orientation mandrel is disposed along the inside bend of the arch of the elongate catheter in a first configuration.

In addition or alternatively to any example disclosed herein, the orientation mandrel is disposed along the outside bend of the arch of the elongate catheter in a second configuration.

In addition or alternatively to any example disclosed herein, the orientation mechanism is configured to advance the orientation mandrel distally relative to the inner shaft.

In addition or alternatively to any example disclosed herein, distal advancement of the distal end of the orientation mandrel against the closed distal end of the orientation lumen causes compressive force to build up within the orientation mandrel.

In addition or alternatively to any example disclosed herein, the compressive force shifts the elongate catheter from the first configuration to the second configuration.

In addition or alternatively to any example disclosed herein, a system for delivering a replacement heart valve implant to a native heart valve of a patient may comprise a replacement heart valve implant including an expandable framework and a plurality of leaflets coupled to the expandable framework at commissural posts of the expandable framework; and a delivery device including a proximal handle and an elongate catheter extending distally from the proximal handle, wherein the elongate catheter includes an outer sheath and an inner shaft movably disposed within a lumen of the outer sheath. The replacement heart valve implant may be releasably coupled to a distal portion of the inner shaft in a delivery configuration. The inner shaft may include a central guidewire lumen extending longitudinally therethrough. The delivery device may include a first orientation mandrel attached to an outside surface of the inner shaft, the first orientation mandrel extending distally from the proximal handle to a first distal end fixedly attached to the inner shaft proximate a distal end of the inner shaft. The first orientation mandrel may be operably coupled to an orientation mechanism of the proximal handle, the orientation mechanism being configured to apply compressive force or tensile force to the first orientation mandrel.

In addition or alternatively to any example disclosed herein, a distal portion of the elongate catheter includes a pre-formed curve configured to conform to an aortic arch of the patient, the pre-formed curve defining an arch of the elongate catheter having an inside bend and an outside bend disposed opposite the inside bend relative to the central guidewire lumen.

In addition or alternatively to any example disclosed herein, the first orientation mandrel may be disposed along the inside bend of the arch of the elongate catheter in a first configuration. The first orientation mandrel may be disposed along the outside bend of the arch of the elongate catheter in a second configuration.

In addition or alternatively to any example disclosed herein, applying compressive force against the first distal end fixedly attached to the inner shaft causes rotation of the inner shaft in a first direction to shift the elongate catheter from the first configuration toward the second configuration.

In addition or alternatively to any example disclosed herein, applying tensile force to the first distal end fixedly attached to the inner shaft causes rotation of the inner shaft in a second direction to shift the elongate catheter from the first configuration toward the second configuration.

In addition or alternatively to any example disclosed herein, the delivery device includes a second orientation mandrel attached to an outside surface of the inner shaft opposite the first orientation mandrel relative to the central guidewire lumen, the second orientation mandrel extending distally from the proximal handle to a second distal end fixedly attached to the inner shaft proximate the distal end of the inner shaft. The second orientation mandrel may be operably coupled to the orientation mechanism of the proximal handle, the orientation mechanism being configured to apply compressive force or tensile force to the second orientation mandrel.

In addition or alternatively to any example disclosed herein, the second orientation mandrel may be disposed along the outside bend of the arch of the elongate catheter in the first configuration. The second orientation mandrel may be disposed along the inside bend of the arch of the elongate catheter in the second configuration.

In addition or alternatively to any example disclosed herein, applying compressive force against the second distal end fixedly attached to the inner shaft causes rotation of the inner shaft in a second direction opposite the first direction to shift the elongate catheter from the first configuration toward the second configuration.

In addition or alternatively to any example disclosed herein, a method of positioning a replacement heart valve implant within a native heart valve of a patient may comprise:
advancing a system percutaneously to a position adjacent the native heart valve, the system comprising a replacement heart valve implant including an expandable framework and a plurality of leaflets coupled to the expandable framework at commissural posts of the expandable framework, and a delivery device including a proximal handle and an elongate catheter extending distally from the proximal handle, wherein the elongate catheter includes an outer sheath and an inner shaft movably disposed within a lumen of the outer sheath, wherein the replacement heart valve implant is releasably coupled to a distal portion of the inner shaft in a delivery configuration, wherein the inner shaft includes an orientation lumen extending longitudinally within the inner shaft, the orientation lumen being laterally offset from a central guidewire lumen and having a closed distal end;
deploying the replacement heart valve implant within the native heart valve; and
aligning the commissural posts of the replacement heart valve implant with commissures of the native heart valve by rotating the replacement heart valve implant relative to the outer sheath.

In addition or alternatively to any example disclosed herein, the delivery device may include an orientation mandrel disposed within the orientation lumen, the orientation mandrel extending distally from the proximal handle within the orientation lumen to a distal end proximate the closed distal end of the orientation lumen. The orientation mandrel may be operably coupled to an orientation mechanism of the proximal handle, the orientation mechanism being configured to apply compressive force or tensile force to the orientation mandrel.

In addition or alternatively to any example disclosed herein, the method may further comprise applying compressive force or tensile force to the orientation mandrel using the orientation mechanism to rotate the replacement heart valve implant relative to the outer sheath.

In addition or alternatively to any example disclosed herein, prior to applying compressive force or tensile force to the orientation mandrel, the orientation mandrel is disposed along an inside bend of the elongate catheter within an aortic arch of the patient.

In addition or alternatively to any example disclosed herein, after applying compressive force or tensile force to the orientation mandrel, the orientation mandrel is disposed along an outside bend of the elongate catheter within the aortic arch of the patient.

The above summary of some embodiments, aspects, and/or examples is not intended to describe each disclosed embodiment or every implementation of the present disclosure. The Figures and Detailed Description more particularly exemplify aspects of these embodiments.

BRIEF DESCRIPTION OF THE DRAWINGS

The disclosure may be more completely understood in consideration of the following detailed description in connection with the accompanying drawings, in which:

FIG. 4 is a cross-section taken at line 4-4 of FIG. 3;

FIG. 4B is an alternative cross-section taken at line 4-4 of FIG. 3;

FIG. 6 is a cross-section taken at line 6-6 of FIG. 5;

Figure 1:
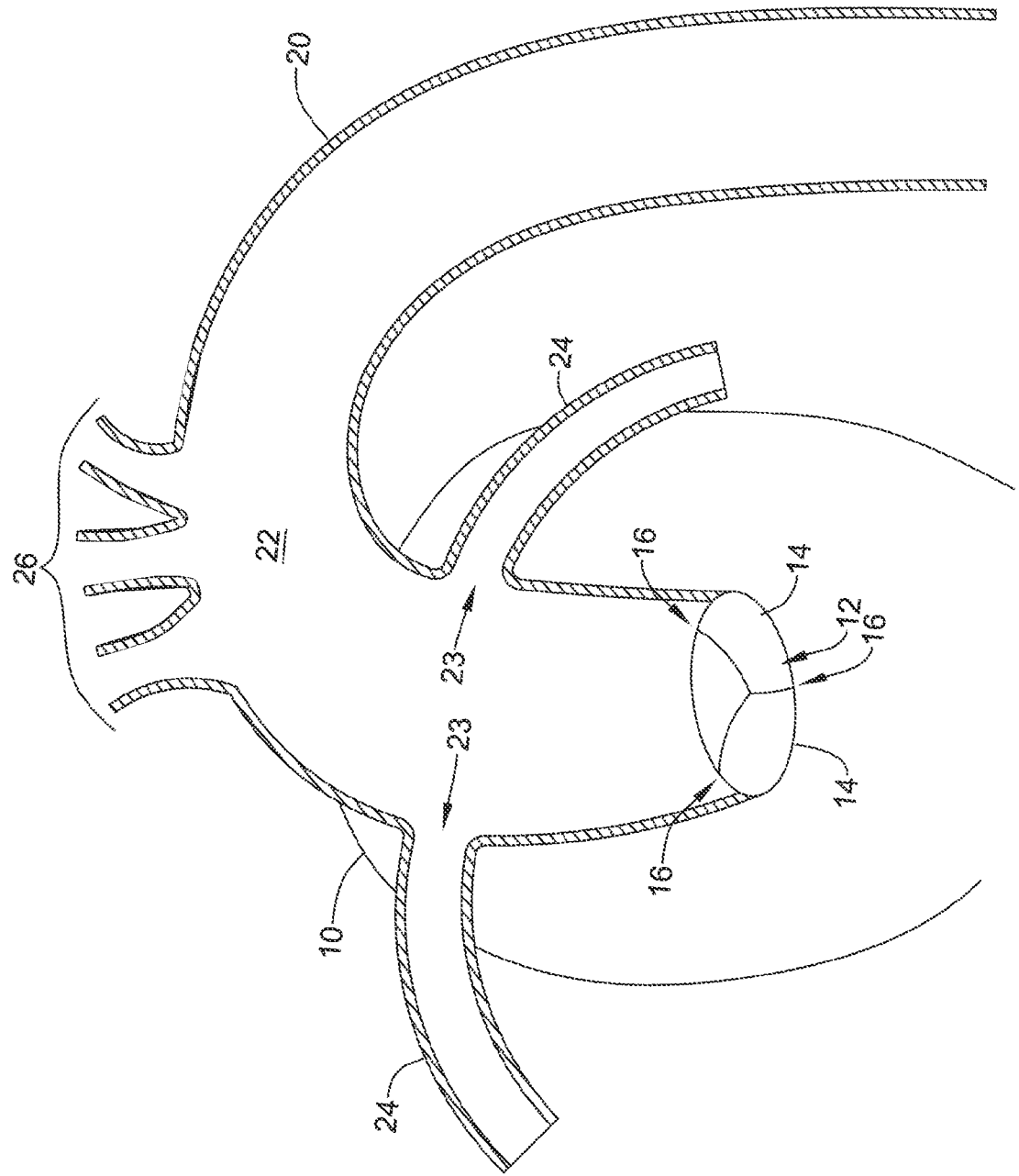
FIG. 1 schematically illustrates an example configuration of a heart.

While aspects of the disclosure are amenable to various modifications and alternative forms, examples are shown in the drawings and described herein. It should be understood, however, that the intention is not to limit aspects of the disclosure to the particular embodiments described. On the contrary, the disclosure shall cover all modifications, equivalents, and alternatives falling within the spirit and scope thereof.

DETAILED DESCRIPTION

The following description should be read with reference to the drawings, which are not necessarily to scale, wherein like reference numerals indicate like elements throughout the several views. The detailed description and drawings are intended to illustrate but not limit the present disclosure. Those skilled in the art will recognize that the various elements described and/or shown may be arranged in various combinations and configurations without departing from the scope of the disclosure. The detailed description and drawings illustrate example embodiments of the disclosure. However, in the interest of clarity and ease of understanding, while every feature and/or element may not be shown in each drawing, the feature(s) and/or element(s) may be understood to be present regardless, unless otherwise specified.

For the following defined terms, these definitions shall be applied, unless a different definition is given in the claims or elsewhere in this specification.

All numeric values are herein assumed to be modified by the term "about," whether or not explicitly indicated. The term "about", in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified.

The recitation of numerical ranges by endpoints includes all numbers within that range, including the endpoints (e.g., 1 to 5 includes 1, 1.5, 2, 2.75, 3, 3.80, 4, and 5).

Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary. For simplicity and clarity purposes, not all elements of the present disclosure are necessarily shown in each figure or discussed in detail below. However, it will be understood that the following discussion may apply equally to any and/or all of the components for which there are more than one, unless explicitly stated to the contrary. Additionally, not all instances of some elements or features may be shown in each figure for clarity.

Relative terms such as "proximal", "distal", "advance", "retract", variants thereof, and the like, may be generally considered with respect to the positioning, direction, and/or operation of various elements relative to a user/operator/manipulator of the device, wherein "proximal" and "retract" indicate or refer to closer to or toward the user and "distal" and "advance" indicate or refer to farther from or away from the user. In some instances, the terms "proximal" and "distal" may be arbitrarily assigned in an effort to facilitate understanding of the disclosure, and such instances will be readily apparent to the skilled artisan. Other relative terms, such as "upstream", "downstream", "inflow", and "outflow" refer to a direction of fluid flow within a lumen, such as a body lumen, a blood vessel, or within a device. Still other relative terms, such as "axial", "circumferential", "longitudinal", "lateral", "radial", etc. and/or variants thereof generally refer to direction and/or orientation relative to a central longitudinal axis of the disclosed structure or device.

The term "extent" may be understood to mean a greatest measurement of a stated or identified dimension, unless the extent or dimension in question is preceded by or identified as a "minimum", which may be understood to mean a smallest measurement of the stated or identified dimension. For example, "outer extent" may be understood to mean an outer dimension, "radial extent" may be understood to mean a radial dimension, "longitudinal extent" may be understood to mean a longitudinal dimension, etc. Each instance of an "extent" may be different (e.g., axial, longitudinal, lateral, radial, circumferential, etc.) and will be apparent to the skilled person from the context of the individual usage. Generally, an "extent" may be considered a greatest possible dimension measured according to the intended usage, while a "minimum extent" may be considered a smallest possible dimension measured according to the intended usage. In some instances, an "extent" may generally be measured orthogonally within a plane and/or cross-section, but may be, as will be apparent from the particular context, measured differently—such as, but not limited to, angularly, radially, circumferentially (e.g., along an arc), etc.

The terms "monolithic" and "unitary" shall generally refer to an element or elements made from or consisting of a single structure or base unit/element. A monolithic and/or unitary element shall exclude structure and/or features made by assembling or otherwise joining multiple discrete structures or elements together.

The terms "transaortic valve implantation" and "transcatheter aortic valve implantation" may be used interchangeably and may each be referred to using the acronym "TAVI". The terms "transaortic valve replacement" and "transcatheter aortic valve replacement" may be used interchangeably and may each be referred to using the acronym "TAVR".

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect the particular feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

For the purpose of clarity, certain identifying numerical nomenclature (e.g., first, second, third, fourth, etc.) may be used throughout the description and/or claims to name and/or differentiate between various described and/or claimed features. It is to be understood that the numerical nomenclature is not intended to be limiting and is exemplary only. In some embodiments, alterations of and deviations from previously used numerical nomenclature may be made in the interest of brevity and clarity. That is, a feature identified as a "first" element may later be referred to as a "second" element, a "third" element, etc. or may be omitted entirely, and/or a different feature may be referred to as the "first" element. The meaning and/or designation in each instance will be apparent to the skilled practitioner.

Diseases and/or medical conditions that impact the cardiovascular system are prevalent throughout the world. Traditionally, treatment of the cardiovascular system was often conducted by directly accessing the impacted part of the system. For example, treatment of a blockage in one or more of the coronary arteries was traditionally treated using coronary artery bypass surgery. As can be readily appreciated, such therapies are rather invasive to the patient and require significant recovery times and/or treatments. More recently, less invasive therapies have been developed, for example, where a blocked coronary artery could be accessed and treated via a percutaneous catheter (e.g., angioplasty). Such therapies have gained wide acceptance among patients and clinicians.

Some mammalian hearts (e.g., human, etc.) include four heart valves: a tricuspid valve, a pulmonary valve, an aortic valve, and a mitral valve. Some relatively common medical conditions may include or be the result of inefficiency, ineffectiveness, or complete failure of one or more of the valves within the heart. Treatment of defective heart valves poses other challenges in that the treatment often requires the repair or outright replacement of the defective valve. Such therapies may be highly invasive to the patient. Disclosed herein are systems, devices, and/or methods that may be used within a portion of the cardiovascular system in order to diagnose, treat, and/or repair the system, for example during and/or in conjunction with a TAVI or TAVR procedure, or in place of a TAVI or TAVR procedure in patients not suitable for such. At least some of the systems, devices, and/or methods disclosed herein may be used percutaneously and, thus, may be much less invasive to the patient, although other surgical methods and approaches may also be used. The systems, devices, and/or methods disclosed herein may also provide a number of additional desirable features and benefits as described in more detail below. For the purpose of this disclosure, the discussion below is directed toward the treatment of a native aortic valve and will be so described in the interest of brevity. This, however, is not intended to be limiting as the skilled person will recognize that the following discussion may also apply to a mitral valve or another heart valve with no or minimal changes to the structure and/or scope of the disclosure. Similarly, the medical devices disclosed herein may have applications and uses in other portions of a patient's anatomy, such as but not limited to, arteries, veins, and/or other body lumens.

FIG. 1 illustrates a schematic partial cut-away view of a portion of a patient's heart 10 including a native heart valve 12 (e.g., the aortic valve) having a plurality of valve leaflets 14, and certain connected vasculature, such as the aorta 20 connected to the aortic valve 12 of the heart 10 by the aortic arch 22, the coronary arteries 24, the ostia 23 of the coronary arteries 24, and other large arteries 26 (e.g., subclavian arteries, carotid arteries, brachiocephalic artery) that extend from the aortic arch 22 to important internal organs. The plurality of valve leaflets 14 may meet and/or come together at commissures 16 of the native heart valve 12 (e.g., the aortic valve). As mentioned above, for the purpose of this disclosure, the discussion below is directed toward use in the native heart valve 12 (e.g., the aortic valve) and will be so described in the interest of brevity. This, however, is not intended to be limiting as the skilled person will recognize that the following discussion may also apply to other heart valves, vessels, and/or treatment locations within a patient with no or minimal changes to the structure and/or scope of the disclosure.

Figure 2:
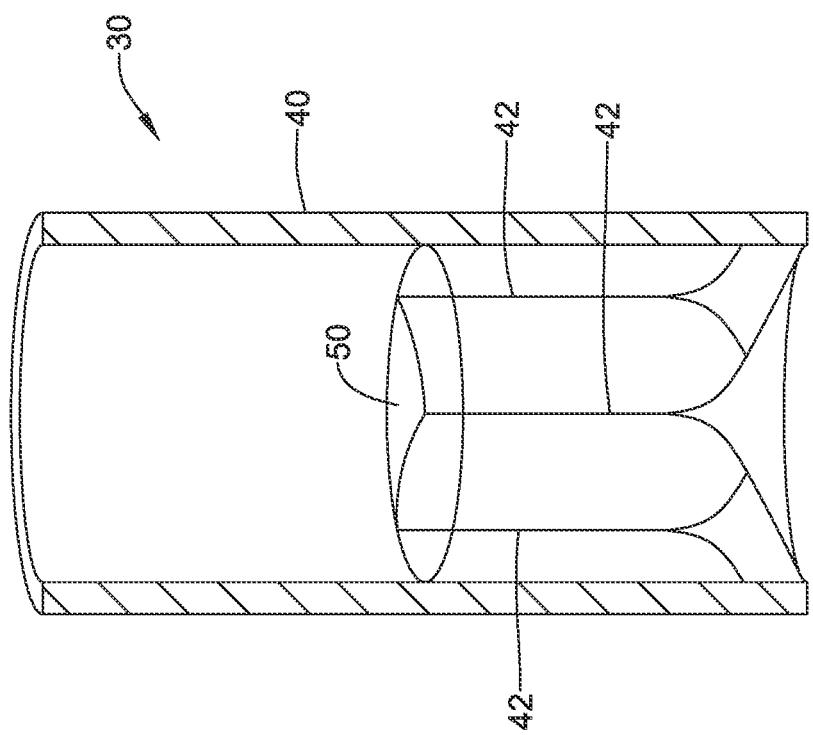
FIG. 2 schematically illustrates an example replacement heart valve implant.

FIG. 2 illustrates a schematic example of a replacement heart valve implant 30 configured to be disposed within the native heart valve 12 (e.g., the aortic valve) of a patient and/or the patient's heart 10. The replacement heart valve implant 30 is shown in partial cross-section. The replacement heart valve implant 30 may include an expandable framework 40 and a plurality of leaflets 50 coupled to the expandable framework 40 at commissural posts 42 of the expandable framework 40. In some embodiments, the replacement heart valve implant 30 and/or the expandable framework 40 may be reversibly actuatable between a delivery configuration and a deployed configuration, wherein in the delivery configuration the expandable framework 40 is axially elongated and/or radially collapsed and in the deployed configuration the expandable framework 40 is axially shortened and/or radially expanded.

The expandable framework 40 may form a tubular structure defining a central longitudinal axis and a lumen extending through the expandable framework 40 from an inflow end to an outflow end. In some embodiments, the expandable framework 40 may be and/or may include an expandable stent having a plurality of struts. In some embodiments, the expandable framework 40 may be and/or include a braid formed from one or more interwoven filaments (e.g., a single filament, two filaments, etc.). In some embodiments, the expandable framework 40 may be formed from a tubular member that is cut (e.g., with a laser, etc.) to define the plurality of struts. The expandable framework 40 may include a plurality of interstices (e.g., openings) disposed in the expandable framework 40. The plurality of interstices (e.g., openings) may pass from an interior of the expandable framework 40 to an exterior of the expandable framework 40 between adjacent struts and/or filaments. In some embodiments, the expandable framework 40 may include a plurality of atraumatic inflow loops or crowns proximate the inflow end and/or a plurality of atraumatic outflow loops or crowns proximate the outflow end.

In some embodiments, the expandable framework 40 may be self-expanding. In some embodiments, the expandable framework 40 may be expanded via mechanical means, using a balloon, or other suitable methods of expansion. Other configurations are also contemplated. Some suitable but non-limiting materials for the expandable framework 40, for example metallic materials, polymeric materials, shape memory materials, etc., are described below.

In some embodiments, a seal member (not shown) may be circumferentially disposed on, about, and/or adjacent the exterior of the expandable framework 40, and as the term suggests, may help to seal the exterior of the replacement heart valve implant 30 and/or the expandable framework 40 within and/or against a target site or area of interest (e.g., the native heart valve 12) upon deployment, thereby preventing leakage around the replacement heart valve implant 30 and/or the expandable framework 40. The seal member may be disposed outside of the lumen extending through the expandable framework 40. In some embodiments, the seal member may be coupled and/or secured to the expandable framework 40 at one or more locations.

In some embodiments, the seal member may include one or more layers of polymeric material. Some suitable polymeric materials may include, but are not necessarily limited to, polycarbonate, polyurethane, polyamide, polyether block amide, polyethylene, polyethylene terephthalate, polypropylene, polyvinylchloride, polytetrafluoroethylene, polysulfone, and copolymers, blends, mixtures or combinations thereof. Other suitable polymeric materials are also contemplated, some of which are discussed below.

In some embodiments, the seal member may also include a reinforcement, a reinforcing layer, and/or one or more reinforcing members added to the polymeric material prior to curing. The reinforcement, the reinforcing layer, and/or the one or more reinforcing members may comprise a woven or nonwoven fabric and may be positioned within or between the various layers. In some embodiments, the reinforcement, the reinforcing layer, and/or the one or more reinforcing members may be positioned on a radially innermost surface or radially outermost surface of the seal member. In some embodiments, at least a portion of the seal member may be formed from a fabric material having a polymeric coating. In at least some embodiments, the seal member may be impermeable to fluids and/or blood.

In some embodiments, the seal member may include a reinforcing band coupled to the seal member and/or disposed proximate the inflow end of the expandable framework 40. In some embodiments, the reinforcing band may be integrally formed with, incorporated into, adhered to, and/or at least partially embedded within the seal member. In some embodiments, the reinforcing band may be formed from a woven or nonwoven fabric material, a textile, or other thin flexible material. The reinforcing band may provide tear resistance in the vicinity of sutures, filaments, or other attachment elements associated with components or aspects of the replacement heart valve implant 30. In some embodiments, at least one seal stitch may attach the inflow end of the seal member and/or the reinforcing band to the inflow end of the expandable framework 40.

The replacement heart valve implant 30 may include the plurality of leaflets 50 (e.g., bovine pericardial, polymeric, etc.) disposed within the lumen of the expandable framework 40. In some embodiments, the plurality of leaflets 50 may include two leaflets, three leaflets, four leaflets, etc. Other configurations are also contemplated. In some embodiments, the plurality of leaflets 50 may be coupled and/or attached to the expandable framework 40 at the commissural posts 42. In some embodiments, the commissural posts 42 may be coupled and/or attached to the expandable framework 40. In some embodiments, the commissural posts 42 may be integrally and/or monolithically formed with the expandable framework 40. The replacement heart valve implant 30 may have the same number of commissural posts as leaflets. For example, in an embodiment where the plurality of leaflets 50 includes three leaflets, the replacement heart valve implant 30 may include three commissural posts 42. Other configurations are also contemplated. The plurality of leaflets 50 may be configured to open and close within the lumen of the expandable framework 40. Free ends of the plurality of leaflets 50 may be configured to contact each other in a sealing manner at a location downstream of the inflow end when the plurality of leaflets 50 is closed.

Figure 3:
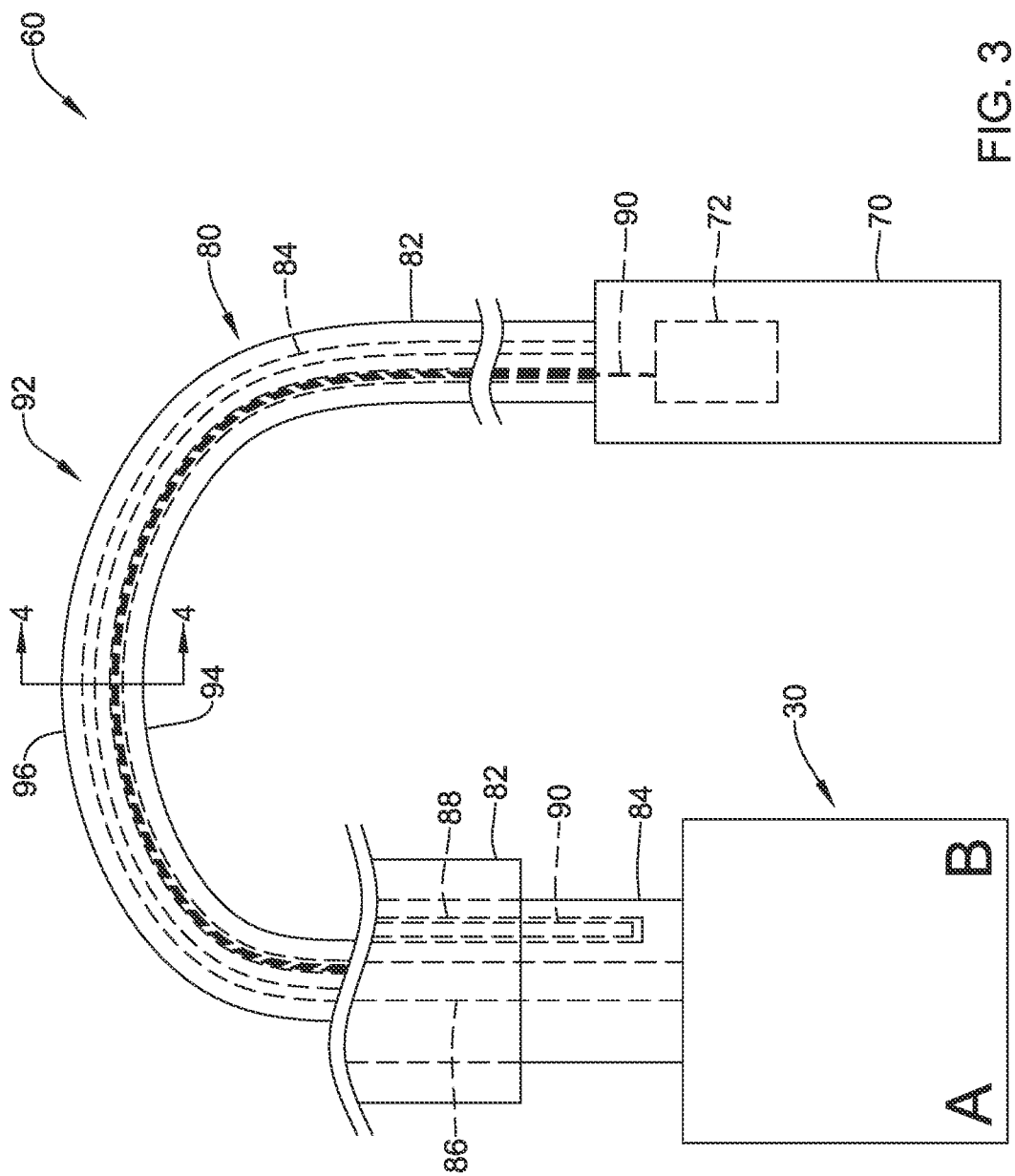
FIG. 3 schematically illustrates aspects of a system for delivering the replacement heart valve implant.

FIG. 3 illustrates aspects of a system for delivering the replacement heart valve implant 30 to the native heart valve 12 (e.g., the aortic valve) of the patient. The system may include the replacement heart valve implant 30 as described herein. For the sake of illustration and to facilitate understanding, the replacement heart valve implant 30 is labeled with reference letters A and B to indicate orientation of the replacement heart valve implant 30. The system may include a delivery device 60 including a proximal handle 70 and an elongate catheter 80 extending distally from the proximal handle 70. The elongate catheter 80 may include an outer sheath 82 having a lumen extending therethrough and an inner shaft 84 movably disposed within and/or extending longitudinally through the lumen of the outer sheath 82.

In some embodiments, the replacement heart valve implant 30 may be releasably coupled to a distal portion of the inner shaft 84 and disposed within the lumen of the outer sheath 82 in the delivery configuration during delivery of the replacement heart valve implant 30. In some embodiments, the proximal handle 70 may be disposed and/or attached at a proximal end of the delivery device 60 and may include one or more actuation means associated therewith. In some embodiments, the inner shaft 84 may include a central guidewire lumen 86 extending longitudinally therethrough. In some embodiments, the central guidewire lumen 86 may be coaxial with a central longitudinal axis of the inner shaft 84. The central guidewire lumen 86 may be configured to slidably receive and/or slidably move over a guidewire therein. In some embodiments, the inner shaft 84 may include an orientation lumen 88 (e.g., FIG. 4) extending longitudinally within the inner shaft 84. In at least some embodiments, the orientation lumen 88 may be laterally and/or radially offset from the central guidewire lumen 86 and/or the central longitudinal axis of the inner shaft 84. The orientation lumen 88 may include and/or have a closed distal end. The closed distal end of the orientation lumen 88 may be disposed proximal of a distal end of the inner shaft 84.

In some embodiments, the proximal handle 70 may include an actuation mechanism (not shown) configured to manipulate the position of the outer sheath 82 relative to the inner shaft 84 and/or the replacement heart valve implant 30, and/or to aid in the deployment of the replacement heart valve implant 30. In some embodiments, the actuation mechanism may include a rotatable knob, a slider, or other element. In some embodiments, the delivery device 60 may include a nose cone disposed at a distal end thereof. The delivery device 60 and/or the nose cone may be configured to slidably receive and/or slidably move over the guidewire (not shown). In at least some embodiments, the nose cone may have an atraumatic shape.

During delivery, the replacement heart valve implant 30 may be generally disposed in the delivery configuration within the outer sheath 82 coupled to and/or distal of the inner shaft 84. Once positioned, the outer sheath 82 may be retracted relative to the inner shaft 84 and/or the replacement heart valve implant 30 to expose the replacement heart valve implant 30. The replacement heart valve implant 30 may be actuated using the proximal handle 70 and/or the actuation mechanism in order to translate the replacement heart valve implant 30 into the deployed configuration. When the replacement heart valve implant 30 is suitably deployed within the anatomy, the replacement heart valve implant 30 may be released and/or detached from the delivery device 60 and/or the inner shaft 84 and the delivery device 60 can be removed from the vasculature, leaving the replacement heart valve implant 30 in place within the native heart valve 12 (e.g., the aortic valve) to function as, for example, a suitable replacement for the native heart valve 12.

In some embodiments, the delivery device 60 may include at least one actuator element releasably connecting the replacement heart valve implant 30 to the proximal handle 70 and/or the actuation mechanism. In some embodiments, the actuation mechanism may include an internal system disposed within the proximal handle 70. The internal system may include one or more gears, pulleys, ratchets, cams, screws, or other translation and/or locking mechanisms. In some embodiments, the at least one actuation element may be releasably connected to the commissural posts 42. In some embodiments, the at least one actuation element may be releasably connected to the expandable framework 40. Other configurations are also contemplated. In some embodiments, the at least one actuator element may extend distally from the inner shaft 84 to the replacement heart valve implant 30. In some embodiments, the at least one actuator element may be slidably disposed within and/or may extend slidably through the inner shaft 84 (in one or more unillustrated lumens, for example). In some embodiments, the at least one actuator element may be used to actuate (i.e., translate axially or longitudinally, and/or expand) the replacement heart valve implant 30 between the delivery configuration and the deployed configuration. In some embodiments, the at least one actuator element may include a plurality of actuator elements, two actuator elements, three actuator elements, four actuator elements, or another suitable or desired number of actuator elements.

In some embodiments, the delivery device 60 may include an orientation mandrel 90 disposed within the orientation lumen 88. In some embodiments, the orientation mandrel 90 may be slidably disposed within the orientation lumen 88. The orientation mandrel 90 may extend distally from the proximal handle 70 within the orientation lumen 88 to a distal end disposed and/or positioned proximate the closed distal end of the orientation lumen 88. The orientation mandrel 90 may be operably coupled to an orientation mechanism 72 of the proximal handle 70. In some embodiments, the orientation mechanism 172 may be configured to apply compressive force or tensile force to the orientation mandrel 90. In some embodiments, the orientation mechanism 72 may be configured to move at least a portion of the orientation mandrel 90 axially and/or longitudinally within the orientation lumen 88 and/or relative to the inner shaft 84. In some embodiments, the orientation mechanism 72 may include an internal system disposed within the proximal handle 70. The internal system may include one or more gears, pulleys, ratchets, cams, screws, or other translation and/or locking mechanisms capable of imparting linear movement, compressive force, and/or tensile force upon the orientation mandrel 90.

Figure 4A:
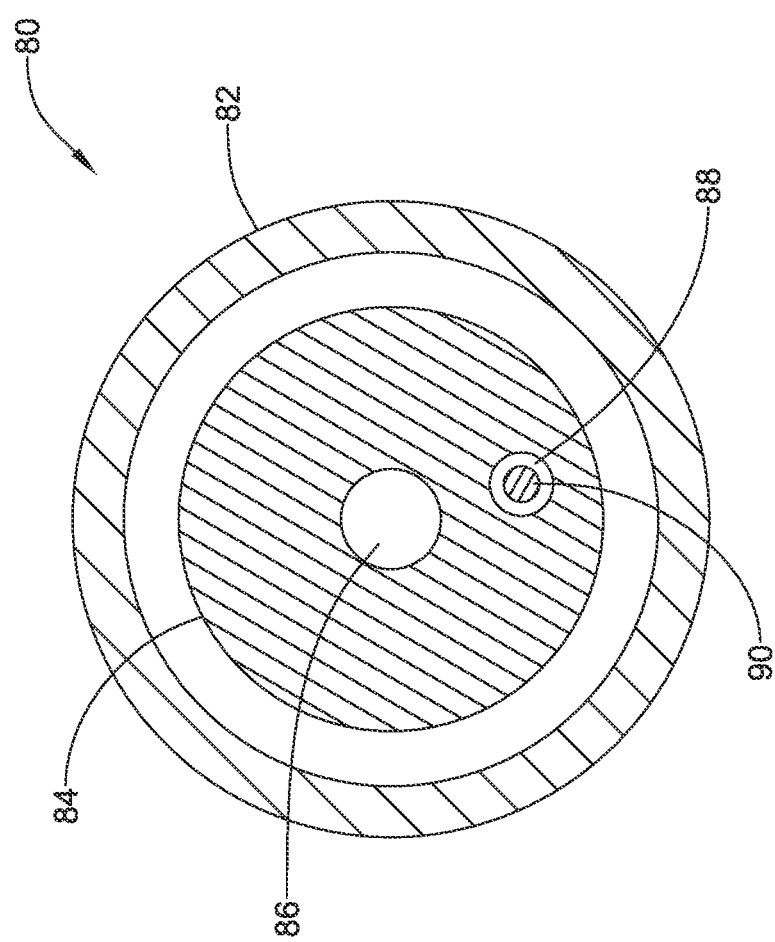
FIG. 4A is an alternative cross-section taken at line 4-4 of FIG. 3.

In some embodiments, a distal portion of the elongate catheter 80 may include a pre-formed curve configured to conform to the aortic arch 22 (e.g., FIG. 1) of the patient. In some embodiments, the pre-formed curve may define an arch 92 of the elongate catheter 80 having an inside bend 94 and an outside bend 96 disposed opposite the inside bend 94 relative to the inner shaft 84 and/or the central longitudinal axis of the inner shaft 84. In some embodiments, the pre-formed curve and/or the arch 92 may be substantially planar and/or may be formed within a bending plane. In some embodiments, the outer sheath 82 may include the pre-formed curve and/or the arch 92. In some embodiments, the inner shaft 84 may include the pre-formed curve and/or the arch 92. In some embodiments, both the outer sheath 82 and the inner shaft 84 may include the pre-formed curve and/or the arch 92. In some embodiments, the orientation mandrel 90 may be disposed along the inside bend 94 of the arch 92 of the elongate catheter 80 in a first configuration, as seen in FIG. 4. As shown in FIG. 4, in some embodiments, the orientation lumen 88 and/or the orientation mandrel 90 may be disposed within the bending plane in the first configuration. In some embodiments, the orientation lumen 88 and/or the orientation mandrel 90 may be radially and/or circumferentially offset from the inside bend 94, as seen in FIGS. 4A and 4B. As shown in FIGS. 4A and 4B, in some embodiments, the orientation lumen 88 and/or the orientation mandrel 90 may be disposed outside of (e.g. to one side of) the bending plane in the first configuration.

Figure 5:
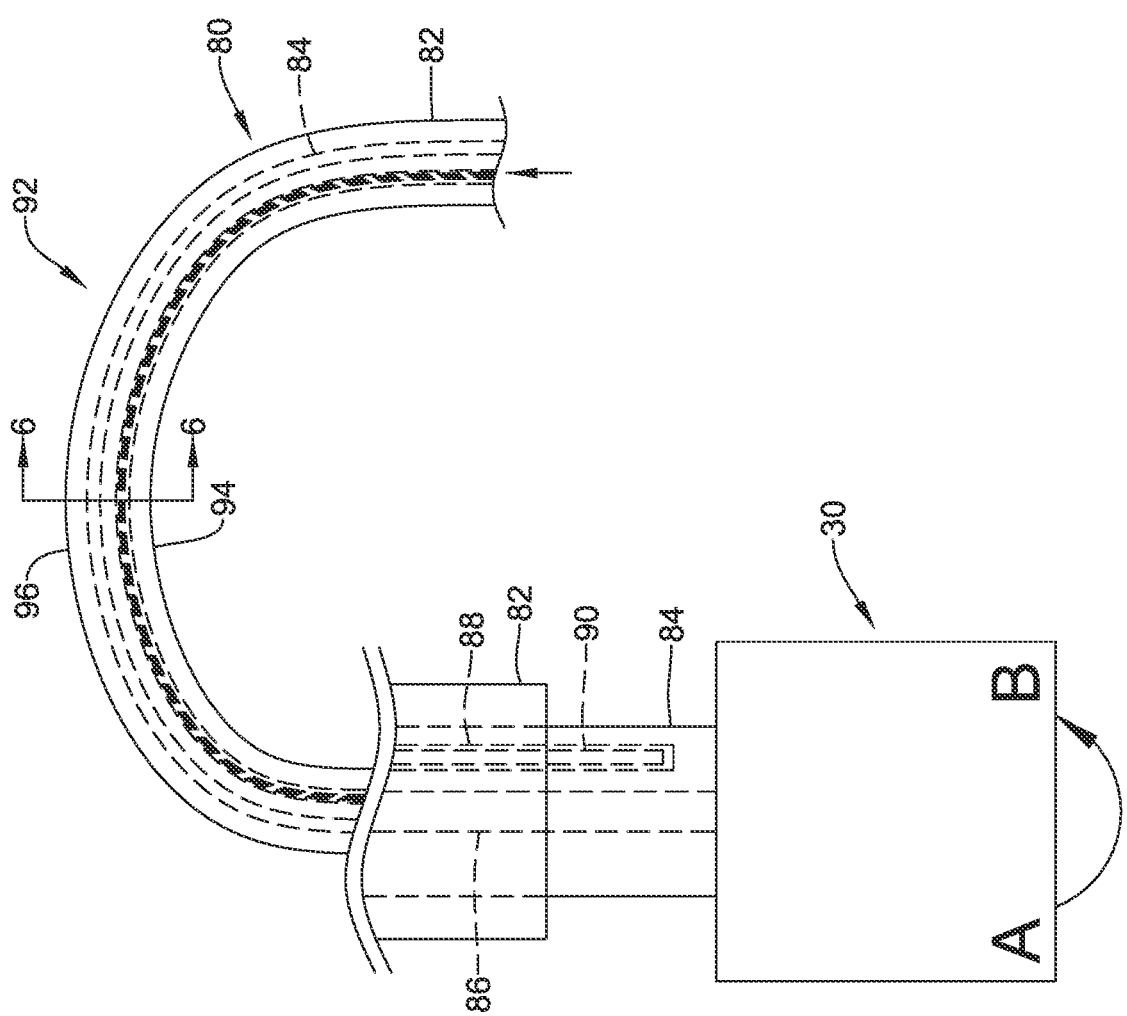
FIG. 5 schematically illustrates aspects of the system for delivering the replacement heart valve implant.

In at least some embodiments, the orientation mechanism 72 may be configured to advance the orientation mandrel 90 distally within the orientation lumen 88 and/or relative to the inner shaft 84, and/or to apply compressive force to the orientation mandrel 90, as seen in FIG. 5. In some embodiments, distal advancement of the distal end of the orientation mandrel 90 and/or applying compressive force against the closed distal end of the orientation lumen 88 may cause compressive force to build up within the orientation mandrel 90. In some embodiments, the compressive force may shift the elongate catheter 80 from the first configuration toward and/or to a second configuration described herein.

As seen in FIGS. 5 and 6, in some embodiments, the compressive force and/or distal advancement of the distal end of the orientation mandrel 90 against the closed distal end of the orientation lumen 88 may cause the inner shaft 84 to rotate about the central guidewire lumen 86 and/or the central longitudinal axis of the inner shaft 84. Rotation of the inner shaft 84 may cause and/or result in corresponding and/or commensurate rotation of the replacement heart valve implant 30 relative to the outer sheath 82. Accordingly, the orientation mechanism 72 may be used to rotate the inner shaft 84 and/or the replacement heart valve implant 30 as needed to align the commissural posts 42 of the replacement heart valve implant 30 with the commissures 16 of the native heart valve 12 (e.g., the aortic valve).

FIG. 6 illustrates orientation lumen 88 and/or the orientation mandrel 90 disposed within the bending plane in the first configuration. Applying compressive force and/or distal advancement of the distal end of the orientation mandrel 90 against the closed distal end of the orientation lumen 88 when the orientation lumen 88 and/or the orientation mandrel 90 disposed within the bending plane in the first configuration may permit rotation of the inner shaft 84 and/or the replacement heart valve implant 30 toward the second configuration in a first direction or a second direction opposite the first direction.

Figure 6A:
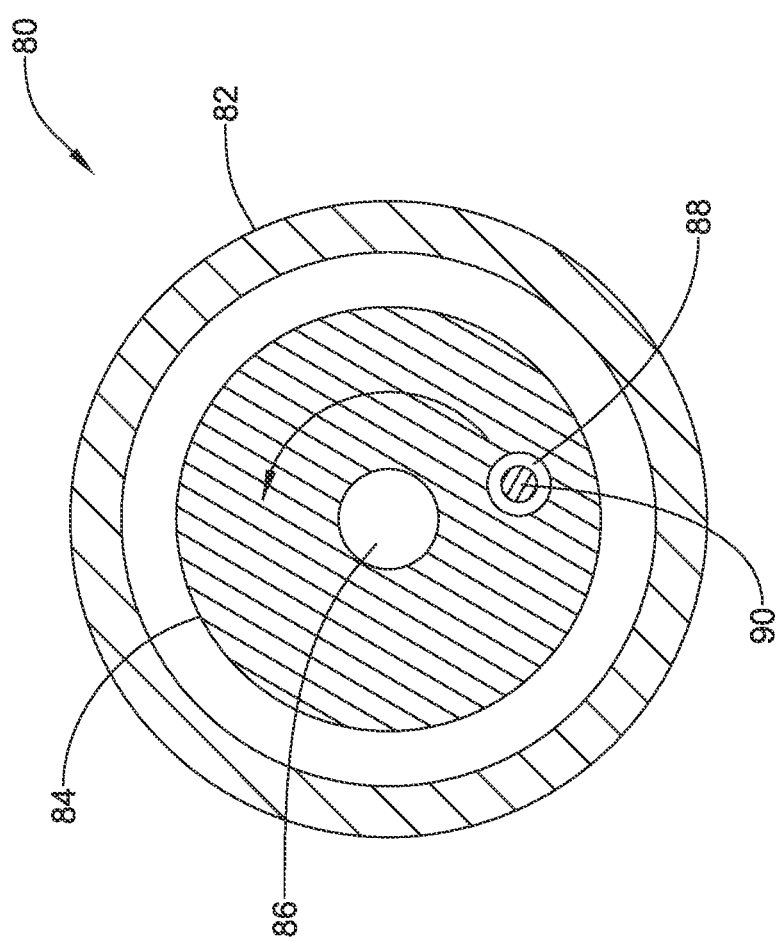
FIG. 6A is an alternative cross-section taken at line 4-4 of FIG. 5 corresponding to the configuration of FIG. 4A.

FIG. 6A illustrates orientation lumen 88 and/or the orientation mandrel 90 disposed outside of (e.g., to one side of; to a first side of; etc.) the bending plane in the first configuration. Applying compressive force and/or distal advancement of the distal end of the orientation mandrel 90 against the closed distal end of the orientation lumen 88 when the orientation lumen 88 and/or the orientation mandrel 90 disposed outside of (e.g., to one side of) the bending plane in the first configuration may permit rotation of the inner shaft 84 and/or the replacement heart valve implant 30 toward the second configuration in a first direction and/or on the first side of the bending plane.

Figure 6B:
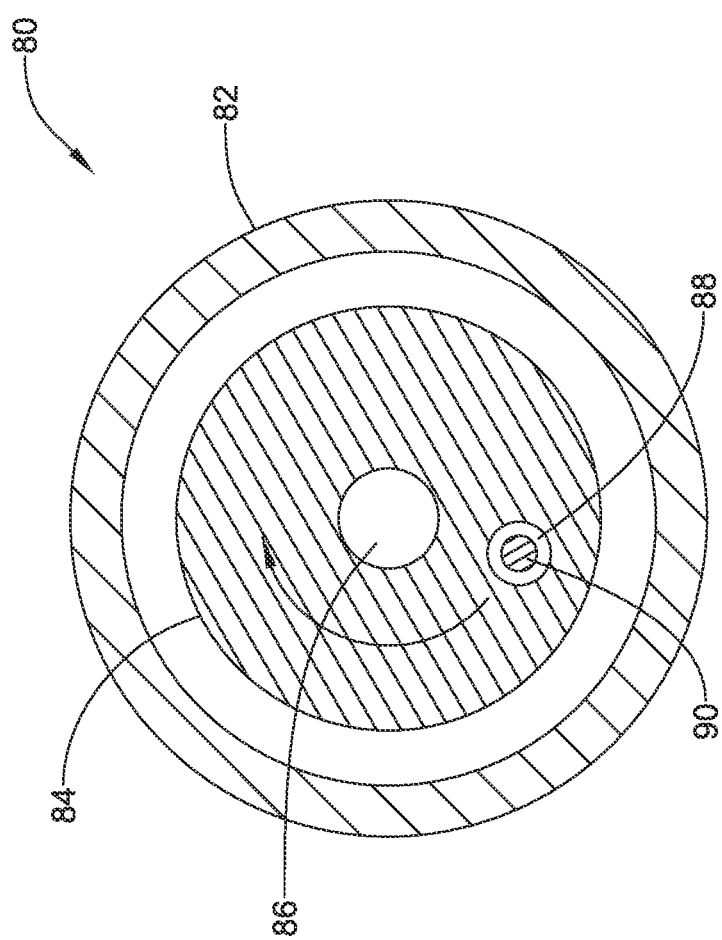
FIG. 6B is an alternative cross-section taken at line 4-4 of FIG. 5 corresponding to the configuration of FIG. 4B.
Figure 7:
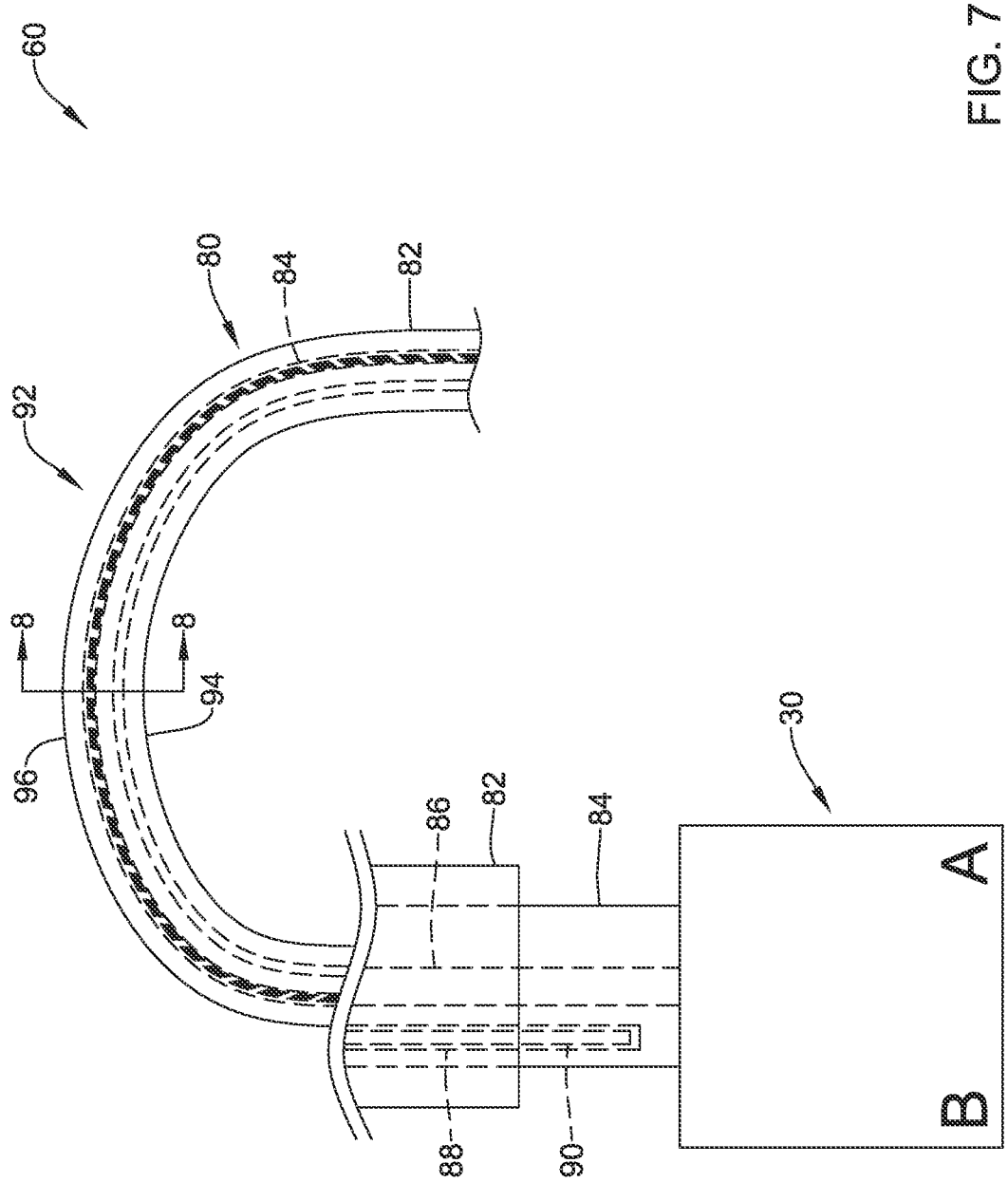
FIG. 7 schematically illustrates aspects of the system for delivering the replacement heart valve implant.
Figure 8:
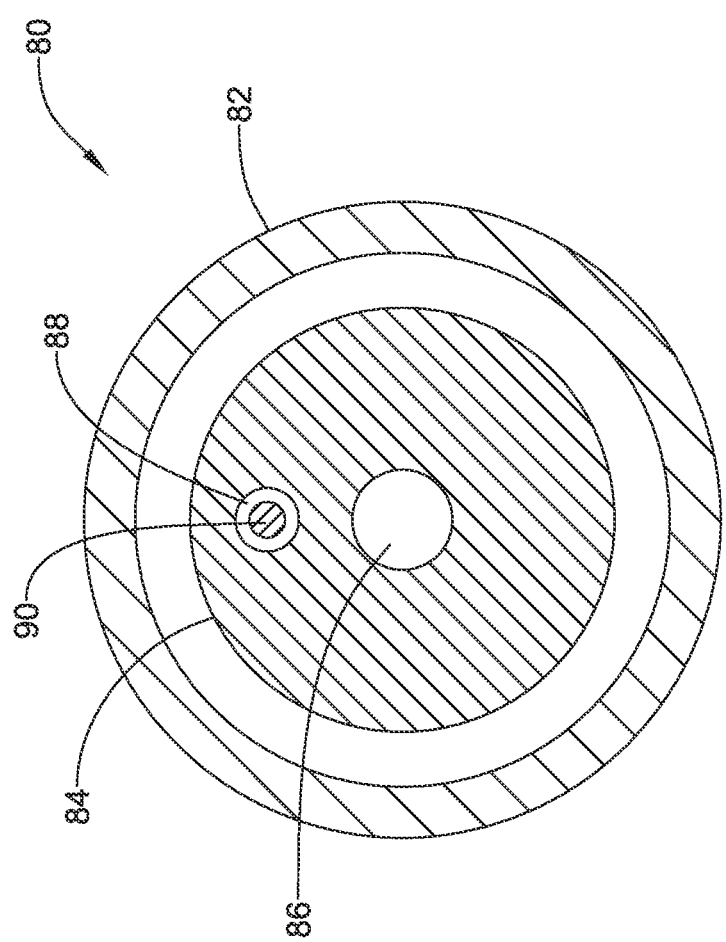
FIG. 8 is a cross-section taken at line 8-8 of FIG. 7.

FIG. 6B illustrates orientation lumen 88 and/or the orientation mandrel 90 disposed outside of (e.g., to an opposite side of; to a second side of; etc.) the bending plane in the first configuration. Applying compressive force and/or distal advancement of the distal end of the orientation mandrel 90 against the closed distal end of the orientation lumen 88 when the orientation lumen 88 and/or the orientation mandrel 90 disposed outside of (e.g., to one side of) the bending plane in the first configuration may permit rotation of the inner shaft 84 and/or the replacement heart valve implant 30 toward the second configuration in a second direction opposite the first direction and/or on the second side of the bending plane In some embodiments, the orientation mandrel 90 may be moved toward and/or disposed along the outside bend 96 of the arch 92 of the elongate catheter 80 in the second configuration, as seen in FIGS. 7 and 8. As discussed herein, the orientation lumen 88 may be laterally and/or radially offset from the central guidewire lumen 86 and/or the central longitudinal axis of the inner shaft 84, by an offset distance for example. Torque (e.g., rotation) generated within and/or by the inner shaft 84 due to the compressive force and/or distal advancement of the distal end of the orientation mandrel 90 against the closed distal end of the orientation lumen 88 may be greater and/or may increase as the offset distance increases. Accordingly, as the offset distance increases, less axial force and/or axial translation applied to the orientation mandrel 90, and/or less compressive force built up within the orientation mandrel 90, may be necessary to rotate the inner shaft 84 and/or the replacement heart valve implant 30 relative to the outer sheath 82. As may be seen by looking at reference letters A and B in FIG. 7, the replacement heart valve implant 30 has been rotated relative to the outer sheath 82. It will be understood that while some figures illustrate 180 degrees of rotation of the replacement heart valve implant 30, the replacement heart valve implant 30 may be rotate less than 180 degrees as desired. Degrees of rotation may also be affected by placement and/or location of the orientation lumen 88 and/or the orientation mandrel 90 relative to the bending plane. Placement and/or location of the reference letters A and B will be affected accordingly.

Figure 9:
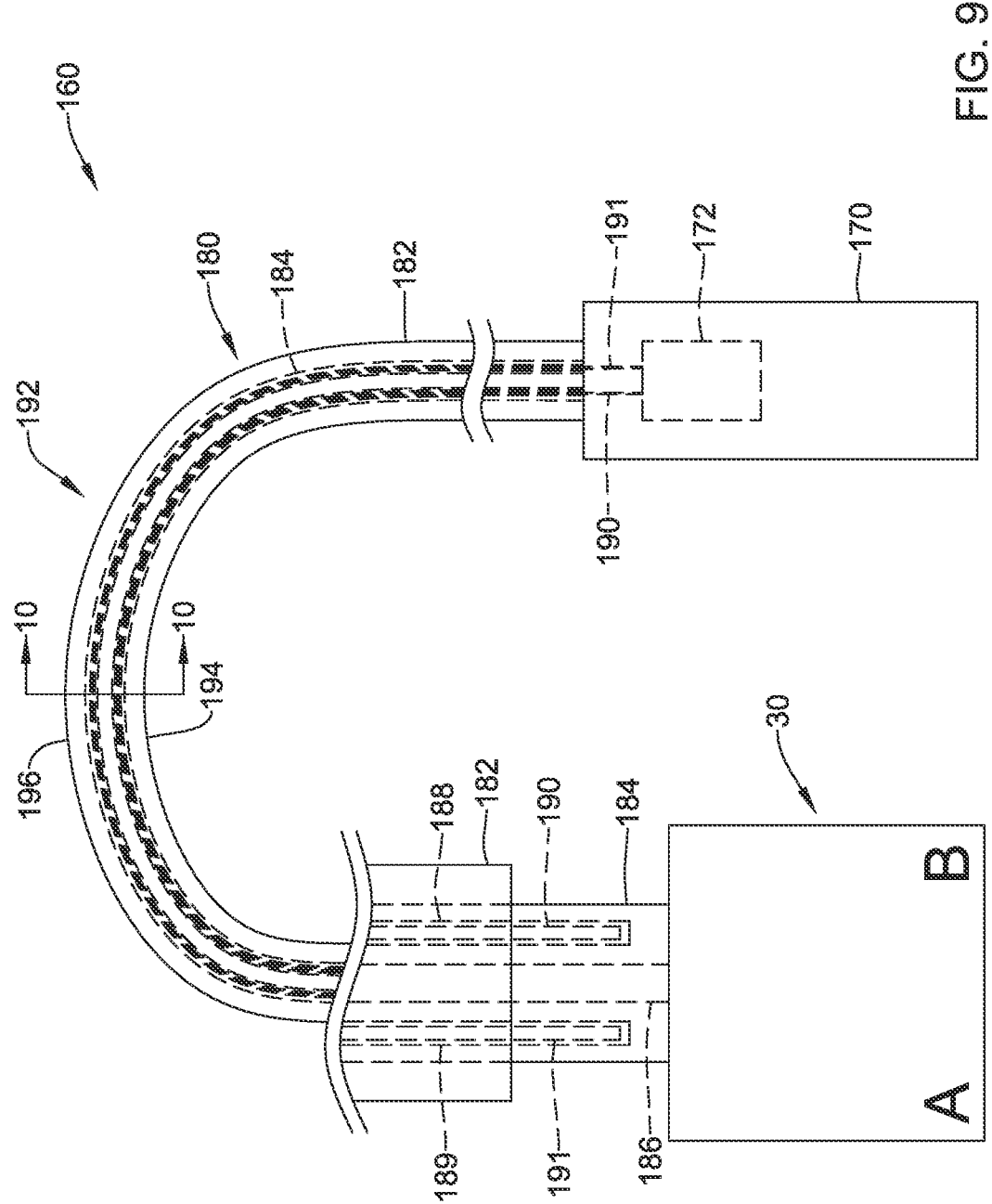
FIG. 9 schematically illustrates aspects of an alternative embodiment of the system for delivering the replacement heart valve implant.
Figure 10:
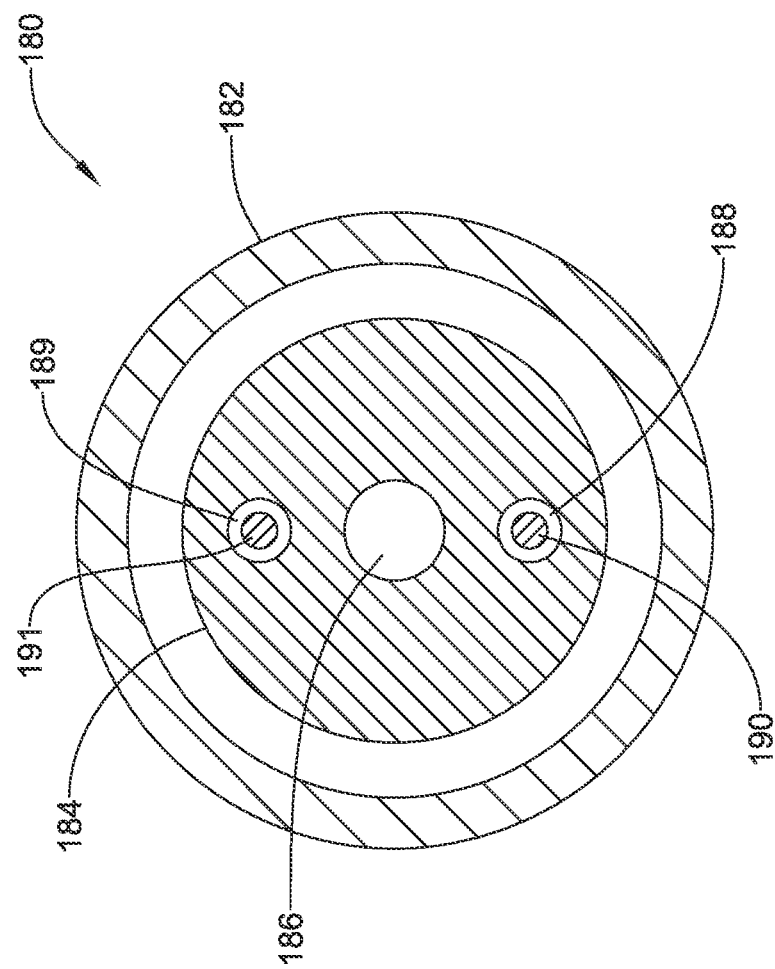
FIG. 10 is a cross-section taken at line 10-10 of FIG. 9.

FIGS. 9 and 10 illustrates aspects of an alternative embodiment of the system for delivering the replacement heart valve implant 30 to the native heart valve 12 (e.g., the aortic valve) of the patient. The system may include the replacement heart valve implant 30 as described herein. The system may include a delivery device 160 including a proximal handle 170 and an elongate catheter 180 extending distally from the proximal handle 170. The elongate catheter 180 may include an outer sheath 182 having a lumen extending therethrough and an inner shaft 184 movably disposed within and/or extending longitudinally through the lumen of the outer sheath 182.

In some embodiments, the replacement heart valve implant 30 may be releasably coupled to a distal portion of the inner shaft 184 and disposed within the lumen of the outer sheath 182 in the delivery configuration during delivery of the replacement heart valve implant 30. In some embodiments, the proximal handle 170 may be disposed and/or attached at a proximal end of the delivery device 160 and may include one or more actuation means associated therewith. In some embodiments, the inner shaft 184 may include a central guidewire lumen 186 extending longitudinally therethrough. In some embodiments, the central guidewire lumen 186 may be coaxial with a central longitudinal axis of the inner shaft 184. The central guidewire lumen 186 may be configured to slidably receive and/or slidably move over a guidewire therein. In some embodiments, the inner shaft 184 may include a first orientation lumen 188 extending longitudinally within the inner shaft 184 and a second orientation lumen 189 extending longitudinally within the inner shaft 184. In at least some embodiments, the first orientation lumen 188 and the second orientation lumen 189 may be laterally and/or radially offset from the central guidewire lumen 186 and/or the central longitudinal axis of the inner shaft 184. In some embodiments, the second orientation lumen 189 may be disposed and/or positioned opposite the first orientation lumen 188 relative to the central guidewire lumen 186 and/or the central longitudinal axis of the inner shaft 184. Other configurations are also contemplated. The first orientation lumen 188 may include and/or have a closed distal end. The closed distal end of the first orientation lumen 188 may be disposed proximal of a distal end of the inner shaft 184. The second orientation lumen 189 may include and/or have a closed distal end. The closed distal end of the second orientation lumen 189 may be disposed proximal of the distal end of the inner shaft 184.

In some embodiments, the proximal handle 170 may include an actuation mechanism (not shown) configured to manipulate the position of the outer sheath 182 relative to the inner shaft 184 and/or the replacement heart valve implant 30, and/or to aid in the deployment of the replacement heart valve implant 30. In some embodiments, the actuation mechanism may include a rotatable knob, a slider, or other element. In some embodiments, the delivery device 160 may include a nose cone disposed at a distal end thereof. The delivery device 160 and/or the nose cone may be configured to slidably receive and/or slidably move over the guidewire (not shown). In at least some embodiments, the nose cone may have an atraumatic shape.

During delivery, the replacement heart valve implant 30 may be generally disposed in the delivery configuration within the outer sheath 182 coupled to and/or distal of the inner shaft 184. Once positioned, the outer sheath 182 may be retracted relative to the inner shaft 184 and/or the replacement heart valve implant 30 to expose the replacement heart valve implant 30. The replacement heart valve implant 30 may be actuated using the proximal handle 170 and/or the actuation mechanism in order to translate the replacement heart valve implant 30 into the deployed configuration. When the replacement heart valve implant 30 is suitably deployed within the anatomy, the replacement heart valve implant 30 may be released and/or detached from the delivery device 160 and/or the inner shaft 184 and the delivery device 160 can be removed from the vasculature, leaving the replacement heart valve implant 30 in place within the native heart valve 12 (e.g., the aortic valve) to function as, for example, a suitable replacement for the native heart valve 12.

In some embodiments, the delivery device 160 may include at least one actuator element releasably connecting the replacement heart valve implant 30 to the proximal handle 170 and/or the actuation mechanism. In some embodiments, the actuation mechanism may include an internal system disposed within the proximal handle 170. The internal system may include one or more gears, pulleys, ratchets, screws, cams, or other translation and/or locking mechanisms. In some embodiments, the at least one actuation element may be releasably connected to the commissural posts 42. In some embodiments, the at least one actuation element may be releasably connected to the expandable framework 40. Other configurations are also contemplated. In some embodiments, the at least one actuator element may extend distally from the inner shaft 184 to the replacement heart valve implant 30. In some embodiments, the at least one actuator element may be slidably disposed within and/or may extend slidably through the inner shaft 184 (in one or more unillustrated lumens, for example). In some embodiments, the at least one actuator element may be used to actuate (i.e., translate axially or longitudinally, and/or expand) the replacement heart valve implant 30 between the delivery configuration and the deployed configuration. In some embodiments, the at least one actuator element may include a plurality of actuator elements, two actuator elements, three actuator elements, four actuator elements, or another suitable or desired number of actuator elements.

In some embodiments, the delivery device 160 may include a first orientation mandrel 190 slidably disposed within the first orientation lumen 188. The first orientation mandrel 190 may extend distally from the proximal handle 170 within the first orientation lumen 188 to a distal end disposed and/or positioned proximate the closed distal end of the first orientation lumen 188. The first orientation mandrel 190 may be operably coupled to an orientation mechanism 172 of the proximal handle 170. The orientation mechanism 172 may be configured to move at least a portion of the first orientation mandrel 190 axially and/or longitudinally within the first orientation lumen 188 and/or relative to the inner shaft 184.

In some embodiments, the delivery device 160 may include a second orientation mandrel 191 slidably disposed within the second orientation lumen 189. The second orientation mandrel 191 may extend distally from the proximal handle 170 within the second orientation lumen 189 to a distal end disposed and/or positioned proximate the closed distal end of the second orientation lumen 189. The second orientation mandrel 191 may be operably coupled to the orientation mechanism 172 of the proximal handle 170. The orientation mechanism 172 may be configured to move at least a portion of the second orientation mandrel 191 axially and/or longitudinally within the second orientation lumen 189 and/or relative to the inner shaft 184.

In some embodiments, the orientation mechanism 172 may include an internal system disposed within the proximal handle 170. The internal system may include one or more gears, pulleys, ratchets, cams, screws, or other translation and/or locking mechanisms capable of imparting linear movement, compressive force, and/or tensile force upon the first orientation mandrel 190 and/or the second orientation mandrel 191.

In some embodiments, a distal portion of the elongate catheter 180 may include a pre-formed curve configured to conform to the aortic arch 22 (e.g., FIG. 1) of the patient. In some embodiments, the pre-formed curve may define an arch 192 of the elongate catheter 180 having an inside bend 194 and an outside bend 196 disposed opposite the inside bend 194 relative to the inner shaft 184 and/or the central longitudinal axis of the inner shaft 184. In some embodiments, the pre-formed curve and/or the arch 192 may be substantially planar and/or may be formed within a bending plane. In some embodiments, the outer sheath 182 may include the pre-formed curve and/or the arch 192. In some embodiments, the inner shaft 184 may include the pre-formed curve and/or the arch 192. In some embodiments, both the outer sheath 182 and the inner shaft 184 may include the pre-formed curve and/or the arch 192. In some embodiments, the first orientation mandrel 190 may be disposed along the inside bend 194 of the arch 192 of the elongate catheter 180 and the second orientation mandrel 191 may be disposed along the outside bend 196 of the arch 192 of the elongate catheter 180 in a first configuration, as seen in FIG. 10.

As shown in FIG. 10, in some embodiments, the first orientation lumen 188 and/or the first orientation mandrel 190 may be disposed within the bending plane in the first configuration. In some embodiments, the second orientation lumen 189 and/or the second orientation mandrel 191 may be disposed within the bending plane in the first configuration. In some embodiments, the first orientation lumen 188 and/or the first orientation mandrel 190 and the second orientation lumen 189 and/or the second orientation mandrel 191 may be radially and/or circumferentially offset from the inside bend 194, similar to the configuration shown in FIGS. 4A and 4B. In some embodiments, the first orientation lumen 188 and/or the first orientation mandrel 190 and the second orientation lumen 189 and/or the second orientation mandrel 191 may be disposed outside of (e.g. to one side of) the bending plane in the first configuration.

In some embodiments, the orientation mechanism 172 may be configured to advance the first orientation mandrel 190 distally within the first orientation lumen 188 and/or relative to the inner shaft 184. In some embodiments, distal advancement of the distal end of the first orientation mandrel 190 against the closed distal end of the first orientation lumen 188 may cause compressive force to build up within the first orientation mandrel 190. In some embodiments, the compressive force may shift the elongate catheter 180 from the first configuration toward and/or to a second configuration described herein.

In some embodiments, the compressive force and/or distal advancement of the distal end of the first orientation mandrel 190 against the closed distal end of the first orientation lumen 188 may cause the inner shaft 184 to rotate about the central guidewire lumen 186 and/or the central longitudinal axis of the inner shaft 184 in a first direction. Rotation of the inner shaft 184 in the first direction may cause and/or result in corresponding and/or commensurate rotation of the replacement heart valve implant 30 relative to the outer sheath 182 in the first direction.

In some embodiments, the orientation mechanism 172 may be configured to advance the second orientation mandrel 191 distally within the second orientation lumen 189 and/or relative to the inner shaft 184. In some embodiments, distal advancement of the distal end of the second orientation mandrel 191 against the closed distal end of the second orientation lumen 189 may cause compressive force to build up within the second orientation mandrel 191. In some embodiments, the compressive force may shift the elongate catheter 180 from the first configuration toward and/or to a second configuration described herein.

In some embodiments, the compressive force and/or distal advancement of the distal end of the second orientation mandrel 191 against the closed distal end of the second orientation lumen 189 may cause the inner shaft 184 to rotate about the central guidewire lumen 186 and/or the central longitudinal axis of the inner shaft 184 in a second direction opposite the first direction. Rotation of the inner shaft 184 in the second direction may cause and/or result in corresponding and/or commensurate rotation of the replacement heart valve implant 30 relative to the outer sheath 182 in the second direction. Accordingly, the orientation mechanism 172 may be used to rotate the inner shaft 184 and/or the replacement heart valve implant 30 in the first direction and/or the second direction as needed to align the commissural posts 42 of the replacement heart valve implant 30 with the commissures 16 of the native heart valve 12 (e.g., the aortic valve). In some embodiments, the first orientation mandrel 190 may be moved toward and/or disposed along the outside bend 196 of the arch 192 of the elongate catheter 180 and the second orientation mandrel 191 may be moved toward and/or disposed along the inside bend 194 of the arch 192 of the elongate catheter 180 in the second configuration.

As discussed herein, the first orientation lumen 188 and the second orientation lumen 189 may be laterally and/or radially offset from the central guidewire lumen 186 and/or the central longitudinal axis of the inner shaft 184, by an offset distance for example. Torque (e.g., rotation) generated within and/or by the inner shaft 184 due to the compressive force and/or distal advancement of the distal end of the first orientation mandrel 190 against the closed distal end of the first orientation lumen 188 and/or the second orientation mandrel 191 against the closed distal end of the second orientation lumen 189 may be greater and/or may increase as the offset distance increases. Accordingly, as the offset distance increases, less axial force and/or axial translation applied to the first orientation mandrel 190 and/or the second orientation mandrel 191, and/or less compressive force built up within the first orientation mandrel 190 and/or the second orientation mandrel 191, may be necessary to rotate the inner shaft 184 and/or the replacement heart valve implant 30 relative to the outer sheath 182.

In an alternative configuration, the distal end of the first orientation mandrel 190 and/or the second orientation mandrel 191 may be fixedly secured to the inner shaft 184 and/or within the first orientation lumen 188 and/or the second orientation lumen 189, respectively. Tensile force may be applied to the first orientation mandrel 190 and/or the second orientation mandrel 191 using and/or by the orientation mechanism 172 to reverse the direction of rotation of the inner shaft 184 and/or the replacement heart valve implant 30 relative to the outer sheath 182.

In some embodiments, directional control over rotation of the inner shaft 184 and/or the replacement heart valve implant 30 relative to the outer sheath 182 may be provided by locating the first orientation lumen 188 and/or the first orientation mandrel 190, and the second orientation lumen 189 and/or the second orientation mandrel 191, outside of (e.g., to one side of) the bending plane in the first configuration, as described above with respect to FIGS. 4-6. Applying compressive force and/or tensile force to the first orientation mandrel 190 may cause rotation of the inner shaft 184 and/or the replacement heart valve implant 30 relative to the outer sheath 182 along and/or on a first side of the bending plane. Applying compressive force and/or tensile force to the second orientation mandrel 191 may cause rotation of the inner shaft 184 and/or the replacement heart valve implant 30 relative to the outer sheath 182 along and/or on a second side of the bending plane opposite the first side of the bending plane.

Figure 11:
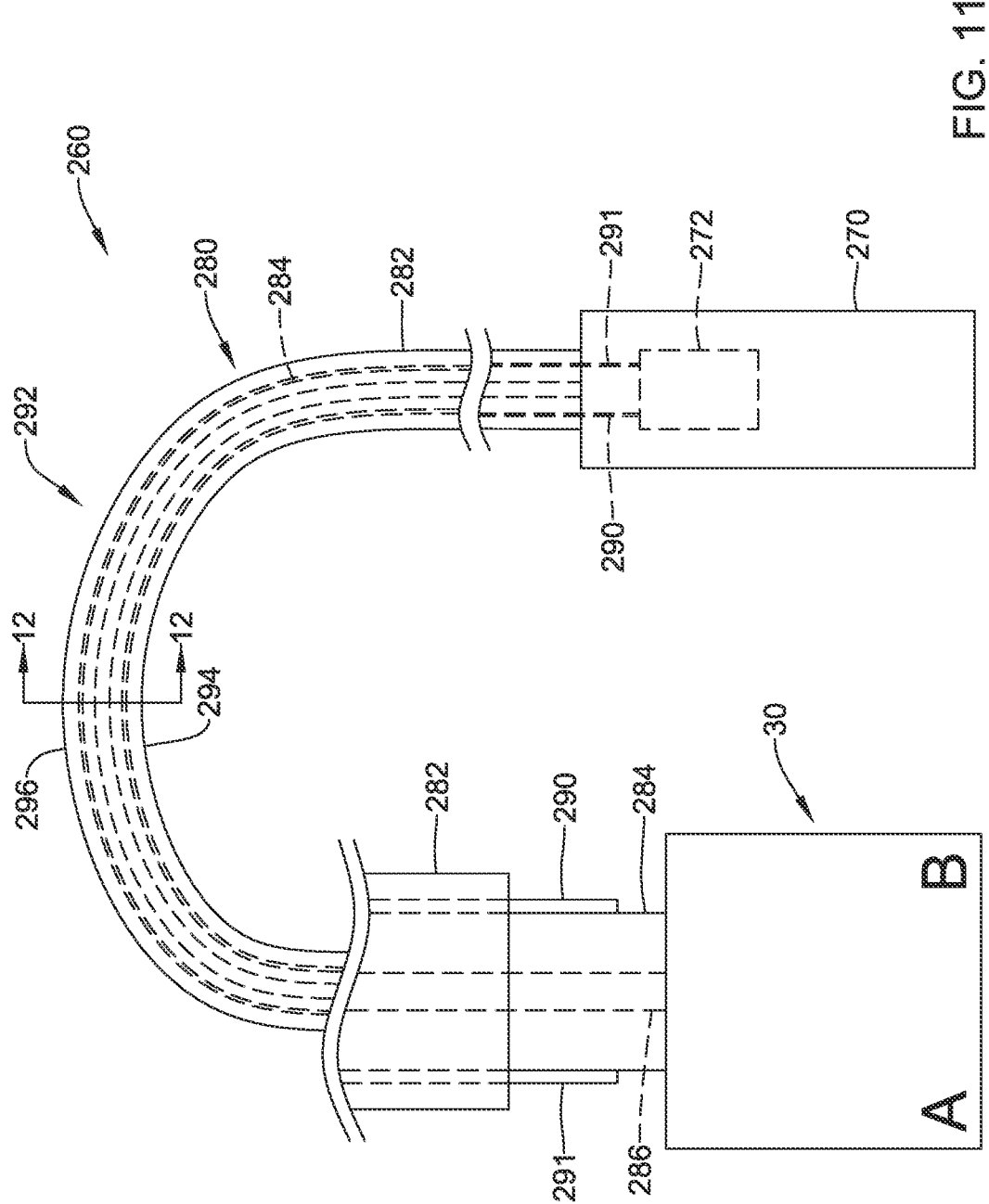
FIG. 11 schematically illustrates aspects of an alternative embodiment of the system for delivering the replacement heart valve implant.
Figure 12:
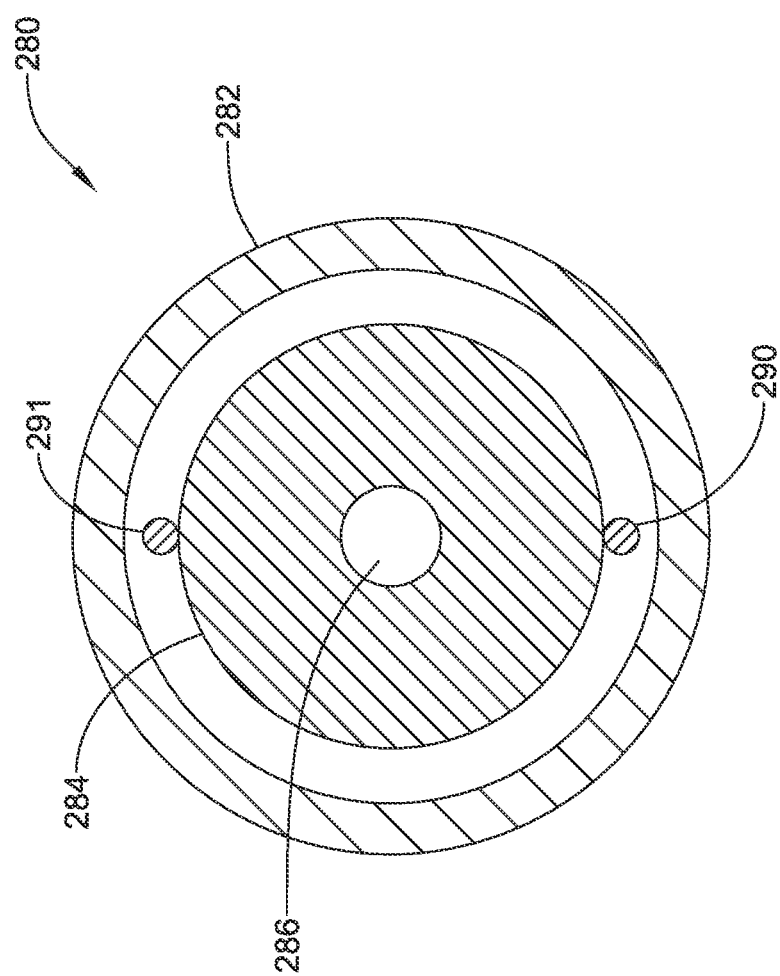
FIG. 12 is a cross-section taken at line 12-12 of FIG. 11.

FIGS. 11 and 12 illustrates aspects of an alternative embodiment of a system for delivering the replacement heart valve implant 30 to the native heart valve 12 (e.g., the aortic valve) of the patient. The system may include the replacement heart valve implant 30 as described herein. The system may include a delivery device 260 including a proximal handle 270 and an elongate catheter 280 extending distally from the proximal handle 270. The elongate catheter 280 may include an outer sheath 282 having a lumen extending therethrough and an inner shaft 284 movably disposed within and/or extending longitudinally through the lumen of the outer sheath 282.

In some embodiments, the replacement heart valve implant 30 may be releasably coupled to a distal portion of the inner shaft 284 and disposed within the lumen of the outer sheath 282 in the delivery configuration during delivery of the replacement heart valve implant 30. In some embodiments, the proximal handle 270 may be disposed and/or attached at a proximal end of the delivery device 260 and may include one or more actuation means associated therewith. In some embodiments, the inner shaft 284 may include a central guidewire lumen 286 extending longitudinally therethrough. In some embodiments, the central guidewire lumen 286 may be coaxial with a central longitudinal axis of the inner shaft 284. The central guidewire lumen 286 may be configured to slidably receive and/or slidably move over a guidewire therein.

In some embodiments, the proximal handle 270 may include an actuation mechanism (not shown) configured to manipulate the position of the outer sheath 282 relative to the inner shaft 284 and/or the replacement heart valve implant 30, and/or to aid in the deployment of the replacement heart valve implant 30. In some embodiments, the actuation mechanism may include a rotatable knob, a slider, or other element. In some embodiments, the delivery device 260 may include a nose cone disposed at a distal end thereof. The delivery device 260 and/or the nose cone may be configured to slidably receive and/or slidably move over the guidewire (not shown). In at least some embodiments, the nose cone may have an atraumatic shape.

During delivery, the replacement heart valve implant 30 may be generally disposed in the delivery configuration within the outer sheath 282 coupled to and/or distal of the inner shaft 284. Once positioned, the outer sheath 282 may be retracted relative to the inner shaft 284 and/or the replacement heart valve implant 30 to expose the replacement heart valve implant 30. The replacement heart valve implant 30 may be actuated using the proximal handle 270 and/or the actuation mechanism in order to translate the replacement heart valve implant 30 into the deployed configuration. When the replacement heart valve implant 30 is suitably deployed within the anatomy, the replacement heart valve implant 30 may be released and/or detached from the delivery device 260 and/or the inner shaft 284 and the delivery device 260 can be removed from the vasculature, leaving the replacement heart valve implant 30 in place within the native heart valve 12 (e.g., the aortic valve) to function as, for example, a suitable replacement for the native heart valve 12.

In some embodiments, the delivery device 260 may include at least one actuator element releasably connecting the replacement heart valve implant 30 to the proximal handle 270 and/or the actuation mechanism. In some embodiments, the actuation mechanism may include an internal system disposed within the proximal handle 270. The internal system may include one or more gears, pulleys, ratchets, screws, cams, or other translation and/or locking mechanisms. In some embodiments, the at least one actuation element may be releasably connected to the commissural posts 42. In some embodiments, the at least one actuation element may be releasably connected to the expandable framework 40. Other configurations are also contemplated. In some embodiments, the at least one actuator element may extend distally from the inner shaft 284 to the replacement heart valve implant 30. In some embodiments, the at least one actuator element may be slidably disposed within and/or may extend slidably through the inner shaft 284 (in one or more unillustrated lumens, for example). In some embodiments, the at least one actuator element may be used to actuate (i.e., translate axially or longitudinally, and/or expand) the replacement heart valve implant 30 between the delivery configuration and the deployed configuration. In some embodiments, the at least one actuator element may include a plurality of actuator elements, two actuator elements, three actuator elements, four actuator elements, or another suitable or desired number of actuator elements.

In some embodiments, the delivery device 260 may include a first orientation mandrel 290 attached to an outside surface of the inner shaft 284. The first orientation mandrel 290 may extend distally from the proximal handle 270 to a first distal end fixedly attached to the inner shaft 284 proximate a distal end of the inner shaft 284. The first orientation mandrel 290 may be operably coupled to an orientation mechanism 272 of the proximal handle 270. The orientation mechanism 272 may be configured to move at least a portion of the first orientation mandrel 290 axially and/or longitudinally relative to the inner shaft 284.

In some embodiments, the delivery device 260 may include a second orientation mandrel 291 attached to the outside surface of the inner shaft 284 opposite the first orientation mandrel 290 relative to the central guidewire lumen 286 and/or the central longitudinal axis of the inner shaft 284. The second orientation mandrel 291 may extend distally from the proximal handle 270 to a second distal end fixedly attached to the inner shaft 284 proximate the distal end of the inner shaft 284. The second orientation mandrel 291 may be operably coupled to the orientation mechanism 272 of the proximal handle 270. The orientation mechanism 272 may be configured to move at least a portion of the second orientation mandrel 291 axially and/or longitudinally relative to the inner shaft 284.

In some embodiments, the orientation mechanism 272 may include an internal system disposed within the proximal handle 270. The internal system may include one or more gears, pulleys, ratchets, cams, screws, or other translation and/or locking mechanisms capable of imparting linear movement, compressive force, and/or tensile force upon the first orientation mandrel 290 and/or the second orientation mandrel 291.

In some embodiments, a distal portion of the elongate catheter 280 may include a pre-formed curve configured to conform to the aortic arch 22 (e.g., FIG. 1) of the patient. In some embodiments, the pre-formed curve may define an arch 292 of the elongate catheter 280 having an inside bend 294 and an outside bend 296 disposed opposite the inside bend 294 relative to the inner shaft 284 and/or the central longitudinal axis of the inner shaft 284. In some embodiments, the pre-formed curve and/or the arch 292 may be substantially planar and/or may be formed within a bending plane. In some embodiments, the outer sheath 282 may include the pre-formed curve and/or the arch 292. In some embodiments, the inner shaft 284 may include the pre-formed curve and/or the arch 292. In some embodiments, both the outer sheath 282 and the inner shaft 284 may include the pre-formed curve and/or the arch 292. In some embodiments, the first orientation mandrel 290 may be disposed along the inside bend 294 of the arch 292 of the elongate catheter 280 and the second orientation mandrel 291 may be disposed along the outside bend 296 of the arch 292 of the elongate catheter 280 in a first configuration, as seen in FIG. 12.

Figure 13:
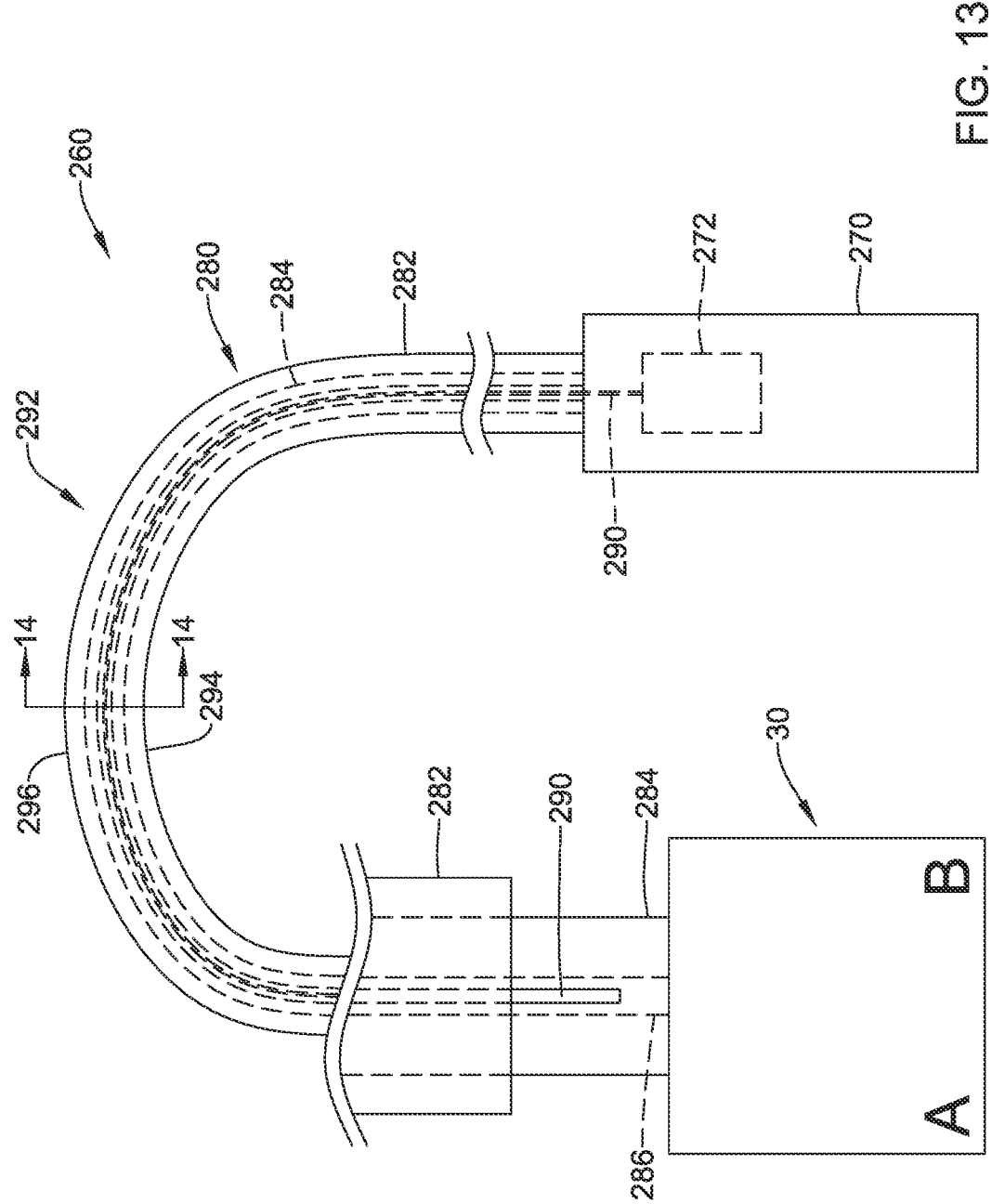
FIG. 13 schematically illustrates aspects of an alternative embodiment of the system for delivering the replacement heart valve implant.
Figure 14:
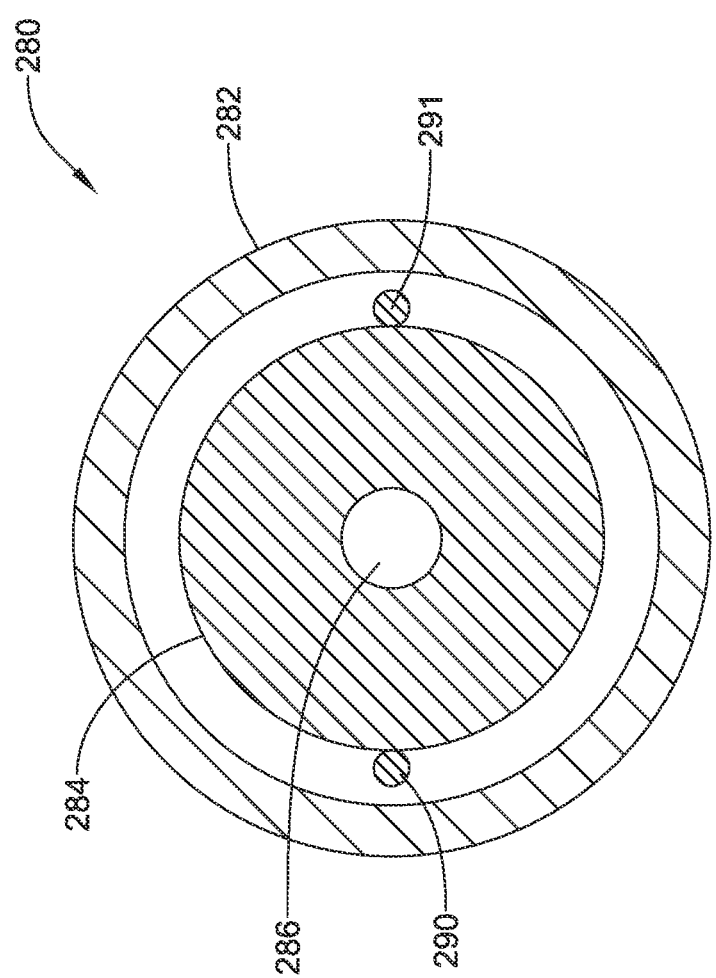
FIG. 14 is a cross-section taken at line 14-14 of FIG. 13.

As shown in FIG. 12, in some embodiments, the first orientation mandrel 290 and the second orientation mandrel 291 may be disposed within the bending plane in the first configuration. In some embodiments, the first orientation mandrel 290 and the second orientation mandrel 291 may be radially and/or circumferentially offset from the inside bend 294, as seen in FIGS. 13 and 14. In some embodiments, the first orientation mandrel 190 and the second orientation mandrel 191 may be disposed outside of (e.g. to one side of) the bending plane in the first configuration. In some embodiments, the first orientation mandrel 290 and the second orientation mandrel 291 may be positioned to define a preferred bending plane that is independent of and/or such that the distal portion of the elongate catheter 280 does not include the pre-formed curve. The preferred bending plane may conform to and/or self-align with the aortic arch 22 when the elongate catheter 280 is positioned therein. In some embodiments, the first orientation mandrel 290 and the second orientation mandrel 291 may be positioned opposite each other relative to the preferred bending plane. In some embodiments, the first orientation mandrel 290 and the second orientation mandrel 291 may be positioned at approximately 90 degrees to the preferred bending plane, as shown in FIGS. 13 and 14.

In some embodiments, the orientation mechanism 272 may be configured to advance at least a portion of the first orientation mandrel 290 distally relative to the inner shaft 284. In some embodiments, distal advancement against the first distal end of the first orientation mandrel 290 fixedly attached to the inner shaft 284 may cause compressive force to build up within the first orientation mandrel 290. In some embodiments, the compressive force may shift the elongate catheter 280 from the first configuration toward and/or to a second configuration described herein.

In some embodiments, the compressive force and/or distal advancement of at least a portion of the first orientation mandrel 290 against the first distal end of the first orientation mandrel 290 fixedly attached to the inner shaft 284 may cause the inner shaft 284 to rotate about the central guidewire lumen 286 and/or the central longitudinal axis of the inner shaft 284 in a first direction to shift the elongate catheter 280 from the first configuration toward and/or to the second configuration. Rotation of the inner shaft 284 in the first direction may cause and/or result in corresponding and/or commensurate rotation of the replacement heart valve implant 30 relative to the outer sheath 282 in the first direction. In some embodiments, the first direction is counterclockwise as viewed distally to proximally along the inner shaft 284.

In some embodiments, the orientation mechanism 272 may be configured to retract at least a portion of the first orientation mandrel 290 proximally relative to the inner shaft 284. In some embodiments, proximal retraction of the first distal end of the first orientation mandrel 290 fixedly attached to the inner shaft 284 may cause a tensile force to build up within the first orientation mandrel 290. In some embodiments, the tensile force may shift the elongate catheter 280 from the first configuration toward and/or to the second configuration described herein.

In some embodiments, the tensile force and/or proximal retraction of the first distal end of the first orientation mandrel 290 fixedly attached to the inner shaft 284 may cause the inner shaft 284 to rotate about the central guidewire lumen 286 and/or the central longitudinal axis of the inner shaft 284 in a second direction opposite the first direction to shift the elongate catheter 280 from the first configuration toward and/or to the second configuration. Rotation of the inner shaft 284 in the second direction may cause and/or result in corresponding and/or commensurate rotation of the replacement heart valve implant 30 relative to the outer sheath 282 in the second direction. In some embodiments, the second direction is clockwise as viewed distally to proximally along the inner shaft 284.

In some embodiments, the orientation mechanism 272 may be configured to advance at least a portion of the second orientation mandrel 291 distally relative to the inner shaft 184. In some embodiments, distal advancement against the second distal end of the second orientation mandrel 291 fixedly attached to the inner shaft 284 may cause compressive force to build up within the second orientation mandrel 291. In some embodiments, the compressive force may shift the elongate catheter 280 from the first configuration toward and/or to a second configuration described herein.

In some embodiments, the compressive force and/or distal advancement of at least a portion of the second orientation mandrel 291 against the second distal end of the second orientation mandrel 291 fixedly attached to the inner shaft 284 may cause the inner shaft 284 to rotate about the central guidewire lumen 286 and/or the central longitudinal axis of the inner shaft 284 in the second direction opposite the first direction to shift the elongate catheter 280 from the first configuration toward and/or to the second configuration. Rotation of the inner shaft 284 in the second direction may cause and/or result in corresponding and/or commensurate rotation of the replacement heart valve implant 30 relative to the outer sheath 282 in the second direction. In some embodiments, the second direction is clockwise as viewed distally to proximally along the inner shaft 284.

Accordingly, the orientation mechanism 272 may be used to rotate the inner shaft 284 and/or the replacement heart valve implant 30 in the first direction and/or the second direction as needed to align the commissural posts 42 of the replacement heart valve implant 30 with the commissures 16 of the native heart valve 12 (e.g., the aortic valve). In some embodiments, the first orientation mandrel 290 may be moved toward and/or disposed along the outside bend 296 of the arch 292 of the elongate catheter 280 and the second orientation mandrel 291 may be moved toward and/or disposed along the inside bend 294 of the arch 292 of the elongate catheter 280 in the second configuration.

In some embodiments, directional control over rotation of the inner shaft 284 and/or the replacement heart valve implant 30 relative to the outer sheath 282 may be provided by locating the first orientation mandrel 290 and the second orientation mandrel 191 outside of (e.g., to one side of) the bending plane and/or the preferred bending plane in the first configuration, as described above with respect to FIGS. 4-6. For example, applying compressive force and/or tensile force to the first orientation mandrel 290 may cause rotation of the inner shaft 284 and/or the replacement heart valve implant 30 relative to the outer sheath 282 along and/or on a first side of the bending plane and/or the preferred bending plane. Applying compressive force and/or tensile force to the second orientation mandrel 291 may cause rotation of the inner shaft 284 and/or the replacement heart valve implant 30 relative to the outer sheath 282 along and/or on a second side of the bending plane and/or the preferred bending plane opposite the first side of the bending plane and/or the preferred bending plane.

Figure 15:
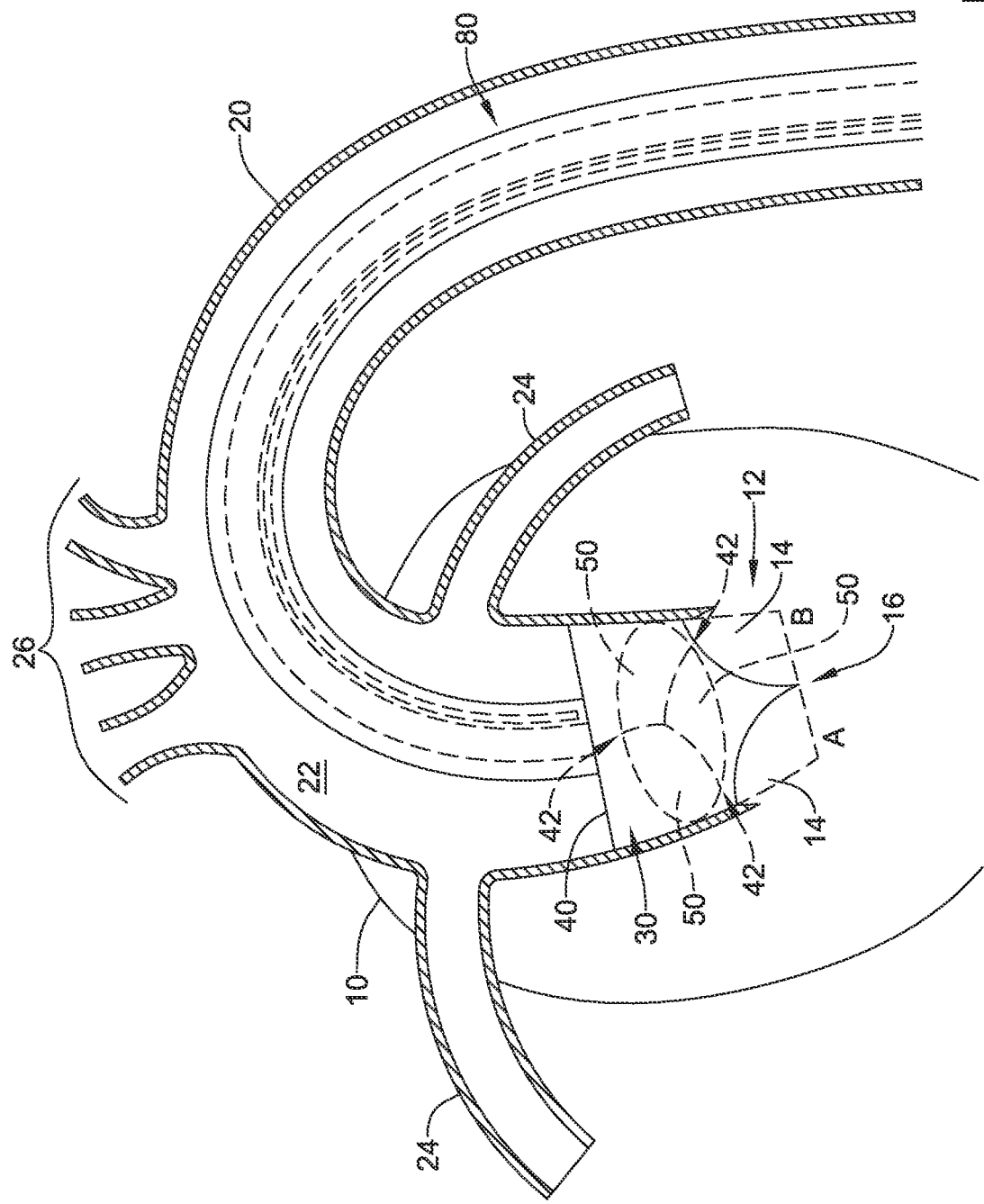
FIGS. 15-17 illustrate aspects of a method of delivering the replacement heart valve implant to a native heart valve.
Figure 16:
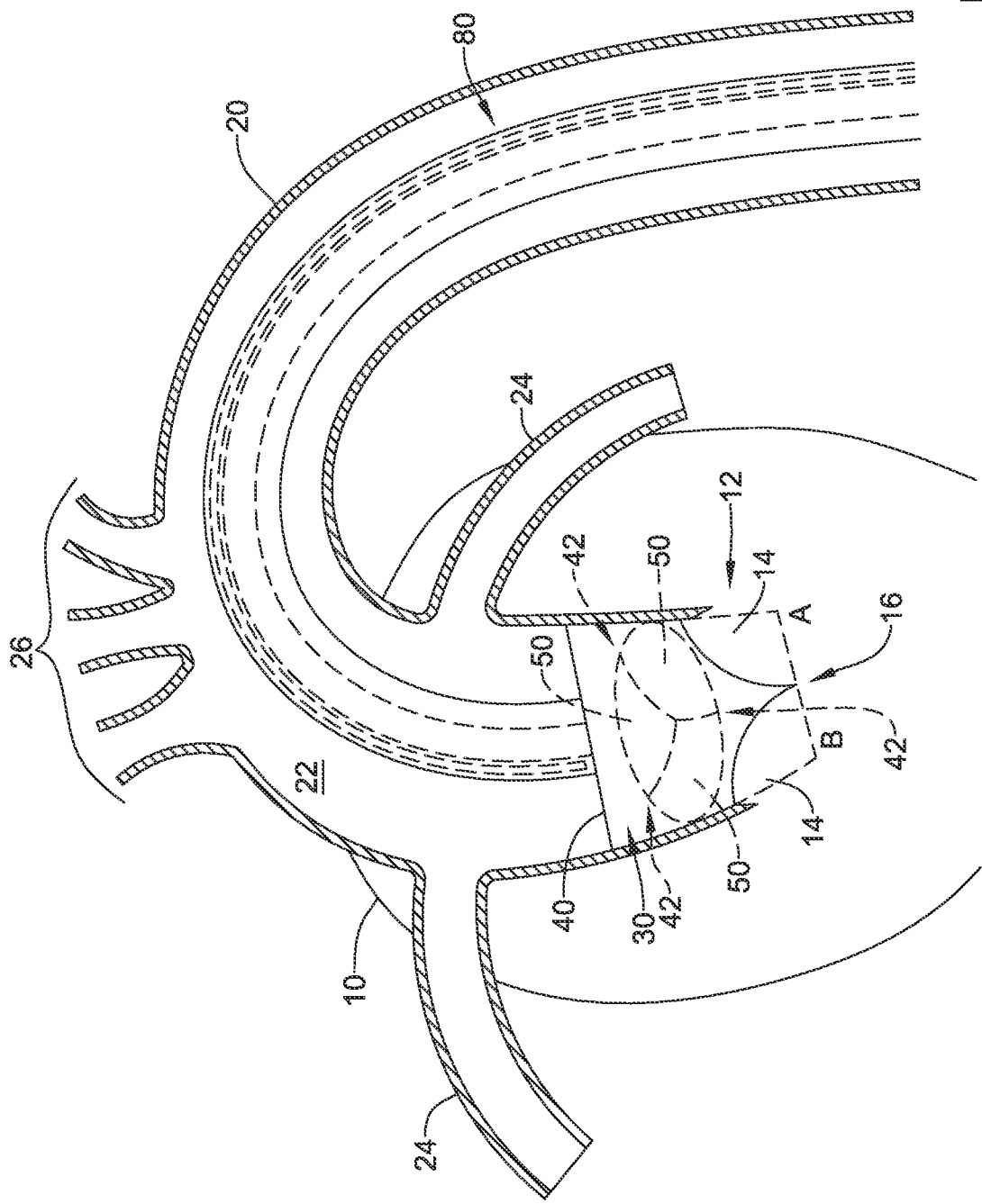
Figure 17:
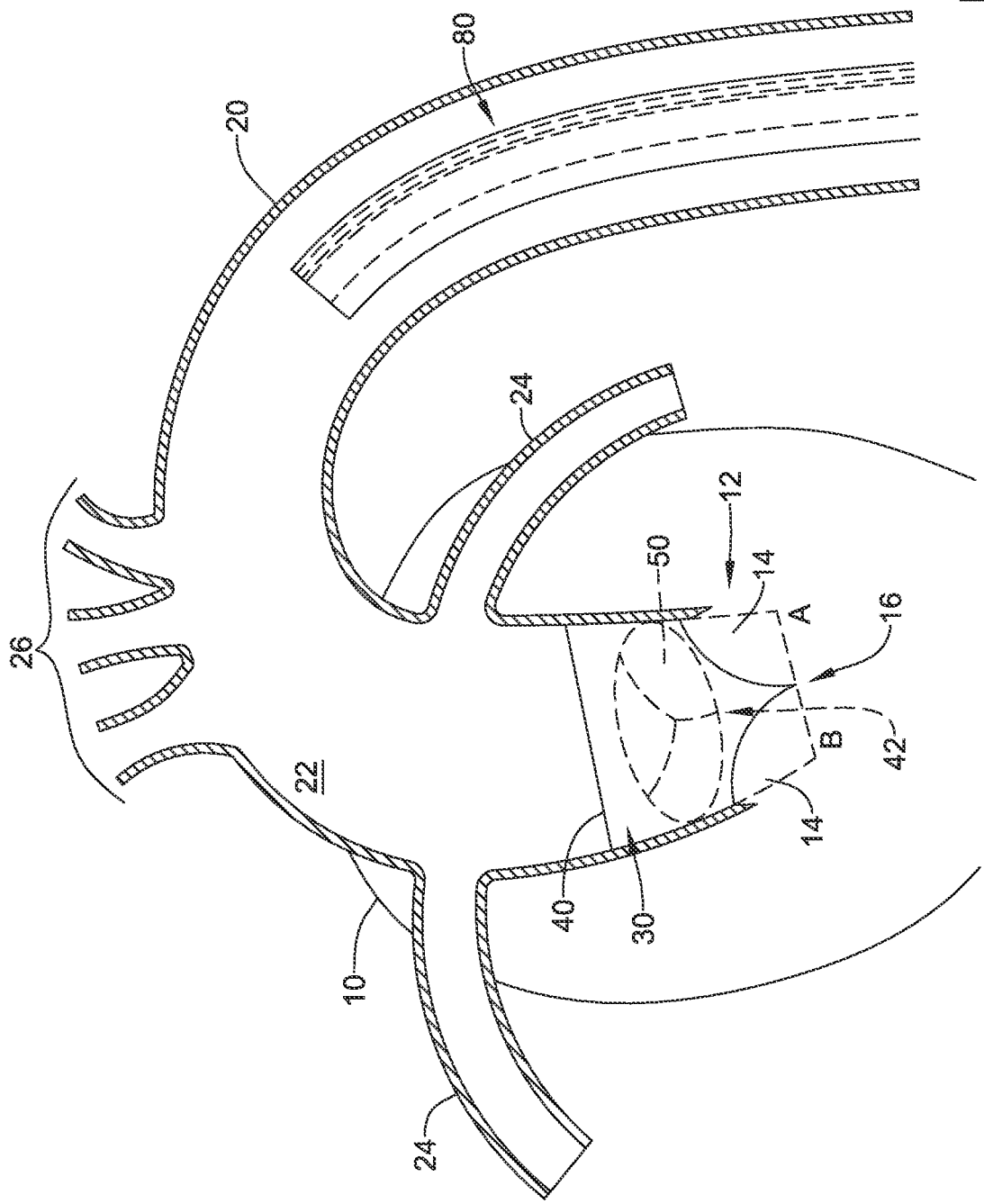

FIGS. 15-17 illustrates aspects of a method of positioning the replacement heart valve implant 30 within the native heart valve 12 (e.g., the aortic valve) of the patient. While discussed in the context of the system of FIGS. 3-8, it will be appreciated that the method may also apply to the systems of FIGS. 9-14 as described herein.

The method may include advancing the system percutaneously to a position adjacent the native heart valve 12 (e.g., the aortic valve). The system may include and/or comprise structures, elements, and/or features as described herein. As seen in FIG. 15, the elongate catheter 80 may extend and/or be advanced within the aorta 20 and through the aortic arch 22. The replacement heart valve implant 30 may be advanced to the position adjacent the native heart valve 12 within the outer sheath 82 in the delivery configuration.

After reaching the position adjacent the native heart valve 12, the method may include deploying the replacement heart valve implant 30 within the native heart valve 12. As may be seen in FIG. 15, in some embodiments, upon initial deployment, the commissural posts 42 of the replacement heart valve implant 30 may be rotationally misaligned with and/or rotationally offset from the commissures 16 of the native heart valve 12. As such, the method may include aligning the commissural posts 42 of the replacement heart valve implant 30 with the commissures 16 of the native heart valve 12 by rotating the replacement heart valve implant 30 relative to the outer sheath 82 of the elongate catheter 80, as shown in FIG. 16.

In some embodiments, rotational alignment of the commissural posts 42 of the replacement heart valve implant 30 with the commissures 16 of the native heart valve 12 may be useful for reducing stress on the plurality of leaflets 50 and/or increasing/maximizing the life of the replacement heart valve implant 30. In some embodiments, rotation of the replacement heart valve implant 30 may be useful for preserving access to the coronary arteries 24.

In previous TAVI systems, rotation of the entire system is required in order to rotate the replacement heart valve implant relative to the native heart valve due to construction of the system, interaction of various components of the system, etc. This may be very difficult to achieve accurately as a result of the length of the delivery device, the flexibility of the delivery device, and/or the tortuous anatomy the delivery device was navigated through to reach the patient's heart, for example. The disclosed systems and/or method(s) may permit fine tuning of the rotational alignment of the replacement heart valve implant 30 relative to the native heart valve 12 without needing to rotate the entire system, thus making rotation of the replacement heart valve implant 30 more precise, reducing the forces needed to rotate the replacement heart valve implant 30, and improving patient safety and/or comfort.

In some embodiments, the method may include advancing the orientation mandrel 90 axially in a distal direction using the orientation mechanism 72 to rotate the inner shaft 84 and/or the replacement heart valve implant 30 relative to the outer sheath 82. In some embodiments, the method may include advancing the orientation mandrel 90 axially in the distal direction within the orientation lumen 88 and/or relative to the inner shaft 84 to rotate the inner shaft 84 and/or the replacement heart valve implant 30 relative to the outer sheath 82. As discussed herein, the reference letters A and B in FIGS. 15 and 16 indicate that the replacement heart valve implant 30 was rotated about 180 degrees. In some embodiments, the replacement heart valve implant 30 may be rotated less than 180 degrees. For example, in some embodiments, rotation of about 60 degrees or less than 60 degrees may be sufficient to align the commissural posts 42 of the replacement heart valve implant 30 with the commissures 16 of the native heart valve 12. In some embodiments, more or less rotation may be needed or desired to facilitate preservation of access to the coronary arteries 24, for example, depending on features found in the replacement heart valve implant 30 and/or the expandable framework 40.

In some embodiments, prior to advancing the orientation mandrel 90 axially in the distal direction, the orientation mandrel 90 may be disposed along the inside bend 94 of the arch 92 of the elongate catheter 80 within the aortic arch 22 of the patient, as seen in FIG. 15. In some embodiments, after advancing the orientation mandrel 90 axially in the distal direction, the orientation mandrel 90 may be disposed along the outside bend 96 of the arch 92 of the elongate catheter 80 within the aortic arch 22 of the patient, as seen in FIG. 16. As discussed herein, other configurations and/or positioning of the orientation mandrel 90 with respect to the arch 92 and/or the central longitudinal axis of the inner shaft 84 are also contemplated.

In some embodiments, the method may further include releasing the replacement heart valve implant 30 within the native heart valve 12 of the patient. The expandable framework 40 may be in the deployed configuration with the replacement heart valve implant 30 is released within the native heart valve 12 of the patient, as seen in FIG. 17. The method may further include withdrawing the elongate catheter 80 of the delivery device 60 (not shown) proximally and removing the elongate catheter 80 from the patient.

The materials that can be used for the various components of the system (and/or other elements disclosed herein) and the various components thereof disclosed herein may include those commonly associated with medical devices and/or systems. For simplicity purposes, the following discussion makes reference to the system. However, this is not intended to limit the devices and methods described herein, as the discussion may be applied to other elements, members, components, or devices disclosed herein, such as, but not limited to, the replacement heart valve implant, the elongate catheter, the outer sheath, the inner shaft, the handle, the delivery device, etc. and/or elements or components thereof.

In some embodiments, the system and/or other elements disclosed herein may be made from a metal, metal alloy, polymer (some examples of which are disclosed below), a metal-polymer composite, ceramics, combinations thereof, and the like, or other suitable material. Some examples of suitable metals and metal alloys include stainless steel, such as 444V, 444L, and 314LV stainless steel; mild steel; nickel-titanium alloy such as linear-elastic and/or super-elastic nitinol; other nickel alloys such as nickel-chromium-molybdenum alloys (e.g., UNS: N06625 such as INCONEL® 625, UNS: N06022 such as HASTELLOY® C-22®, UNS: N10276 such as HASTELLOY® C276®, other HASTELLOY® alloys, and the like), nickel-copper alloys (e.g., UNS: N04400 such as MONEL® 400, NICKELVAC® 400, NICORROS® 400, and the like), nickel-cobalt-chromium-molybdenum alloys (e.g., UNS: R44035 such as MP35-N® and the like), nickel-molybdenum alloys (e.g., UNS: N10665 such as HASTELLOY® ALLOY B2®), other nickel-chromium alloys, other nickel-molybdenum alloys, other nickel-cobalt alloys, other nickel-iron alloys, other nickel-copper alloys, other nickel-tungsten or tungsten alloys, and the like; cobalt-chromium alloys; cobalt-chromium-molybdenum alloys (e.g., UNS: R44003 such as ELGILOY®, PHYNOX®, and the like); platinum enriched stainless steel; titanium; combinations thereof; and the like; or any other suitable material.

As alluded to herein, within the family of commercially available nickel-titanium or nitinol alloys, is a category designated "linear elastic" or "non-super-elastic" which, although may be similar in chemistry to conventional shape memory and super elastic varieties, may exhibit distinct and useful mechanical properties. Linear elastic and/or non-super-elastic nitinol may be distinguished from super elastic nitinol in that the linear elastic and/or non-super-elastic nitinol does not display a substantial "superelastic plateau" or "flag region" in its stress/strain curve like super elastic nitinol does. Instead, in the linear elastic and/or non-super-elastic nitinol, as recoverable strain increases, the stress continues to increase in a substantially linear, or a somewhat, but not necessarily entirely linear relationship until plastic deformation begins or at least in a relationship that is more linear than the super elastic plateau and/or flag region that may be seen with super elastic nitinol. Thus, for the purposes of this disclosure linear elastic and/or non-super-elastic nitinol may also be termed "substantially" linear elastic and/or non-super-elastic nitinol.

In some cases, linear elastic and/or non-super-elastic nitinol may also be distinguishable from super elastic nitinol in that linear elastic and/or non-super-elastic nitinol may accept up to about 2-5% strain while remaining substantially elastic (e.g., before plastically deforming) whereas super elastic nitinol may accept up to about 8% strain before plastically deforming. Both of these materials can be distinguished from other linear elastic materials such as stainless steel (that can also be distinguished based on its composition), which may accept only about 0.2 to 0.44 percent strain before plastically deforming.

In some embodiments, the linear elastic and/or non-super-elastic nickel-titanium alloy is an alloy that does not show any martensite/austenite phase changes that are detectable by differential scanning calorimetry (DSC) and dynamic metal thermal analysis (DMTA) analysis over a large temperature range. For example, in some embodiments, there may be no martensite/austenite phase changes detectable by DSC and DMTA analysis in the range of about −60 degrees Celsius (° C.) to about 120° C. in the linear elastic and/or non-super-elastic nickel-titanium alloy. The mechanical bending properties of such material may therefore be generally inert to the effect of temperature over this very broad range of temperature. In some embodiments, the mechanical bending properties of the linear elastic and/or non-super-elastic nickel-titanium alloy at ambient or room temperature are substantially the same as the mechanical properties at body temperature, for example, in that they do not display a super-elastic plateau and/or flag region. In other words, across a broad temperature range, the linear elastic and/or non-super-elastic nickel-titanium alloy maintains its linear elastic and/or non-super-elastic characteristics and/or properties.

In some embodiments, the linear elastic and/or non-super-elastic nickel-titanium alloy may be in the range of about 50 to about 60 weight percent nickel, with the remainder being essentially titanium. In some embodiments, the composition is in the range of about 54 to about 57 weight percent nickel. One example of a suitable nickel-titanium alloy is FHP-NT alloy commercially available from Furukawa Techno Material Co. of Kanagawa, Japan. Other suitable materials may include ULTANIUM™ (available from Neo-Metrics) and GUM METAL™ (available from Toyota). In some other embodiments, a superelastic alloy, for example a superelastic nitinol can be used to achieve desired properties.

In at least some embodiments, portions or all of the system and/or other elements disclosed herein may also be doped with, made of, or otherwise include a radiopaque material. Radiopaque materials are understood to be materials capable of producing a relatively bright image on a fluoroscopy screen or another imaging technique during a medical procedure. This relatively bright image aids a user in determining the location of the system and/or other elements disclosed herein. Some examples of radiopaque materials can include, but are not limited to, gold, platinum, palladium, tantalum, tungsten alloy, polymer material loaded with a radiopaque filler, and the like. Additionally, other radiopaque marker bands and/or coils may also be incorporated into the design of the system and/or other elements disclosed herein to achieve the same result.

In some embodiments, a degree of Magnetic Resonance Imaging (MRI) compatibility is imparted into the system and/or other elements disclosed herein. For example, the system and/or components or portions thereof may be made of a material that does not substantially distort the image and create substantial artifacts (e.g., gaps in the image). Certain ferromagnetic materials, for example, may not be suitable because they may create artifacts in an MRI image. The system or portions thereof, may also be made from a material that the MM machine can image. Some materials that exhibit these characteristics include, for example, tungsten, cobalt-chromium-molybdenum alloys (e.g., UNS: R44003 such as ELGILOY®, PHYNOX®, and the like), nickel-cobalt-chromium-molybdenum alloys (e.g., UNS: R44035 such as MP35-N® and the like), nitinol, and the like, and others.

In some embodiments, the system and/or other elements disclosed herein may be made from or include a polymer or other suitable material. Some examples of suitable polymers may include polytetrafluoroethylene (PTFE), ethylene tetrafluoroethylene (ETFE), fluorinated ethylene propylene (FEP), polyoxymethylene (POM, for example, DELRIN® available from DuPont), polyether block ester, polyurethane (for example, Polyurethane 85A), polypropylene (PP), polyvinylchloride (PVC), polyether-ester (for example, ARNITEL® available from DSM Engineering Plastics), ether or ester based copolymers (for example, butylene/poly(alkylene ether) phthalate and/or other polyester elastomers such as HYTREL® available from DuPont), polyamide (for example, DURETHAN® available from Bayer or CRISTAMID® available from Elf Atochem), elastomeric polyamides, block polyamide/ethers, polyether block amide (PEBA, for example available under the trade name PEBAX®), ethylene vinyl acetate copolymers (EVA), silicones, polyethylene (PE), MARLEX® high-density polyethylene, MARLEX® low-density polyethylene, linear low density polyethylene (for example REXELL®), polyester, polybutylene terephthalate (PBT), polyethylene terephthalate (PET), polytrimethylene terephthalate, polyethylene naphthalate (PEN), polyetheretherketone (PEEK), polyimide (PI), polyetherimide (PEI), polyphenylene sulfide (PPS), polyphenylene oxide (PPO), poly paraphenylene terephthalamide (for example, KEVLAR®), polysulfone, nylon, nylon-12 (such as GRILAMID® available from EMS American Grilon), perfluoro(propyl vinyl ether) (PFA), ethylene vinyl alcohol, polyolefin, polystyrene, epoxy, polyvinylidene chloride (PVdC), poly(styrene-b-isobutylene-b-styrene) (for example, SIBS and/or SIBS 50A), polycarbonates, ionomers, biocompatible polymers, other suitable materials, or mixtures, combinations, copolymers thereof, polymer/metal composites, and the like. In some embodiments the sheath can be blended with a liquid crystal polymer (LCP). For example, the mixture can contain up to about 6 percent LCP.

In some embodiments, the system and/or other elements disclosed herein may include a fabric material disposed over or within the structure. The fabric material may be composed of a biocompatible material, such a polymeric material or biomaterial, adapted to promote tissue ingrowth. In some embodiments, the fabric material may include a bioabsorbable material. Some examples of suitable fabric materials include, but are not limited to, polyethylene glycol (PEG), nylon, polytetrafluoroethylene (PTFE, ePTFE), a polyolefinic material such as a polyethylene, a polypropylene, polyester, polyurethane, and/or blends or combinations thereof.

In some embodiments, the system and/or other elements disclosed herein may include and/or be formed from a textile material. Some examples of suitable textile materials may include synthetic yarns that may be flat, shaped, twisted, textured, pre-shrunk or un-shrunk. Synthetic biocompatible yarns suitable for use in the present disclosure include, but are not limited to, polyesters, including polyethylene terephthalate (PET) polyesters, polypropylenes, polyethylenes, polyurethanes, polyolefins, polyvinyls, polymethylacetates, polyamides, naphthalene dicarboxylene derivatives, natural silk, and polytetrafluoroethylenes. Moreover, at least one of the synthetic yarns may be a metallic yarn or a glass or ceramic yarn or fiber. Useful metallic yarns include those yarns made from or containing stainless steel, platinum, gold, titanium, tantalum or a Ni—Co—Cr-based alloy. The yarns may further include carbon, glass or ceramic fibers. Desirably, the yarns are made from thermoplastic materials including, but not limited to, polyesters, polypropylenes, polyethylenes, polyurethanes, polynaphthalenes, polytetrafluoroethylenes, and the like. The yarns may be of the multifilament, monofilament, or spun types. The type and denier of the yarn chosen may be selected in a manner which forms a biocompatible and implantable prosthesis and, more particularly, a vascular structure having desirable properties.

In some embodiments, the system and/or other elements disclosed herein may include and/or be treated with a suitable therapeutic agent. Some examples of suitable therapeutic agents may include anti-thrombogenic agents (such as heparin, heparin derivatives, urokinase, and PPack (dextrophenylalanine proline arginine chloromethylketone)); antiproliferative agents (such as enoxaparin, angiopeptin, monoclonal antibodies capable of blocking smooth muscle cell proliferation, hirudin, and acetylsalicylic acid); anti-inflammatory agents (such as dexamethasone, prednisolone, corticosterone, budesonide, estrogen, sulfasalazine, and mesalamine); antineoplastic/antiproliferative/anti-mitotic agents (such as paclitaxel, 5-fluorouracil, cisplatin, vinblastine, vincristine, epothilones, endostatin, angiostatin and thymidine kinase inhibitors); anesthetic agents (such as lidocaine, bupivacaine, and ropivacaine); anti-coagulants (such as D-Phe-Pro-Arg chloromethyl ketone, an RGD peptide-containing compound, heparin, anti-thrombin compounds, platelet receptor antagonists, anti-thrombin antibodies, anti-platelet receptor antibodies, aspirin, prostaglandin inhibitors, platelet inhibitors, and tick antiplatelet peptides); vascular cell growth promoters (such as growth factor inhibitors, growth factor receptor antagonists, transcriptional activators, and translational promoters); vascular cell growth inhibitors (such as growth factor inhibitors, growth factor receptor antagonists, transcriptional repressors, translational repressors, replication inhibitors, inhibitory antibodies, antibodies directed against growth factors, bifunctional molecules consisting of a growth factor and a cytotoxin, bifunctional molecules consisting of an antibody and a cytotoxin); cholesterol-lowering agents; vasodilating agents; and agents which interfere with endogenous vasoactive mechanisms.

It should be understood that this disclosure is, in many respects, only illustrative. Changes may be made in details, particularly in matters of shape, size, and arrangement of steps, without exceeding the scope of the disclosure. This may include, to the extent that it is appropriate, the use of any of the features of one example embodiment being used in other embodiments. The disclosure's scope is, of course, defined in the language in which the appended claims are expressed.

What is claimed is:

1. A system for delivering a replacement heart valve implant to a native heart valve of a patient, comprising:
   a replacement heart valve implant including an expandable framework and a plurality of leaflets coupled to the expandable framework at commissural posts of the expandable framework; and
   a delivery device including a proximal handle and an elongate catheter extending distally from the proximal handle, wherein the elongate catheter includes an outer sheath and an inner shaft movably disposed within a lumen of the outer sheath;
   wherein the replacement heart valve implant is releasably coupled to a distal portion of the inner shaft in a delivery configuration;
   wherein the inner shaft includes a central guidewire lumen extending longitudinally therethrough;
   wherein the inner shaft includes an orientation lumen extending longitudinally within the inner shaft, the orientation lumen being laterally offset from the central guidewire lumen and having a closed distal end;
   wherein the delivery device includes an orientation mandrel slidably disposed within the orientation lumen, the orientation mandrel extending distally from the proximal handle within the orientation lumen to a distal end proximate the closed distal end of the orientation lumen;
   wherein the orientation mandrel is operably coupled to an orientation mechanism of the proximal handle, the orientation mechanism being configured to move the orientation mandrel axially relative to the inner shaft.

2. The system of claim 1, wherein a distal portion of the elongate catheter includes a pre-formed curve configured to conform to an aortic arch of the patient, the pre-formed curve defining an arch of the elongate catheter having an inside bend and an outside bend disposed opposite the inside bend relative to the central guidewire lumen.

3. The system of claim 2, wherein the orientation mandrel is disposed along the inside bend of the arch of the elongate catheter in a first configuration.

4. The system of claim 3, wherein the orientation mandrel is disposed along the outside bend of the arch of the elongate catheter in a second configuration.

5. The system of claim 4, wherein the orientation mechanism is configured to advance the orientation mandrel distally relative to the inner shaft.

6. The system of claim 5, wherein distal advancement of the distal end of the orientation mandrel against the closed distal end of the orientation lumen causes compressive force to build up within the orientation mandrel.

7. The system of claim 6, wherein the compressive force shifts the elongate catheter from the first configuration to the second configuration.

* * * * *